(12) United States Patent
Burke

(10) Patent No.: US 10,864,393 B2
(45) Date of Patent: Dec. 15, 2020

(54) FALL CONTROL SYSTEM AND METHOD OF CONTROLLING A MOVEMENT DURING FALL EVENT

(71) Applicant: Bradley Burke, Metamora, MI (US)

(72) Inventor: Bradley Burke, Metamora, MI (US)

(73) Assignee: 2INNOVATE LLC, Metamora, MI (US)

( * ) Notice: Subject to any disclaimer, the term of this patent is extended or adjusted under 35 U.S.C. 154(b) by 0 days.

(21) Appl. No.: 15/475,799

(22) Filed: Mar. 31, 2017

(65) Prior Publication Data

US 2017/0281994 A1 Oct. 5, 2017

Related U.S. Application Data

(60) Provisional application No. 62/316,420, filed on Mar. 31, 2016.

(51) Int. Cl.
*A62B 35/00* (2006.01)
*F16D 63/00* (2006.01)
(Continued)

(52) U.S. Cl.
CPC ...... *A62B 35/0081* (2013.01); *A62B 35/0093* (2013.01); *B60T 17/00* (2013.01); *B61H 9/02* (2013.01); *F16D 63/008* (2013.01)

(58) Field of Classification Search
CPC .... E04F 11/1863; B66B 9/08; A62B 35/0043; A62B 35/0056; A62B 35/0062;
(Continued)

(56) References Cited

U.S. PATENT DOCUMENTS 4,499,966 A 2/1985 Milne et al.
4,688,813 A * 8/1987 Misawa ................ A61G 5/061
180/8.2
(Continued)

FOREIGN PATENT DOCUMENTS

CA 2151984 A1 12/1996
CA 2800185 A1 6/2013
(Continued)

OTHER PUBLICATIONS

International Search Report and Written Opinion for PCT/CA2017/050403 dated Jul. 21, 2017.

*Primary Examiner* — Katherine W Mitchell
*Assistant Examiner* — Shiref M Mekhaeil
(74) *Attorney, Agent, or Firm* — Brooks Kushman P.C.

(57) ABSTRACT

A fall control system is described. The fall control system comprises an elongate guide rail extending along an axis, a trolley for moving along the elongate guide rail, a tether attached to the trolley at a first end, a second end of the tether for attaching to a user, and a speed control system for controlling a speed of the trolley along the elongate guide rail. The speed control system comprises one or more than one speed control track attached to the elongate guide rail and extending along the axis, a background speed controller coupled to the trolley and engaged with the one or more speed control track when the speed control system or the trolley is in a travelling orientation and controlling the speed of the trolley along the elongate guide rail to not exceeded a maximum walking speed. The speed control system also includes a speed controller coupled to the trolley and engagable with the one or more than one speed control track, the speed controller displaceable from a first position when the speed control system or the trolley is in the travelling orientation, and the speed controller is not engaged with the speed control track, to a second position when the speed (Continued)

control system or the trolley is in a falling orientation and the speed controller is engaged with the speed control track. The speed controller for controlling the speed of the trolley along the guide rail in the falling orientation to not exceed a maximum fall speed.

17 Claims, 30 Drawing Sheets

(51) Int. Cl.
  *B61H 9/02* (2006.01)
  *B60T 17/00* (2006.01)
(58) Field of Classification Search
  CPC . A62B 35/0081; F16D 63/008; F16D 63/004; F16D 2121/18; F16D 2129/065
  USPC ............................. 187/200, 201; 182/36, 37
  See application file for complete search history.

(56) References Cited

U.S. PATENT DOCUMENTS

| | | | | |
|---|---|---|---|---|
| 4,788,463 A * | 11/1988 | Layh | ........................ | F16D 51/00 188/161 |
| 5,022,197 A * | 6/1991 | Aragona | ............. | E04F 11/1863 52/183 |
| 5,145,038 A * | 9/1992 | Kuwahara | ............ | H02K 49/043 188/158 |
| 5,154,623 A * | 10/1992 | Kuwahara | ............ | H02K 49/043 188/164 |
| 5,156,240 A * | 10/1992 | Ostrobrod | ................. | A62B 1/14 182/193 |
| 5,158,510 A * | 10/1992 | Lemire | ............... | A63B 21/4001 482/51 |
| 5,269,227 A * | 12/1993 | Warren | ............... | E04F 11/1863 105/29.1 |
| 5,638,919 A * | 6/1997 | Pejout | ...................... | A62B 1/14 182/192 |
| 5,908,087 A * | 6/1999 | Johansson | ............. | B66B 9/0838 187/201 |
| 6,019,195 A * | 2/2000 | Pelofi | ...................... | A62B 1/14 182/192 |
| 6,109,398 A * | 8/2000 | Lempio | ..................... | B66B 5/18 188/82.4 |
| 6,176,355 B1 * | 1/2001 | Yamamoto | ............ | H02K 49/043 188/158 |
| 6,412,611 B1 * | 7/2002 | Pribonic | ................... | B60L 7/28 187/375 |
| 6,659,230 B1 * | 12/2003 | Jenkins | ................... | B66B 5/044 187/202 |
| 6,666,147 B1 * | 12/2003 | Minges | ..................... | B61B 7/06 104/128 |
| 6,679,353 B1 * | 1/2004 | Muranaka | ................. | B66B 9/08 187/201 |
| 7,395,764 B2 * | 7/2008 | Debrunner | .......... | E04F 11/1863 104/89 |
| 7,870,695 B2 * | 1/2011 | Manson | ............... | E04F 11/1863 198/335 |
| 7,883,450 B2 | 2/2011 | Hidler | | |
| 8,234,980 B2 * | 8/2012 | Boren | ...................... | B61H 9/02 104/112 |
| 8,601,951 B2 * | 12/2013 | Lerner | .................... | B60B 19/10 104/112 |
| 10,016,634 B2 * | 7/2018 | Weston | .................. | A63G 21/20 |
| 10,023,207 B2 * | 7/2018 | Brown | ..................... | B61H 1/00 |
| 10,053,334 B1 * | 8/2018 | Cheng | ...................... | B66B 9/08 |
| 2002/0047683 A1 * | 4/2002 | Kawashima | .............. | H02P 6/14 318/721 |
| 2005/0146213 A1 * | 7/2005 | Imanishi | .............. | H02K 49/046 303/152 |
| 2005/0279580 A1 * | 12/2005 | Szentistvany | ......... | B66B 9/0815 187/201 |
| 2006/0101614 A1 * | 5/2006 | Sellars | .................... | B60B 33/08 16/25 |
| 2006/0243112 A1 | 11/2006 | Debrunner | | |
| 2007/0004567 A1 | 1/2007 | Shetty et al. | | |
| 2007/0039788 A1 * | 2/2007 | Fulton | ....................... | B60L 7/28 188/164 |
| 2008/0245617 A1 * | 10/2008 | Madoz Michaus | ..... | B66B 5/044 187/373 |
| 2009/0294223 A1 * | 12/2009 | Hesl | ...................... | F16D 63/008 188/42 |
| 2010/0314201 A1 * | 12/2010 | Stannah | .................... | B66B 9/08 187/201 |
| 2011/0147125 A1 | 6/2011 | Blomberg | | |
| 2011/0162917 A1 * | 7/2011 | Steele | ..................... | A63G 21/22 188/65.2 |
| 2011/0203871 A1 * | 8/2011 | Faye | ...................... | F16D 25/087 182/3 |
| 2012/0031701 A1 | 2/2012 | Jones | | |
| 2012/0048652 A1 * | 3/2012 | DiGiovanni | .......... | B66B 9/0815 187/201 |
| 2013/0327242 A1 * | 12/2013 | Bernier | .................... | B61H 9/02 104/113 |
| 2013/0333586 A1 * | 12/2013 | Cylvick | ................. | A63G 21/22 104/113 |
| 2014/0083801 A1 * | 3/2014 | Vroegindeweij | ..... | B66B 9/0815 187/201 |
| 2014/0231738 A1 * | 8/2014 | Amos | ................. | E04F 11/1863 256/59 |
| 2014/0311376 A1 * | 10/2014 | Brannan | ................... | B61H 9/02 104/113 |
| 2014/0326161 A1 * | 11/2014 | Halliday | ................. | A63G 21/20 104/113 |
| 2015/0135983 A1 * | 5/2015 | Halliday | .................. | B61H 9/02 104/113 |
| 2015/0217151 A1 | 8/2015 | Jones et al. | | |
| 2015/0266454 A1 * | 9/2015 | McGowan | ............. | A63G 21/22 104/113 |
| 2015/0364958 A1 * | 12/2015 | Zanotti | ..................... | B66B 9/08 310/156.01 |
| 2016/0052400 A1 * | 2/2016 | McGowan | ................ | B60L 7/28 104/93 |
| 2016/0272225 A1 * | 9/2016 | Liggett | ..................... | B61H 9/02 |
| 2016/0287989 A1 * | 10/2016 | Fung | ....................... | A63F 13/42 |
| 2016/0355197 A1 * | 12/2016 | Brown | ..................... | B61H 9/02 |
| 2017/0036123 A1 * | 2/2017 | Liggett | ..................... | B61B 3/00 |
| 2017/0088150 A1 * | 3/2017 | Christinet | ................ | B61H 9/02 |
| 2017/0217726 A1 * | 8/2017 | Guilani | .................... | B66B 5/22 |
| 2018/0126287 A1 * | 5/2018 | Wilson | ................... | A63G 21/20 |
| 2018/0214782 A1 * | 8/2018 | Hackett | .................. | A63G 21/22 |
| 2018/0216656 A1 * | 8/2018 | Bailey | ..................... | F16B 45/02 |
| 2018/0229070 A1 * | 8/2018 | McBride | ............. | A63B 21/4001 |

FOREIGN PATENT DOCUMENTS

| | | |
|---|---|---|
| CN | 1872365 A | 12/2006 |
| EP | 2522399 A2 | 11/2012 |
| EP | 2870982 A2 | 5/2015 |
| JP | H1057435 A | 3/1998 |
| JP | 2005/192836 A | 7/2005 |
| WO | 02074389 A2 | 9/2002 |
| WO | 2009/108040 A1 | 9/2009 |
| WO | 2014116628 A1 | 7/2014 |
| WO | 2014/195227 A2 | 12/2014 |

* cited by examiner

FALL CONTROL SYSTEM AND METHOD OF CONTROLLING A MOVEMENT DURING FALL EVENT

CROSS-REFERENCE TO RELATED APPLICATIONS

This application claims the benefit of U.S. provisional application Ser. No. 62/316,420 filed Mar. 31, 2016, the disclosure of which is hereby incorporated in its entirety by reference herein.

TECHNICAL FIELD

The present disclosure relates to a fall control system and a method of controlling a movement during a fall event.

BACKGROUND

Unintentional falls are a leading cause of non-fatal injuries treated in hospital emergency departments. The Centers for Disease Control and Prevention (USA), reported that unintentional falls in the elderly resulted in more non-fatal injuries in 2013 than the top 2 to top 10 leading causes of injuries in that age category (>65 years of age) combined.

Fall assist or fall arrest systems have been developed to lessen the frequency of injuries arising from unintentional falls, see for example EP 2,522,399, U.S. Pat. No. 7,883,450, US 2007/0004567, WO 2014/116628. In known fall assist systems, a person is attached to a harness that is coupled to a trolley that runs along a guiding track. During regular use, the person exerts a pulling force on the trolley, thereby moving the trolley along the guiding track. During a fall event, a braking system within the trolley is activated and the trolley comes to a complete stop thereby arresting the person from further movement and preventing the person from impacting the ground. Braking systems typically used in fall assist systems include friction engagement systems, for example as described in CA2,800,185, and WO2002/074389, or ratchet-like engagement braking systems, for example as described in EP 2,870,982, US 2012/0031701 or US 2015/0217151.

Other mobility aiding systems have also been developed. For example, stairlift systems transport a person over a flight of stairs. Generally, such systems comprise a guide rail, an electrical motorized trolley for moving along the guide rail (with or without a backup battery), and a passenger seat or platform attached to the trolley. In use, a passenger sits on the seat, or stands on the platform, attaches a seat-belt like device, and is carried from a first point to a second point along the guide rail. No movement on the passenger's part, other than to board and alight the seat or platform, is required.

SUMMARY

The present disclosure relates to a fall control system and a method of controlling a movement during a fall event.

It is an object of the present disclosure to provide an improved fall control system.

As described herein there is provided a fall control system that allows a user to ascend and descend stairs, or travel along a level surface, on their own accord. The fall control system decreases the user's ground impact speed during a fall event, and does not completely stop a user from impacting or contacting the ground during a fall event.

A fall control system comprising, an elongate guide rail extending along an axis, a trolley for moving along the elongate guide rail, a tether attached to the trolley at a first end, a second end of the tether for attaching to a user, and a speed control system for controlling a speed of the trolley along the elongate guide rail is provided. The speed control system comprises one or more than one speed control track attached to the elongate guide rail and extending along the axis, a surface of the speed control track selected from a flat surface, a wave-like surface, a toothed or geared surface, or a combination thereof. The speed control system also comprise a background speed controller, and a speed controller. The background speed controller coupled to the trolley and engaged with the one or more speed control track when the speed control system or the trolley is in a travelling orientation, the background speed controller selected from the group of one or more than one background eddy current brake, one or more than one background pre-tensioned gear, one or more than one background on-set wheel, and a combination thereof, the background speed controller for controlling the speed of the trolley along the elongate guide rail in the travelling orientation to not exceed a maximum walking speed. The speed controller coupled to the trolley and engagable with the one or more than one speed control track, the speed controller displaceable from a first position when the speed control system or the trolley is in the travelling orientation and the speed controller is not engaged with the speed control track, to a second position when the speed control system or the trolley is in a falling orientation and the speed controller is engaged with the speed control track, the speed controller selected from the group of one or more than one eddy current brake, one or more than one pre-tensioned gear, one or more than one on-set wheel, one or more than one off-set wheel, a wave-like surface on the body of the trolley, a flat surface on the body of the trolley, and a combination thereof, the speed controller for controlling the speed of the trolley along the guide rail in the falling orientation to not exceed a maximum fall speed. The maximum walking speed being greater than the maximum fall speed, and the maximum walking speed and the maximum fall speed being greater than zero.

Also described herein is the fall control system as described above, wherein one of the one or more than one speed control track is a background speed control track, the background speed control track engaged with the background speed controller, and a second of the one or more than one speed control track is for engaging the speed controller. For example, the background speed control track and the speed control track may be the same, or alternatively, the background speed control track and the speed control track may be separate.

Also provided is the fall control system as described above, wherein the background speed control track, the speed control track, or the background speed control track and the speed control track is conductive. For example, a circular shaft of the elongate guide rail may be conductive, or one or more than one elongate portion of the guide rail is conductive, and the background speed controller is the background eddy current brake. Furthermore, the background speed controller may comprise one or more than one background magnet coupled to the trolley and positioned on the trolley so that when the trolley is mounted on the elongate guide rail, the one or more than one background magnet is adjacent the background speed control track and the background eddy current brake is activated when the trolley moves along the guide rail.

The fall control system as described above is also provided, wherein the surface of the speed control track is a wave-like surface and the speed controller is the wave-like surface on the body of the trolley, or the on-set wheel. Alternatively, the surface of the speed control track may be a flat surface and the speed controller is the one or more than one off-set wheel. For example, when the trolley is in the travelling orientation, the wave-like surface on the body of the trolley, or the on-set wheel, is separated from the speed control track by a sufficient distance that the speed controller is not active, and when the trolley moves to the falling orientation the trolley rotates about the circular shaft and the axis, of the elongate guide rail, from the first position to the second position, in the second position the wave-like surface on the body of the trolley, or the on-set wheel, is brought into contact with the speed control track.

The speed control track of the fall control system, as generally descried above, may comprise the one or more than one elongate portion of the guide rail that is conductive, and the speed controller may comprise one or more than one magnet coupled to the trolley and positioned on the trolley so that when the trolley is in the travelling orientation, the one or more than one magnet is separated from the speed control track by a sufficient distance that the eddy current brake is not active, and when the trolley moves to the falling orientation the trolley rotates about the circular shaft and the axis, of the elongate guide rail, from the first position to the second position, in the second position the one or more than one magnet of the speed controller is brought into a position adjacent the one or more than one elongate portion of the guide rail that is conductive, thereby activating eddy current brake.

A fall control system is provided as described above, wherein a surface of the background speed control track is the toothed or geared surface, and the background speed controller is the one or more than one background pre-tensioned gear, and the speed control track is the toothed or geared surface and the speed controller is the one or more than one pre-tensioned gear.

A fall control trolley for moving along an elongate guide rail is also provided. The trolley comprises, a body, a background speed controller coupled to the body, and a speed controller coupled to the body. The background speed controller for engaging with one or more speed control track when the trolley is mounted on a guide rail and in a travelling orientation, the background speed controller selected from the group of one or more than one background magnet, one or more than one background pre-tensioned gear, one or more than one background on-set wheel, and a combination thereof, the background speed controller for controlling the speed of the trolley along the elongate guide rail in the travelling orientation to not exceed a maximum walking speed. A speed controller for engaging with the one or more than one speed control track, when the speed controller is displaced from a first position, when the trolley is in the travelling orientation and the speed controller is not engaged with the speed control track, to a second position when the trolley is in a falling orientation and the speed controller is engaged with the speed control track. The speed controller selected from the group of one or more than one magnet, one or more than one pre-tensioned gear, one or more than one on-set wheel, one or more than one off-set wheel, a wave-like surface on the body of the trolley, a flat surface on the body of the trolley, and a combination thereof, the speed controller for controlling the speed of the trolley along the guide rail in the falling orientation to not exceed a maximum fall speed, wherein the maximum walking speed being greater than the maximum fall speed, and the maximum walking speed and the maximum fall speed being greater than zero.

The fall control trolley as described above may move from the travelling orientation to the falling orientation by rotating about a circular shaft and an axis, of the elongate guide rail.

A method for controlling a movement of a movable object during a fall event is also described herein. The method comprising:

(a) coupling a first end of a tether to a trolley, the trolley being moveable along an elongate guide rail extending along an axis, the trolley comprising a background speed controller and a speed controller, the background speed controller active while the trolley is in a first position, in a travelling orientation, and the speed controller active when the trolley is in a second position, in a falling orientation;

(b) coupling a second end of the tether to the moveable object;

(c) exerting a pulling force, through the tether, on the trolley that is sufficient to move the trolley along the elongate guide rail while in the travelling orientation, the background speed controller controlling the speed of the trolley along the elongate guide rail to not exceed a maximum walking speed;

(d) during the fall event, exerting a falling force, through the tether, on the trolley that is sufficient to displace the trolley from the first position to the second position, the speed controller for controlling the speed of the trolley along the guide rail in the falling orientation to not exceed a maximum fall speed; and (e) allowing the moveable object to descend to a ground at a controlled speed.

Preferably the maximum walking speed is greater than the maximum fall speed, and the maximum walking speed and the maximum fall speed are greater than zero.

Also provided herein is a transfer belt comprising, a padded belt for placement about a user's waist, an attachment cable fixed to the belt at a first and a second end and located along a forward-facing portion of the belt, the attachment cable for receiving a tether and providing side-to-side movement of the tether from the first end to the second end when the tether is attached to attachment cable, a cable backing attached to the belt and placed behind the belt attachment cable, the cable backing extending at least between the first and the second end, a cable cover attached to the padded belt below the attachment cable and comprising a free end protruding out from the belt and partly or fully overlapping the attachment cable, the cable cover extending at least between the first and the second end.

The fall control system described herein allows the user, following a fall, to crawl along the floor or stairs while still attached to the fall control system should he or she be injured and/or too weak to stand back up. The trolley of the fall-control system is typically pulled along by the user (when ascending stirs or moving along a flat surface), or by gravity (when descending stairs) and does not require an external power source. However, an external power source may be used to move the trolley if desired.

The guide rail of the fall control system described herein may also be used as a standard height hand rail (for example, approximately 30-37 inches from the floor or stairs), or can be installed in addition to a standard hand rail. If installed as a separate rail, then the guide rail may be located at some distance above and parallel to the standard hand rail. Since the trolley will lag behind the user travelling upstairs, and lead the user travelling downstairs, there would be room for the users hand on the rail ahead of the trolley walking upstairs, and behind the trolley walking downstairs (given an adequate and proper tether length). Similarly, on a level surface the trolley would lag behind the user, allowing room for the hand in front of the trolley.

The outer surface of the trolley (not including the funnel-like opening for the tether) may be padded with high density foam to decrease the chance of injury should the user fall forwards, backwards, or sideways and strike their head or other part of their body on the trolley.

This summary does not necessarily describe the entire scope of all aspects of the disclosure. Other aspects, features and advantages will be apparent to those of ordinary skill in the art upon review of the following description of specific embodiments.

BRIEF DESCRIPTION OF THE DRAWINGS

In the accompanying drawings, which illustrate one or more exemplary embodiments.

DETAILED DESCRIPTION

The present disclosure relates to a fall control system and a method of controlling a movement during a fall event.

Directional terms such as "top," "bottom," "upwards," "downwards," "vertically," and "laterally" are used in the following description for the purpose of providing relative reference only, and are not intended to suggest any limitations on how any article is to be positioned during use, or to be mounted in an assembly or relative to an environment. The use of the word "a" or "an" when used herein in conjunction with the term "comprising" may mean "one," but it is also consistent with the meaning of "one or more," "at least one" and "one or more than one." Any element expressed in the singular form also encompasses its plural form. Any element expressed in the plural form also encompasses its singular form. The term "plurality" as used herein means more than one, for example, two or more, three or more, four or more, and the like.

As used herein, the terms "comprising," "having," "including" and "containing," and grammatical variations thereof, are inclusive or open-ended and do not exclude additional, un-recited elements and/or method steps. The term "consisting essentially of" when used herein in connection with a composition, use or method, denotes that additional elements, method steps or both additional elements and method steps may be present, but that these additions do not materially affect the manner in which the recited composition, method or use functions. The term "consisting of" when used herein in connection with a composition, use or method, excludes the presence of additional elements and/or method steps.

As described herein there is provided a non-electrical fall control system that allows a user to ascend and descend stairs or level surface on their own accord (travelling orientation of the fall control system). The fall control system generally comprises an elongate guide rail and a trolley that moves along the elongate guide rail. The trolley generally moves by being pulled by the user, and no external electrical power source is used to move the trolley. The fall control system decreases the user's ground impact speed during a fall event (falling orientation of the fall control system), and does not completely stop a user from impacting or contacting the ground during a fall event. The fall control system described herein allows the user, following a fall, to crawl along the floor or stairs while still attached to the fall control system should he or she be injured and/or too weak to stand back up. The general arrangement of the various fall control systems described herein is shown in FIGS. 1A and 1B.

Figure 1A:
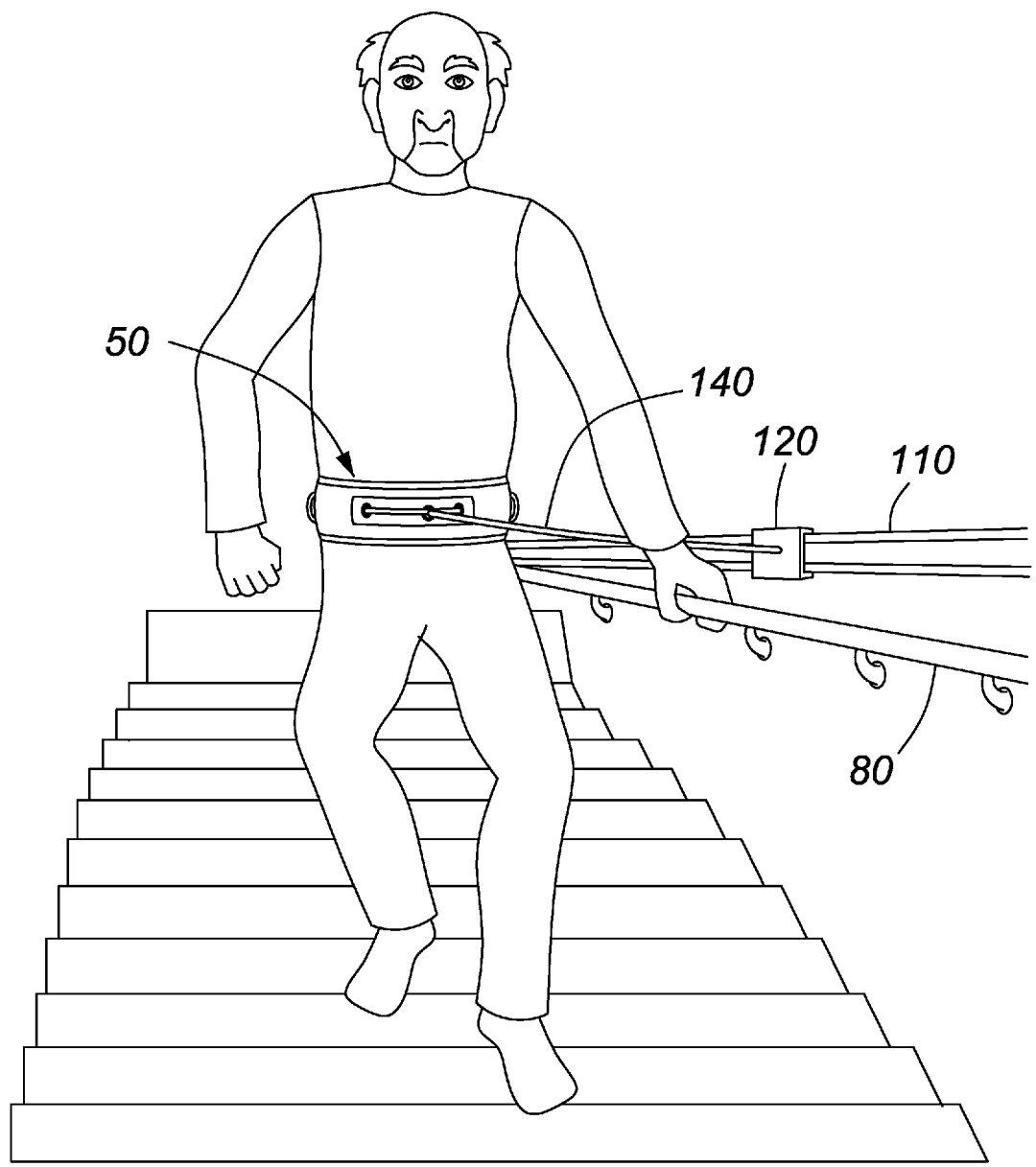
FIG. 1A shows a perspective view of a person ascending a set of stairs using an example of a fall control device as described herein.

With reference to FIG. 1A there is shown a user ascending a set of stairs while attached to a fall control system as described herein. The fall control system may be used while the user is moving along a horizontal surface, or while the user is descending or ascending stairs of any pitch or steepness. In the example shown in FIG. 1A, the user is wearing a belt 50 that is connected to a trolley 120 by an adjustable length tether 140. While the user ascends the stairs in a travelling orientation, trolley 120 moves along guide rail 110 by being pulled by the user along the guide rail 110 via tether 140. The trolley is not electric, or powered by an external power source.

In the example shown in FIG. 1A, the guide rail 110 is separate from the handrail, and the user may hold onto a regular hand rail if desired. As shown in FIG. 1B, the guide rail 110 may also be used as a standard height hand rail (approximately 30-37 inches from the floor or stairs), or it can be used along with a standard hand rail (FIG. 1A). If both a hand rail and a guide rail are used, then the guide rail 110 is generally placed parallel to the standard hand rail 80 and at a suitable height, for example above the hand rail. In use, the trolley 120 will move along guide rail 110 and lag behind the user travelling upstairs (FIG. 1A), and lead the user travelling downstairs (FIG. 1B). As a result, the user may place their hand on the hand rail ahead of the trolley walking upstairs, or behind the trolley walking downstairs. The user may also use the guide rail 110 as a hand rail on a level surface as the trolley would lag behind the user, allowing room for their hand in front of trolley 120.

Figure 1B:
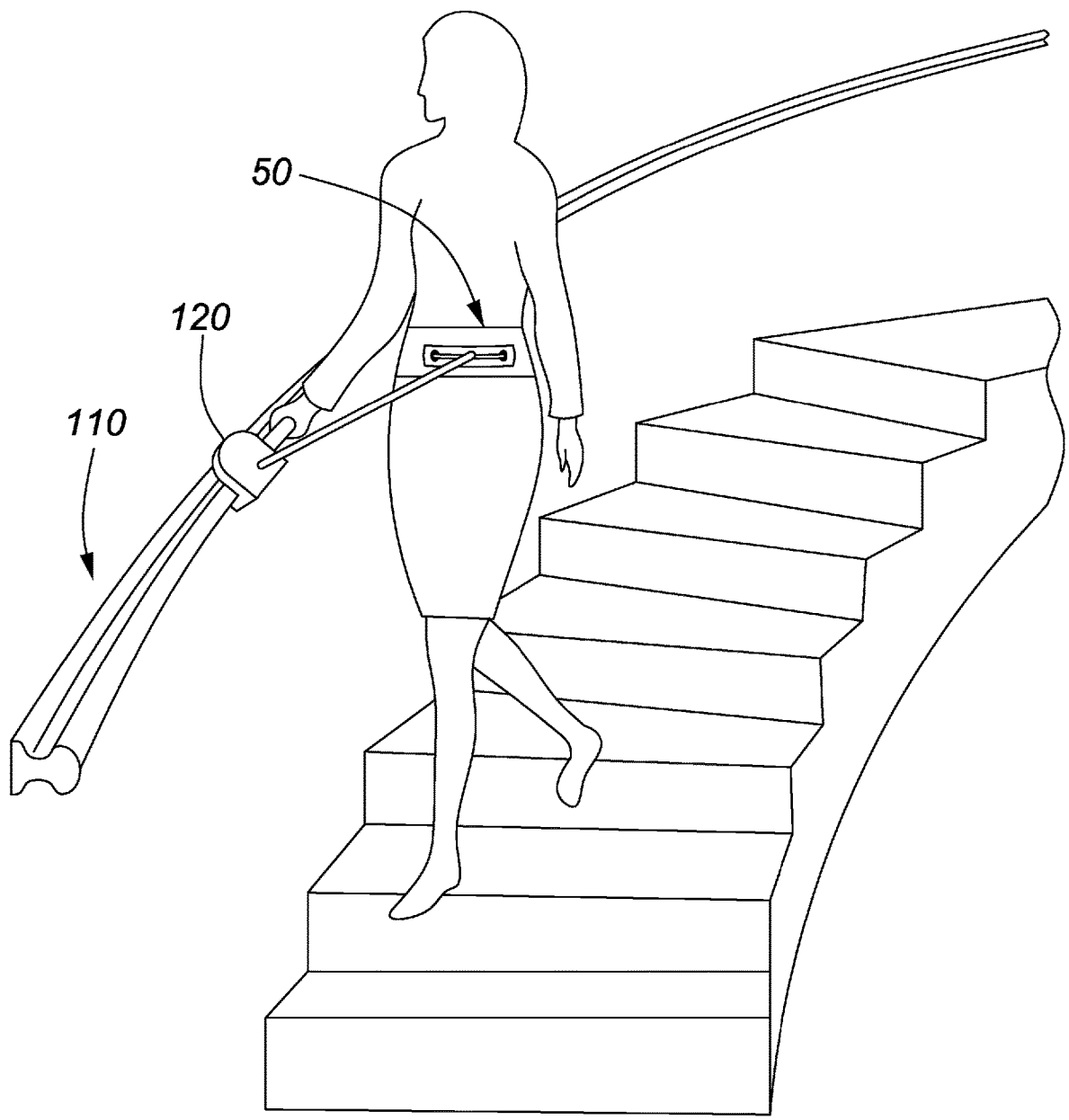
FIG. 1B shows a perspective view of a person descending a set of curved stairs using of another configuration of an example of a fall control device as described herein.

FIG. 1B also shows an alternate configuration of a fall control system described herein where the guide rail 110 is curved to match the curve of the curved stair case. In this example, the user is descending the stairs and the trolley is moving along the guide rail under the influence of gravity.

The trolley (120, FIGS. 2A, 2B, 3A; 220, FIGS. 3B, 5A-5D, 6A; 320, FIGS. 4, 6B; 620, FIGS. 8A, 8B, 9A, 9B, 10A, 10B, 11A, 11B), is typically of a light weight and the outer layer or surface 118 of the trolley may be padded (e.g. FIGS. 9A, 9B, 10A, 10B), for example, with a high density foam. This arrangement may help to decrease chance of injury should the user fall forwards, backwards, or sideways and strike their head or other part of their body on the trolley. Additionally, in some examples described herein, that comprise the trolley 120 disposed within a C-shaped guide rail 110, the outer surface or layer 118 of the guide rail 110 may be padded (FIGS. 2A, 2B, 3A, 4) to decrease chance of injury should the user fall forwards, backwards, or sideways and strike their head or other part of their body on the C-shaped guide rail.

The trolley comprises a speed control system comprising one or more than one background speed control system, and one or more than one speed retarding subsystem, which interact with the guide rail, a portion of the guide rail, a speed control track, a background speed control track, or a combination thereof. Collectively, the speed control system controls movement of the trolley along the guide rail. The trolley can transition from a first position (or travelling orientation) to a second position (or falling orientation). At the first position when the trolley in a travelling orientation, the trolley may be in a resting position (not moving along the guide rail), or the trolley may be moving along the guide rail at speed controlled by the background speed control system. In the travelling orientation the trolley moves at a speed that does not greatly exceed a usual maximum walking speed of the user. At a second position, or fall orientation, the trolley moves along the guide rail at a speed that is less than the usual walking speed and significantly less than a maximum fall speed. If the user falls, the fall control system transitions to the second position (fall orientation) and the one or more than one speed retarding subsystem is activated. When the speed retarding subsystem is activated, the movement of the trolley along the guide rail is reduced, thereby slowing the speed of user's fall and minimizing any injury that would occur as a result of the fall.

By "travelling orientation" or 'first position" it is meant the relative position of the trolley, one or more than one trolley component, or a combination thereof with respect to the guide rail, a background speed control track, a speed control track, or combination thereof. The travelling orientation is achieved when the trolley is in a resting position (i.e. not moving along the guide rail) or when the trolley is attached to a user and the trolley moving along the guide rail as the user is walking, ascending, or descending stairs. In the travelling orientation the background speed control system may be activated.

By "falling orientation" or 'second position" it is meant the relative position of the trolley, one or more than one trolley component, or a combination thereof with respect to the guide rail, the background speed control track, the speed control track, or combination thereof. The falling orientation is achieved when the trolley is attached to a user and the user falls thereby imparting a force on the tether, the trolley body, one or more than one trolley component, or a combination thereof. In the falling orientation the speed retarding subsystem is activated.

A "speed control system" as used herein refers to the combination of the background speed control system and the speed retarding subsystem, of the fall control system.

A "background speed control system" as used herein refers to a combination of elements that control the speed of the trolley when the trolley is in the travelling orientation. The background speed control system may comprise a background speed control track, located along, beside, on the surface of, or within, the guide rail, and one or more than one background speed controller attached to the trolley body. The background speed controller interacts with the background speed control track when the trolley is the travelling orientation.

A "background speed controller" refers to an element or a combination of elements that are a part of the trolley body and that engage directly or indirectly with the background speed control track, or the speed control track, when the fall control system is in the travelling orientation. The background speed controller may include one or more than one magnet, a pre-tensioned wheel, a pre tensioned gear wheel, one or more than one on-set wheel (i.e. the axel is on the center of rotation of the wheel), or a combination thereof.

A "background speed control track" refers to a track that located along, beside, on the surface of, or within, the guide rail. The background speed control track may comprise a flat surface, a toothed (gear) surface, a wave-like surface, a conductive surface, a conductive body, or a combination thereof. In some examples described herein the background speed control track and the speed control track may be the same element.

A "speed retarding subsystem" as use herein refers to a combination of elements that control the speed of the trolley when the trolley is in a falling orientation. The speed retarding subsystem comprises a speed control track located along, beside, on the surface of, or within, the guide rail, and a speed controller located in the trolley body. The speed controller engages or interacts with the speed control track when the trolley is the falling orientation.

A "speed controller" as used herein refers to an element or a combination of elements that are a part of the trolley body that engage or interact with the speed control track. The speed controller may include one or more than one magnet, a pre-tensioned wheel, a pre tensioned gear wheel, one or more than one on-set wheel, one or more than one off-set wheel (i.e. the axel is off the center of rotation of the wheel), a wave-like surface of the trolley body, or a combination thereof.

A "speed control track" as used herein refers to a track that is located along, beside, on the surface of, or within, the guide rail. The speed control track may comprise a flat surface, a toothed (gear) surface, a wave-like surface, a conductive surface, a conductive body, or a combination thereof. In some examples described herein the speed control track and the background speed control track may be the same element.

Figure 2A:
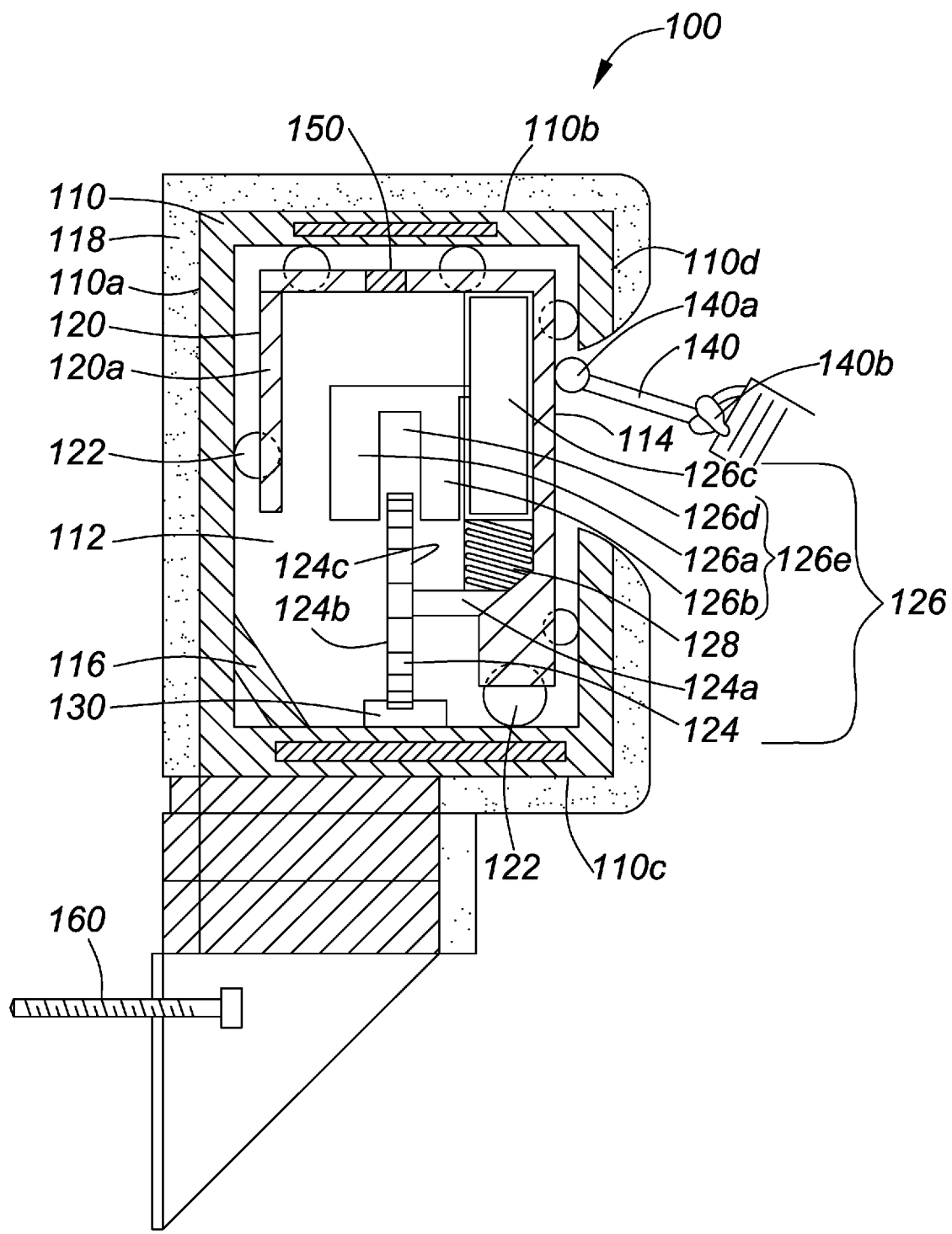
FIG. 2A shows a cross-sectional side view of an example of a fall control system as described herein.
Figure 2B:
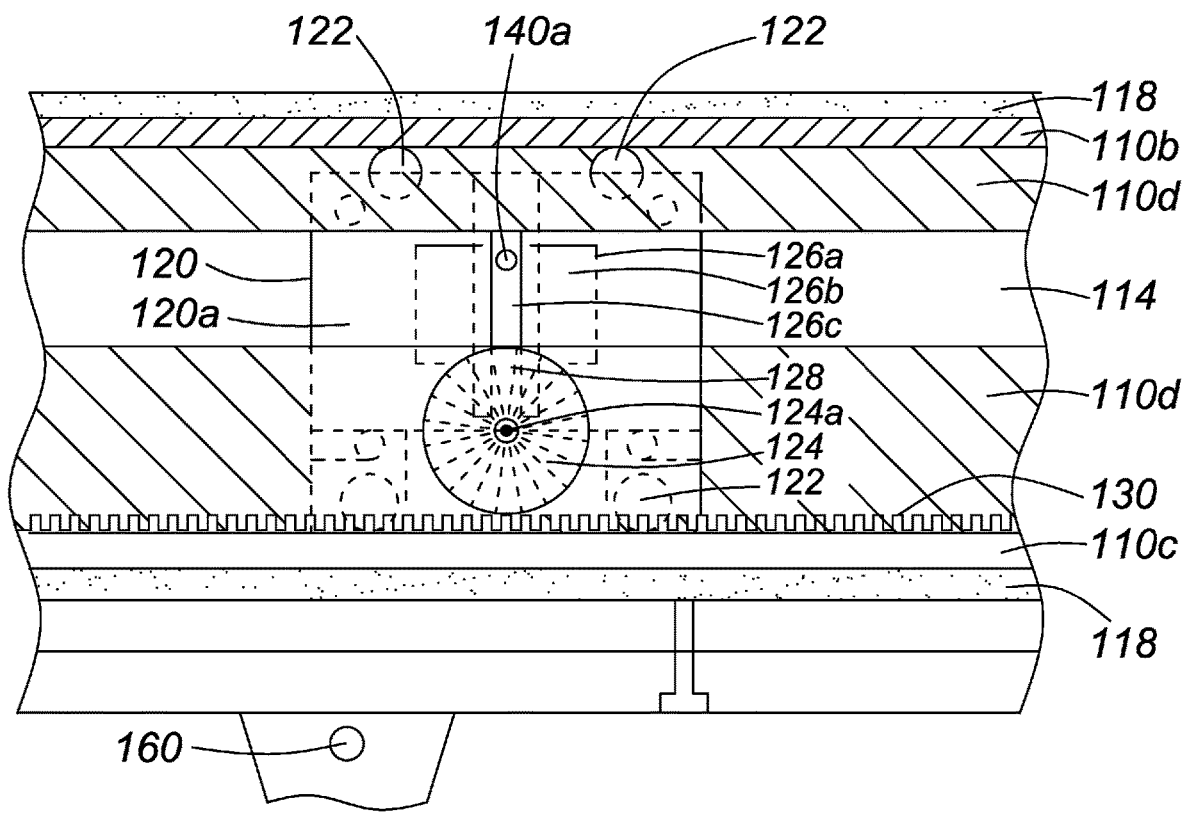
FIG. 2B shows a front view of the fall control system of FIG. 2A. In this example, the fall control system comprises an eddy current brake speed control system. The eddy current brake speed control system comprising a pair of magnetic arms and a conductive gear wheel rotatable therebetween.

Referring to FIGS. 2A and 2B, there is provided an example of a fall control system 100 comprising an elongate guide rail 110, a trolley 120 for moving along an elongate guide rail 110, and an adjustable length tether 140 that passes through an opening in the trolley 120 and couples to support 126c, of a speed control system 126. In this example, the guide rail has a general C shape when viewed in cross section.

The guide rail 110 comprises a mounting surface 110a, a top surface 110b, a base surface 110c, and a surface 110d that is opposite the mounting surface 110a. The surfaces 110a, 110b, 110c, and 110d of the guide rail 110 define a spatial volume 112. One or more reinforcing supports 116 for connecting a surface 110a, 110b, 110c, or 110d to an adjacent surface (e.g. the mounting surface 110a and the base surface 110c as depicted in FIG. 2A) may be provided for improving the structural integrity of the guide rail 110. The outer surface of the guide rail 110 may also be surrounded with a protective cover 118, for example, but not limited to, a metallic cover, high density foam, or a plastic rail cover. An elongate opening 114 is defined within the surface 110d of the guide rail 110 and defines the C-shape of the guide rail. The opening 114 extends along a length, and an elongate axis, of the guide rail 110.

The guide rail 110 may be manufactured of any material suitable in the art, for example, but not limited to, a suitable metal, aluminum, an alloy, or a resilient polymeric material, and manufactured in a manner that when installed to a weight bearing surface, the guide rail can support a weight capacity of a person that may be attached to the guide rail, for example, a person with a weight of from about 20 (10 kg) to about 400 pounds (185 kg), or any weight therebetween.

The guide rail 100 may be formed as one continuous rail, or by a plurality of guide rail sections (not shown) coupled together. The guide rail 100 may be linear or curved so that they may be fitted against a bearing surface, for example a wall, a ceiling, support posts, wall studs, rafters or overhead beams, within a stair well, a room, a hall or passageway. Where a plurality of guide rail sections (not shown) are coupled together to form the guide rail 110, the plurality of guide rail sections are coupled together as would be known in the art, for example, but not limited to, interlocking sections, snap-fit sections, friction-fit sections, or the sections may be attached using screws, bolts, rivets, welding, solvents, compression clips and the like, or a combination thereof. In practice, the mounting surface 110a of the guide rail 110 is mounted onto a weight bearing surface (not shown; e.g. a wall, ceiling, post, rafter, stud and the like) by any suitable attachment or fastener 160 known in the art, for example, but not limited to, wall screws lag bolts, bolts, anchor bolts, expansion plugs, expansion anchors, expansion bolts.

The guide rail 110 may also comprise a speed-control track 130 that is formed along with, or attached to, the guide rail 110. The speed control track 130 extends along the length, and the elongate axis of, the guide rail 110. In this example the background speed control track and the speed control track are the same element.

If the speed control track 130 is formed separately from the guide rail 110, then it may be attached to the guide rail 110 using any suitable attachment for example but not limited to screws, bolts, rivets, snap-locks, clips, welding, solvents and the like, or a combination thereof of these devices. If the speed control track 130 is formed separately from the guide rail 110, then it may be formed as one continuous track, or by a plurality of speed-control track sections (not shown) that are coupled together in a similar manner as sections of the guide rail 110 described above. For example, the sections mat be coupled together using interlocking sections, snap-fit sections, friction-fit sections, or the sections may be attached using screws, bolts, rivets, welding, solvents, compression clips and the like, or a combination thereof.

The trolley 120 comprises a trolley body 120a and a speed control system 126 that is coupled to the trolley body 120a. An adjustable length tether 140 is attached to support 126c of the speed control system 126. Trolley 120 is disposed within the spatial volume 112, of the guide rail 110, and contacts inner surfaces 110a, 110b, 110c, and 110d of the guide rail through one or more rolling elements 122, or through a low resistance contact surface, for example, the outer surface of the trolley body 120a may be made from a low resistance material, for example, TEFLON® (polytetrafluoroethylene, PTFE) or other polymer as would be known in the art that permits the trolley 120 to easily slide within the guide rail 110.

The rolling elements 122 are attached to the trolley 120 in a rotating relationship, and they support the trolley 120 within the guide rail 110. Motion of the trolley 120 relative to, and within, the guide rail 110 causes the one or more rolling elements 122 to roll therebetween with preferably low rolling resistance and minimal sliding. Rolling elements 122 may include, but are not limited to, train wheels, heavy duty ball transfers, flying saucer ball transfers (e.g. Hudson Hauler or Hudson Super Mover, from Hudson Bearings), castor bearing, a roller-bearing, a needle bearing, cylindrical roller, roller ball bearing, and the like. If desired, the roller element may be made of a non-magnetic material. Examples of a non-magnetic rolling element include elements made from resilient polymeric materials, carbon reinforced polymers, carbon graphite, or roller elements that comprises austenite, and the like.

The trolley 120 may be manufactured of any material suitable in the art, for example, but not limited to, a suitable metal, alloy, resilient polymeric material, epoxy resin, fibreglass cloth-fibreglass resin composition, carbon-fibre-fibreglass resin composition, fibreglass cloth-epoxy resin composition, carbon fibre cloth epoxy resin composition, and manufactured in a manner that can support a weight capacity of a person that may be attached to the trolley 120, for example, a person with a weight of from about 20 (10 kg) to about 400 pounds (185 kg), or any weight therebetween. Preferably, the material with which the trolley 120 is manufactured is not conductive.

The speed control system, collectively shown as 126 in FIG. 2A, comprises a conductive gear wheel 124, a speed controller 126e, magnetic arms 126a, 126b, support 126c and retainer 128. The conductive gear wheel 124 is coupled to the trolley body 120a by axle 124a, and engages and rotates along the speed-control track 130. The conductive gear wheel 124 is made of any conductive material, for example but not limited to, metal, steel, copper, aluminum, nickel, tungsten, zinc, iron, tin, titanium, stainless steel, nichrome, or an alloy of these metals. The conductive gear wheel 124 is optionally pre-tensioned as is known in the art. By pre-tensioned it is meant that the speed of rotation of the conductive gear wheel 124 along speed-control track 130 is limited to a pre-determined typical speed for the average user, thereby controlling the speed at which the trolley 120 moves along the guide rail 110. In this example, the background speed control system and the speed retarding subsystem may share the same components. As explained below, the relative position of the components within the trolley body may determine which subsystem is actively engaged to control the speed of movement of trolley 120 along guide rail 110.

Pre-tensioning of the conductive gear wheel may be achieved by any known mechanism, for example, through the use of a governor, an additional gear mechanism, use of an inertia flywheel, tensioned bearings, and the like. Pre-tensioning may also be determined by using a "first position" or "biased position" of the eddy-current brake as described below. In this manner, the conductive gear wheel 124 is characterized as having two rotational speed ranges, the first speed range may be set by pre-tensioning of the conductive gear wheel 124 (background speed control system), and the second speed range is determined by the degree of engagement of the eddy-current brake (speed retarding subsystem). As an alternate or additional option, the first speed range can also be set by the eddy-current brake having a starting position that overlaps with the wheel thereby functioning as a background speed control system. When the eddy current brake is partially or fully engaged, the magnetic arms drop down further over the gear wheel, causing further slowing (speed retarding subsystem). The first speed range is set to approximate the range in walking speeds of a person, so that the trolley 120 moves along the guide rail 110, at a speed that is less that the expected maximum fall velocity of the user in the event of a fall. For example which is not to be considered limiting, the first maximum speed may be less that the expected maximum fall velocity of the user in the event of a fall. For example which is not to be considered limiting, the first maximum speed may be from about 0.5 to about 5 km/hr, or any amount therebetween, or from about 0.5, 1.0, 1.5, 2.0, 2.5, 3.0, 3.5, 4.0, 4.5, 5.0 km/hr, or any amount therebetween. The second speed range, is less than that of the first speed range, and it is achieved when the eddy-current brake is partially or fully engaged and the components are acting as a speed retarding subsystem. The eddy-current brake is partially or fully engaged by a person that trips or loses their footing and falls while walking along a flat or inclined surface, or while ascending or descending stairs. Therefore, the second speed range of trolley 120 as it moves along the guide rail 110, helps control the falling speed of the person.

By "first maximum speed" or "maximum walking speed" as used herein, refers to the typical speed achieved by the average user (and when attached by tether to the trolley, the speed of the trolley), of the fall control system described herein. As would be evident to one of skill, the maximum walking speed will vary depending on the age, weight, and physical impairments or abilities of the user.

By "maximum fall speed" as used herein, refers to the typical speed of the trolley travelling along the elongate axis when all the components of the speed control system are activated by the average user in the event of a fall. As would be evident to one of skill, the maximum fall speed will vary depending on certain factors, such as the angle of guide rail relative to a horizontal plane and the weight of the user. The maximum fall speed does not refer to the fall speed of the user attached to the trolley just before or after the trolley reaches maximum fall speed. It is expected that the speed at which the user travels in the event of a fall, just before or after the trolley attains maximum fall speed, will initially be greater than the maximum fall speed of the trolley, but the speed will be considerably reduced (slowed) by the slower trolley speed and the elastic properties of the tether attaching the user to the trolley prior to the user contacting the steps or level surface.

The speed controller generally comprises the elements shown as 126e in FIG. 2A, comprises a pair of magnetic arms 126a, 126b. The magnetic arms 126a and 126b may be made of any magnetic material, for example a paramagnetic, ferromagnetic material, or a combination thereof, a rare earth magnet, or a neodymium magnet. Magnetic arms 126a, 126b of the speed controller 126e are for interacting with the conductive gear wheel 124 to form an eddy-current brake which is described in more detail below. The speed controller 126e is also attached to a support 126c. Support 126c includes an attachment point for attaching the tether 140 to the speed retarding subsystem (and the background speed control subsystem) 126.

The retainer 128, is located between the support 126c and the trolley body 120a, the retainer 128 is for providing a retaining or biasing force, that biases the speed controller 126e away from the conductive gear wheel 124. The retainer may comprise, for example but not limited to, a spring, compressible rubber, or other biasing device. The biasing force of the retainer 128 is of sufficient force to counteract any minor pulls or tugs that a person may apply against the support 126c via tether 140 as the trolley 120 moves along the guiderail 110. However, if a force is applied to support 126c the exceeds a threshold force of the retainer, then the retainer is compressed and the support 126c is moved from its biased position (first position) shown in FIG. 2A, towards a compressed position (second position; not shown) that compresses the retainer and moves the magnetic arms 126a and 126b, that are attached to the support 126c, to engage an increased surface area of conductive gear wheel 124. Preferably, the retainer 128 has a biasing force of about 20 to about 35 pounds/inch, or any amount therebetween. However, the biasing force of the retainer 128 may be of any suitable magnitude, for example, but not limited to, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50 pounds/inch, or any amount therebetween.

The pair of magnetic arms 126a, 126b are positioned so that they overlap a first surface 124b and a second surface 124c of the conductive gear wheel 124, and form a channel 126d therebetween. The conductive gear wheel 124 rotates within channel 126d. The range of overlap between the pair of magnetic arms 126a, 126b, and the conductive gear wheel 124 extends from a first, or biased position through to a second, compressed position. It is to be understood that the overlap between the magnetic arms 126a and 126b and the conductive gear 124 may be at any position between the first and second positions, and depends upon the force used to compress the retainer 128.

At the first position (or biased position, travelling orientation), the speed controller 126e is maximally biased away from the conductive gear wheel 124 by the retaining force exerted by the retainer 128 against the support 126c. At the first position, the pair magnetic arms 126a, 126b of the speed controller 126e and the conductive gear wheel 124 exhibit no, or a minimal overlap. The amount of overlap between the pair of magnetic arms 126a, 126b and the conductive gear wheel 124 at the first position may be set to create an electromagnetic drag force which limits the rotation speed of the conductive gear wheel 124 along the speed-control track 130 to a first maximum speed so that the speed controller and gear wheel act as a background speed control system (i.e. a background eddy current brake). By setting the first position to provide an overlap of the magnetic arms with respect to the conductive gear wheel 124, a pre-tensioning the conductive gear wheel may be established. That is, the spatial relationship between the pair of magnetic arms 126a, 126b and the conductive gear wheel 124, and the rotation of the conductive gear wheel 124 through the channel 126d, creates a corresponding electromagnetic drag force that prevents the conductive gear wheel 124 from rotating beyond the first maximum speed of the first speed range of the trolley 120 along guide rail 110 (e.g. a maximum walking speed). As contemplated in this embodiment, the first maximum speed of the movement of the trolley 120 along guide rail 110, in the travelling orientation, is less that the expected maximum fall velocity of the user in the event of a fall. For example which is not to be considered limiting, the first maximum speed may be from about 12 to about 14 inches/second, or any amount therebetween. However, in other embodiments the first maximum speed of the movement of the trolley 120 along guide rail 110 may be adjusted to any desired speed, provided the speed is less that the expected maximum fall velocity of the user in the event of a fall. For example which is not to be considered limiting, the first maximum speed may be about 5, 6, 7, 8, 9, 10, 11, 12, 13, 14, 15, 16, 17, 18, 19, 20 inches/second, or from 0.5 to 5 km/hr, or any amount therebetween, or from about 0.5, 1.0, 1.5, 2.0, 2.5, 3.0, 3.5, 4.0, 4.5, 5.0 km/hr, or any amount therebetween, in order to approximate the range in walking speeds of a person.

In an embodiment wherein the conductive gear wheel 124 is pre-tensioned, for example using a governor, an additional gear mechanism, use of an inertia flywheel, tensioned bearings, and the like, the pair of magnetic arms 126a, 126b may or may not overlap the conductive gear wheel 124 at the first position. In this arrangement (i.e. magnets that may or may not overlap the conductive gear wheel) the pre-tensioned conductive gear wheel is functioning as part of the part of the background speed control system.

The second speed range, in a falling orientation, of the speed controller 126e is determined by the degree of engagement of the magnetic arms 126a and 126b of the speed controller 126e, with the conductive gear wheel 124, thereby engaging the "eddy-current brake". In the second position, when the speed retarding subsystem is fully engaged the speed controller 126e is minimally biased away from the conductive gear wheel 124. That is, the retaining force exerted by the retainer 128 against the support 126c, to bias the speed controller magnet 126a, 126b, towards the first position, is completely overcome. In the engaged or second position, the pair of magnetic arms 126a, 126b and the conductive gear wheel 124 are overlapped and the speed retarding subsystem is activated. The amount of overlap between the pair of magnetic arms 126a, 126b and the conductive gear wheel 124 at the second position creates an electromagnetic drag force which limits the rotation speed of the conductive gear wheel 124 along the speed-control track 130 to a second maximum speed (e.g. a fall speed less than the expected fall speed without the speed controller) of the movement of the trolley 120 along guide rail 110.

When fully engaged in the falling orientation, the second maximum speed of the trolley 120 as it moves along guide rail 110, is from about 3 to about 6 inches/second, or any amount therebetween. The second maximum speed of the movement of the trolley 120 along guide rail 110 may be adjusted to any desired speed, for example, but not limited to 1, 2, 3, 4, 5, 6, 7, 8, 9, 10 inches/second, or any amount therebetween. The second speed range, is achieved when the eddy-current brake may be partially or fully engaged by a person that trips or loses their footing and falls while walking along a flat or inclines surface, or while ascending or descending stairs. The second speed range thereby helps to control the falling speed of the person. It is to be understood that the second speed range will vary depending upon the degree of engagement between the speed controller 126e and the conductive gear wheel 124. The values stated above for the second maximum speed are for a fully engaged eddy-current brake. However, a partially engaged eddy current brake may result in movement of the trolley 120 along the guide rail 110 anywhere from 5 to about 20 inches/second or any amount therebetween for example, 5, 6, 7, 8, 9, 10, 11, 12, 13, 14, 15, 16, 17, 18, 19, 20 inches/second, or any amount therebetween (the first speed range; travelling orientation), to about 1 to about 10 inches/second, for example, from about 1, 2, 3, 4, 5, 6, 7, 8, 9, 10 inches/second, or any amount therebetween (the second speed range).

The speed control system 126 does not comprise a brake that brings the trolley 120 to a complete stop during its travels along the guide rail 110. Therefore, the first maximum speed of the trolley 120 is greater than the second maximum speed of the trolley 120, and neither the first maximum speed nor the second maximum speed is zero. In the arrangement of the speed control system 126 described herein, both the first maximum speed and the second maximum speed are greater than zero, and the trolley 120 is never fully arrested, even when the speed controller 126e is displaced fully in the second position. The conductive gear wheel 124 is rotatable in the channel 126d between the pair of magnetic arms 126a, 126b, and the conductive gear wheel 124 moves along the speed-control track 130 regardless of whether the speed controller 126e is positioned at the first position, the second position, or any position therebetween.

An adjustable length tether 140 is attached to the trolley 120 at a first end 140a, and affixed to a person either directly, or via a harness or a transfer belt (also see FIGS. 7A to 7E) at a distal second end 140b. A non-limiting example of a suitable transfer belt is a SafteySure® Transfer Belt (available from health suppliers, for example, Healthcare Solutions, MTS Medical Supply, or SCAN Medical). An alternate transfer belt with several useful unique features is illustrated in FIGS. 7A to 7E and described herein. As contemplated in this embodiment, the tether 140 is couplable to the support 126c through a slot (not shown) that is formed in the part of the trolley body 120a that is adjacent to the support 126c. In order to permit movement of the support 126c in response to a pull on the tether 140, the slot is oriented in the same plane as that of the movement of the speed controller 126e from the first position to the second position. The tether 140 may be an elasticized cord or belt, flexible cord or belt, non-elastic flexible cord or belt, a bungee-type cord, or a combination thereof, and may be of any length suitable for attachment to the person and the trolley 120 to permit movement along the guide rail 110.

In an example of a use of the fall control system 100, a tether 140 is coupled to a support 126c at first end 140a, and coupled to a person at second end 140b. When the person is walking, the person exerts a first pulling force on the speed controller 126e (at support 126c), through the tether 140. The first pulling force is sufficient to move the trolley 120 along the guide rail 110, but insufficient to displace the speed controller 126 from the first position. In other words, the first pulling force exerted on the speed controller 126e is not sufficient to overcome the retaining force of the retainer 128. Owing to the pre-tensioning of conductive gear wheel 124, for example, using electromagnetic drag force created as a result of the conductive gear wheel 124 rotating through the channel 126d, the person would be permitted to walk or move only as quickly as the first maximum speed.

When the person falls, the person exerts a downward pulling force on the support 126c and speed controller 126e, through the tether 140, that is sufficient to both move the trolley 120 along the guide rail 110, and displace the speed controller 126e from the first position to the second position by overcoming the retaining force of the retainer 128. The overlap between the pair of magnetic arms 126a, 126b and the conductive gear wheel 124 increases, and as a result, increases the electromagnetic drag force created as the conductive gear wheel 124 rotates through the channel 126d. At the second position, or a partial second position, the trolley 120 therefore is permitted to move only as quickly as the second maximum speed, or a speed between the first and second maximum speed, respectively.

When the person has regained composure (e.g. stands back up and proceeds walking again), the downward pulling force against the retainer 128 is alleviated and the retainer 128, displaces or the speed controller 126e from the second position to the first position, at which point the person is permitted again to proceed at a walking speed that is no quicker than the first maximum speed. For example, the person may proceed at a walking speed that may be less than 20 inches per second, although greater walking speeds are possible. Alternatively, if desired, the person may crawl down the stairs, or along a surface, while still attached to the trolley, and the movement of the trolley would not substantially impede their movement. As the minimum speed of the second position, when all speed control systems are activated, is never zero, the person can crawl up or down the stairs, or along a surface, even when the speed controller is fully engaged. This may be important as a disabled individual, that is unable to crawl up or down the stairs (as a result of a fall control system that impedes all movement), could potentially become stuck on stairs or floor for several hours or days until help arrived.

When the fall control system 100 is not in use, the trolley 120 may be secured in place at one end of guide rail 110 by coupling a contact 150 to a corresponding component (not shown) located at either end of the guide rail 110. For example, the trolley 120 may be secured in place by any suitable device known in the art, including but not limited to a magnet, a snap clip, a lever, a clasp, a clip, a cord, a hook, and the like.

Figure 3A:
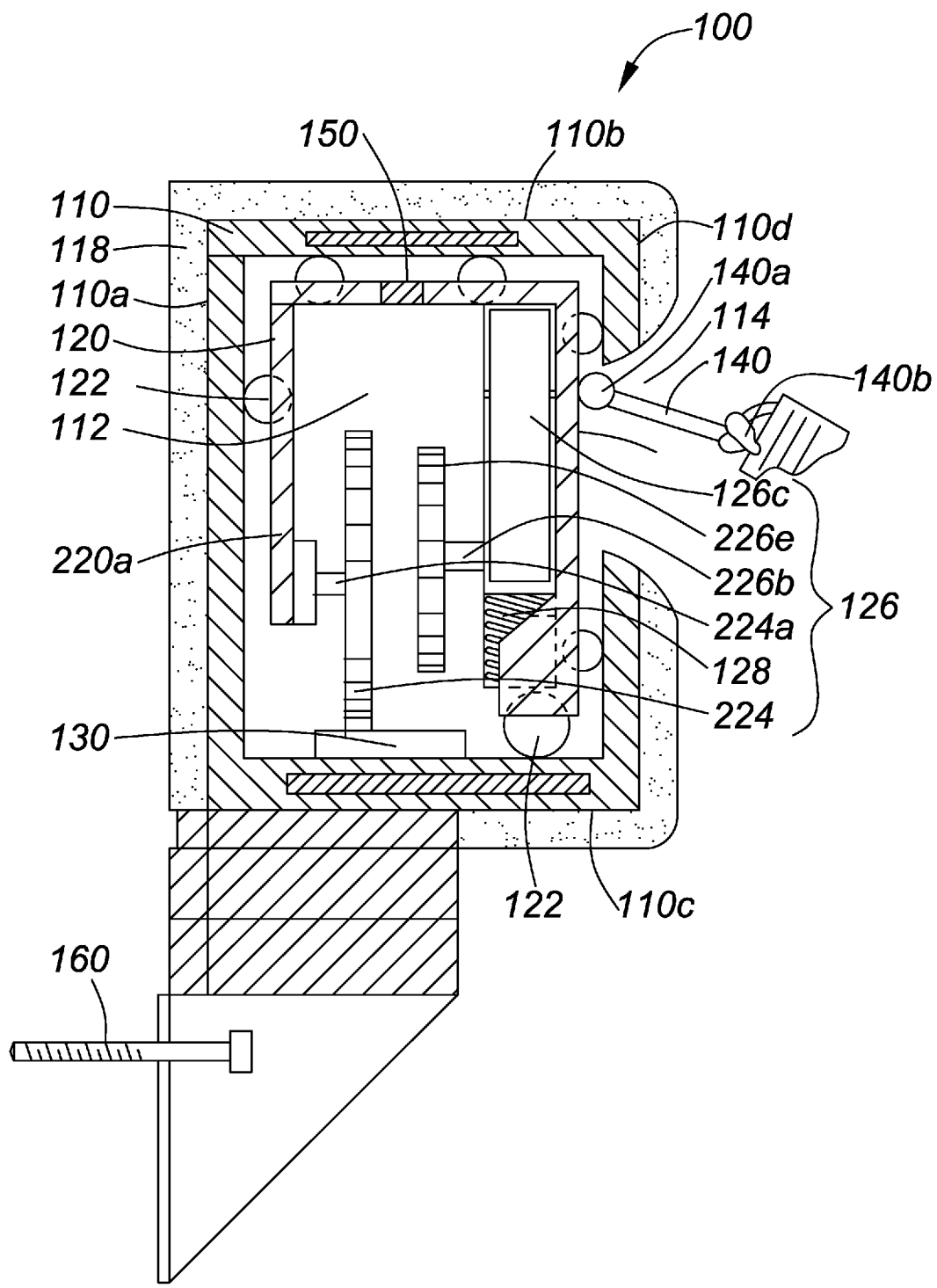
FIG. 3A shows a cross-sectional side view of an example of a fall control system as described herein. In this example, the fall control system comprises a speed control system. The speed control system comprises a first pre-tensioned gear wheel (background speed control system) that is engaged to a speed-control track, and a second pre-tensioned gear wheel (speed retarding subsystem) that is engageable to the speed-control track (rail)
Figure 3B:
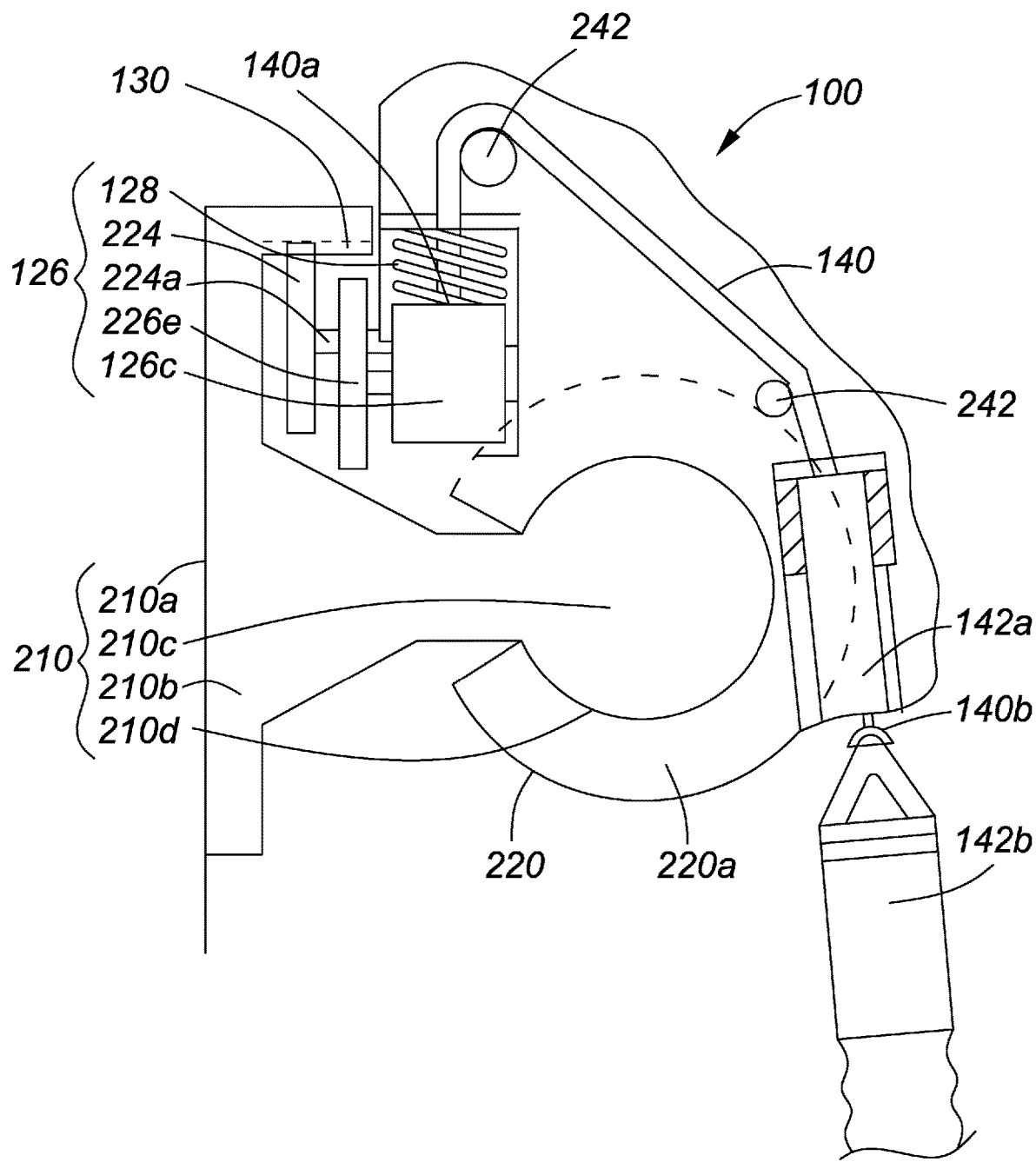
FIG. 3B shows a cross-sectional side view of an alternate example of a fall control system comprising a circular rail and trolley interface, as described herein. In this example, the fall control system comprises a speed control system. The speed control system comprises a first pre-tensioned gear wheel (background speed control system) that is engaged to a speed-control track, and a second pre-tensioned gear wheel (speed retarding system) that is engageable to the speed-control track (rail).

Referring to FIGS. 3A and 3B, there are provided additional examples of a fall control system 100 of the present invention, characterized in that both of these fall control systems have an alternate speed control system 126 when compared to the embodiment described in FIGS. 2A and 2B. However, several of the components of the fall control systems described below and shown in FIGS. 3A and 3B are similar or analogous to those described above with reference to FIGS. 2A and 2B, and include for example, a guide rail 110 (FIG. 3A) or 210 (FIG. 3B), a trolley 120 (FIG. 3A), or 220 (FIG. 3B), for moving along the guide rail 110 or 210, and an adjustable length tether 140 that couples to a speed control system 126 therein.

The C-shaped guide rail 110 in FIG. 3A, comprises a mounting surface 110a, a top surface 110b, a base surface 110c, and a surface 110d that is opposite the mounting surface 110a. The surfaces 110a, 110b, 110c, and 110d define a spatial volume 112 (see FIG. 3A). The outer surface of the guide rail 110 may also be surrounded with a protective cover 118. An opening 114 is provided through the surface 110d, the opening 114 extending along a length of the guide rail 110.

As noted above in respect to the fall control system of FIG. 2A, the guide rail 110 may be manufactured of any material suitable in the art, for example, but not limited to, a suitable metal, aluminum, an alloy, or a resilient polymeric material, and manufactured in a manner that when installed to a weight bearing surface, the guide rail can support a weight capacity of a person that may be attached to the guide rail, for example, a person with a weight of from about 20 (10 kg) to about 400 pounds (185 kg), or any weight therebetween.

The guide rail 110 may be formed as one continuous rail, or by a plurality of guide rail sections (not shown) coupled together. The guide rail 110 may be linear or curved so that they may be fitted against a bearing surface, for example a wall, a ceiling, support posts, wall studs, rafters or overhead beams, within a stair well, a room, a hall or passageway. Where a plurality of guide rail sections (not shown) are coupled together to form the guide rail 110, the plurality of guide rail sections are coupled together as would be known in the art, for example, but not limited to, interlocking sections, snap-fit sections, friction-fit sections, or the sections may be attached using screws, bolts, rivets, welding, solvents, compression clips and the like, or a combination thereof. In practice, the mounting surface 110a of the guide rail 110 is mounted onto a weight bearing surface (not shown; e.g. a wall, ceiling, post, rafter, stud and the like) by any suitable attachment or fastener 160 known in the art, for example, but not limited to, wall screws lag bolts, bolts, anchor bolts, expansion plugs, expansion anchors, expansion bolts.

The guide rail 110 also comprises a speed-control track 130 that is formed along with, or attached to, the guide rail 110. The speed control track 130 extends along the length, and the elongate axis of, the guide rail 110. In this example the background speed control track and the speed control track are the same element.

If the speed control track 130 is formed separately from the guide rail 110, then it may be attached to the guide rail 110 using any suitable attachment for example but not limited to screws, bolts, rivets, snap-locks, clips, welding, solvents and the like, or a combination thereof of these devices. If the speed control track 130 is formed separately from the guide rail 110, then it may be formed as one continuous track, or by a plurality of speed-control track sections (not shown) that are coupled together in a similar manner as sections of the guide rail 110 described above. For example, the sections may be coupled together using interlocking sections, snap-fit sections, friction-fit sections, or the sections may be attached using screws, bolts, rivets, welding, solvents, compression clips and the like, or a combination thereof.

The trolley 120 comprises a trolley body 120a and a speed control system 126 that is coupled to the trolley body 120a. An adjustable length tether 140 is attached to support 126c of the speed control system 126. Trolley 120 is disposed within the spatial volume 112 (see FIG. 3A), of the guide rail 110, and contacts inner surfaces 110a, 110b, 110c, and 110d of the guide rail through one or more rolling elements 122, or through a low resistance contact surface, for example, the outer surface of the trolley body 120a may be made from a low resistance material, for example, TEFLON® (polytetrafluoroethylene, PTFE) or other polymer as would be known in the art that permits the trolley 120 to easily slide within the guide rail 110.

The rolling elements 122 are attached to the trolley 120 in a rotating relationship, and they support the trolley 120 within the guide rail 110. Motion of the trolley 120 relative to, and within, the guide rail 110 causes the one or more rolling elements 122 to roll therebetween with preferably low rolling resistance and minimal sliding. Rolling elements 122 may include, but are not limited to, train wheels, heavy duty ball transfers, flying saucer ball transfers (e.g. Hudson Hauler or Hudson Super Mover, from Hudson Bearings), a roller-bearing, a needle bearing, cylindrical roller, roller ball bearing, and the like. If desired, the roller element may be made of a non-magnetic material. Examples of a non-magnetic rolling element include elements made from resilient polymeric materials, carbon reinforced polymers, carbon graphite, or roller elements that comprises austenite, and the like.

The trolley 120 may be manufactured of any material suitable in the art, for example, but not limited to, a suitable metal, alloy, resilient polymeric material, epoxy resin, fibreglass cloth-fibreglass resin composition, carbon-fibre-fibreglass resin composition, fibreglass cloth-epoxy resin composition, carbon fibre cloth epoxy resin composition, and manufactured in a manner that can support a weight capacity of a person that may be attached to the trolley 120, for example, a person with a weight of from about 20 (10 kg) to about 400 pounds (185 kg), or any weight therebetween. Preferably, the material with which the trolley 120 is manufactured is not conductive.

With reference to FIG. 3B, the guide rail 210 comprises body of the guide rail 210b and 210c, a mounting surface, or base 210a, and a curved outer surface 210d that interfaces with trolley 220. The guide rail 210 further comprises a speed-control track 130 coupled to a surface of the guide rail 210. In this example the background speed control track and the speed control track are the same element.

The guide rail 210 may be made from steel, stainless steel, aluminum, anodized aluminum, or similar material. The outer surface 210d of guide rail 210 may be coated in a ceramic, or other low friction material to facilitate movement of trolley 220 along the guide rail 210. An example, that is not to be considered limiting, of such a rail-trolley arrangement is a linear bearing system using round shaft technology from PBC Linear (Pacific Bearing Company), for example, Simplicity® 60 Plus® Shafting, and accompanying bearing. The bearing component may be modified to include the components of the trolley described herein.

The trolley 220 comprises a trolley body 220a and a speed control system 126 that is coupled to the trolley body 220a. An adjustable length tether 140 is attached to support 126c of the speed control system 126. The tether 140 may pass over guides 242 within the trolley 220. An inner surface of trolley 220 slides along outer surface 110d of guide rail 110 through a low resistance contact surface, for example, the inner surface of the trolley body 220 may be made from a low resistance material, for example, TEFLON® (polytetrafluoroethylene, PTFE) or other polymer as would be known in the art that permits the trolley 220 to easily slide along guide rail 210. The trolley 220 may also move along guide 210c using rolling elements as shown for example in FIGS. 8A, 9A, 10A, 11A.

The trolley 220 may be manufactured of any material suitable in the art, for example, but not limited to, a suitable metal, alloy, resilient polymeric material, epoxy resin, fibreglass cloth-fibreglass resin composition, carbon-fibre-fibreglass resin composition, fibreglass cloth-epoxy resin composition, carbon fibre cloth epoxy resin composition, and manufactured in a manner that can support a weight capacity of a person that may be attached to the trolley 120, for example, a person with a weight of from about 20 (10 kg) to about 400 pounds (185 kg), or any weight therebetween.

The speed control system 126 shown in the examples of the fall control system 100 presented in FIGS. 3A and 3B comprises: a pre-tensioned first gear wheel (or a background pre-tensioned gear wheel; an on-set wheel) 224 that is coupled to the trolley body 220*a* by axle 224*a*, the background pre-tensioned gear wheel 224 (background speed control system) for engaging and rotating along the speed-control track 130; a speed controller assembly comprising a support 126*c* and a pre-tensioned second gear wheel an on-set second wheel) 226*e* coupled to the support 126*c* via an axle 226*b*; and a retainer 128 disposed between the support 126*c* and the trolley body 120 (FIG. 3A) or 220 (FIG. 3B; speed retarding subsystem). The retainer 128 provides a biasing force that biases the second gear wheel 226*e* of the speed controller 126, away from the speed-control track 130. In this example, the background speed control track and the speed control track are the same.

The first gear wheel 224 of the background speed control system, and the second gear wheel 226*e* of the speed retarding subsystem, are pre-tensioned to provide different speed ranges of the trolley 120 or 220, as it moves along the guide rail 110 or 210, using methods known to one of skill in the art. Pre-tensioning of the first 224 and second 226*e* gear wheel may be achieved by any known mechanism, for example, through the use of a governor, an additional gear mechanism, an inertia flywheel, tensioned bearings, and the like. The tension on the first, the second, or both the first and the second gear wheels can be custom set by means of a dial, or screw, or the like, allowing a customized pre-set tension of the gear wheels that matches the approximate weight of the user.

In this manner, the speed control system 126 is characterized as having two rotational speed ranges, the first speed range of the background speed control system (travelling orientation) is set by pre-tensioning of the first (background) gear wheel 224, and the second speed range of the speed retarding subsystem, is determined by pre-tensioning of the second gear wheel 226*e*. The first speed range is set to approximate the range in walking speeds of a person, so that the trolley 120 or 220, moves along the guide rail 110 or 210, and is less that the expected maximum fall velocity of the user in the event of a fall. For example which is not to be considered limiting, the first maximum speed may be from 0.5 to 5 km/hr, or any amount therebetween. The second speed range (falling orientation), is less than that of the first speed range, and it is achieved when the second gear wheel 226*e* is engaged with speed control track 130. The second gear wheel 226*e* becomes engaged with speed control track 130 when a person attached to the trolley trips or loses their footing and falls while walking along a flat or inclined surface, or while ascending or descending stairs. Therefore, the speed range of trolley 120 as it moves along the guide rail 110 is determined by the pre-tensioned second gear wheel, and helps control the falling speed of the person.

As contemplated in this example, the first gear wheel 224 of the background speed control system is in constant contact with the speed-control track 130, and rotates along the speed-control track 130 when the trolley 120, or 220, is moving along the guide rail 110 or 210. The first gear wheel 224 is pre-tensioned to an amount such that the speed at which the first gear wheel 224 may rotate along the speed-control track 130 is limited to a maximum speed of the movement of the trolley 120 or 220 along guide rail 110 or 210 is less that the expected maximum fall velocity of the user in the event of a fall. For example which is not to be considered limiting, the first maximum speed may be from about 12 to about 14 inches/second, or any amount therebetween. However, in other embodiments the first maximum speed of the movement of the trolley 120 or 220 along guide rail 110 or 210 may be adjusted to any desired speed, for example, but not limited to, 5, 6, 7, 8, 9, 10, 11, 12, 13, 14, 15, 16, 17, 18, 19, 20 inches/second, or from 0.5 to 5 km/hr, or any amount therebetween, for example, from about 0.5, 1.0, 1.5, 2.0, 2.5, 3.0, 3.5, 4.0, 4.5, 5.0 km/hr, or any amount therebetween, in order to approximate the range in walking speeds of a person.

Similarly, the second gear wheel 226*e* of the speed retarding subsystem is preferably pre-tensioned to an amount such that the second maximum speed of the trolley 120 or 220 as it moves along guide rail 110 or 210, is from about 4 to about 6 inches/second, or any amount therebetween. The second maximum speed of the movement of the trolley 120 or 220 along guide rail 110 or 210 may be adjusted to any desired speed, for example, but not limited to 1, 2, 3, 4, 5, 6, 7, 8, 9, 10 inches/second, or any amount therebetween.

The support 126*c*, retainer 128, axel of second gear wheel 226*b* and the second gear wheel 226*e*, of speed controller 126 are collectively moveable between a first position and a second position. At the first position (shown in FIGS. 3A and 3B), the second gear wheel 226*e* is maximally biased away, and disengaged with the speed-control track 130 by the retaining force exerted by the retainer 128 against the support 126*c* of the speed controller. In this position, the second gear wheel 226*e* is not engaged with the speed-control track 130 when the speed controller 126 and support 126*c* are located at the first position. In the second position, the retaining force exerted by the retainer 128 on the support 126*c* of the speed controller 126 has been overcome by an external pulling force, for example a pull from tether 140 when the user falls (fall event) in any direction. At the second position, the second gear wheel 226*e* of the speed retarding subsystem is brought into rotational engagement with the speed-control track 130. Upon engagement of the second gear wheel 226*e* with the speed-control track 130, the speed at which the trolley 120 or 220, moves relative to the guide rail 110 is limited to the speed at which the pre-tensioned second gear wheel 226*e* rotates along the speed-control track 230 (i.e. the second speed).

In FIG. 3A, the second gear wheel 226*e* of the speed controller 126 is depicted as engaging the speed-control track 130 during a fall event by moving down, towards the speed control track 130. The components of the fall control system may be re-configured, as would be apparent to a person skilled in the art, such that a second geared wheel 226*e* is pulled upwards, for example as shown in FIG. 3B, or to the side, or obliquely, to engage a speed-control track 130 during a fall event.

The speed control system 126 does not comprise a brake that brings the trolley 120 or 220 to a complete stop during its travels along the guide rail 110 or 210. Therefore, the first maximum speed of the trolley 120 or 220 is greater than the second maximum speed of the trolley 120 or 220, and neither the first maximum speed nor the second maximum speed is zero. In the arrangement of the speed control system 126 described herein, both the first maximum speed and the second maximum speed are greater than zero, and the trolley 120 or 220 is never fully arrested, even when the speed controller 126 is displaced fully in the second position.

An adjustable length tether 140 is attached to the support 126*c* of the trolley 120 or 220, at a first end 140*a*, and affixed to a belt or cord 140*b* for attachment to the user, either directly, or via a harness or a transfer belt (see FIGS. 7A to 7E). A non-limiting example of a belt that may be used is a SafteySure® Transfer Belt (available from health suppliers, for example, Healthcare Solutions, MTS Medical Supply, or SCAN Medical).

A customized transfer belt 50 is also described herein (see FIGS. 7A to 7E) which may be used with any of the fall control systems 100 described herein. Tether 140 (not shown in FIGS. 7A to 7E) may be attached to the transfer belt via attachment cable 60. This arrangement provides movement of tether 140 about a 30-45 degree radius on each side of the midline (FIG. 7C; anterior aspect of belt) to permit tether 140 to slide to either side (see FIGS. 7A and 7C), or remain midline, relative to the users body. Tether 140 may attached to cable 60 via a carabiner or other secure clip mechanism. For example, the carabiner may be spring-loaded to open easily when pushed and close automatically when released. Attachment cable 60 may be a coated cable, coated with rubber, vinyl, or a similar smooth material. The diameter of the cable itself (without any coating material) may be from about ¼ to about ½ inch. By permitting the sliding motion of tether 140 along attachment cable 60, the user can ambulate sideways facing the trolley and guide rail if desired. The cable 60 may be attached to belt 50 at attachment points 70, using for example D rings, by riveting the cable, or by stitching the cable to the belt.

The belt 50 may be removed from the user via buckle 52 (FIG. 7B), allowing it to dangle from tether 140 that is attached to the trolley. Then if the user decides to travel in the opposite direction, the user can put the transfer belt 50 back on without having to undo the tether 140 from the transfer belt 50. Should the user for some reason be unable to crawl up or down the stairs when attached to the trolley, the user can undo buckle 52 and release the user from belt 50.

The portion of belt 50 that is behind cable 60 may comprise a semi-rigid plastic support, or cable backing, 67 (FIGS. 7D and 7E), or other similar material, that facilitates movement of the tether 140 along cable 60 and that assist in reducing wear of the belt resulting from the sliding tether 140. Cable backing 67 may also prevent or lessen the chances of a "pinching effect" in the event of a fall if the cable 60 is pulled with a force perpendicular to the user.

Attachment cable 60 and rings 70 may also be partially covered with shield, or cable cover, 65 (FIGS. 7D and 7E) to reduce catching or snagging of cable 60 to objects when the belt is worn. For example, the cable cover may be an angled plastic sleeve. The cable cover is meant to deflect such objects away from getting caught up in attachment cable 60, but still allow attachment to the cable by a carabiner or other attachment mechanism. Shield, or cable cover 65 may be made of plastic or other suitable material that is flexible but partially covers cable 60 and rings 70.

The belt 50 may be padded 55, and have a width "X" (FIG. 7A) that is comfortable for use, for example width "X" may be from about 1 to about 5 inches or any amount therebetween. The belt may also comprise handles 75.

Therefore, a transfer belt is also provided herein. The transfer belt comprising, a padded belt for placement about a user's waist, an attachment cable fixed to the belt at a first and a second end and located along a forward-facing portion of the belt, the attachment cable for receiving a tether and providing side-to-side movement of the tether from the first end to the second end when the tether is attached to attachment cable, a cable backing attached to the belt and placed behind the belt attachment cable, the cable backing extending at least between the first and the second end, a cable cover attached to the padded belt below the attachment cable and comprising a free end protruding out from the belt and partly or fully overlapping the attachment cable, the cable cover extending at least between the first and the second end.

The adjustable length tether 140 may be an elasticized cord or belt, flexible cord or belt, non-elastic flexible cord or belt (for example made from nylon, a durable material or cable), an elastomeric cord, a bungee-type cord, or a combination thereof, and may be of any length suitable for attachment to the person and the trolley to permit movement along the guide rail 110. The tether may also be comprised of a flexible band (for example a cable or nylon band) that is attached to an elasticized cord (for example an elastomeric or bungee-type cord) that then attaches to the transfer belt being worn by the user.

During use of the fall control system 100, with a pulling force from the user that is insufficient to overcome the retaining force of the retainer 128, the trolley 220 moves along the guide rail 110 or 210 at a speed that is no greater than the first speed (first maximum speed, travelling orientation). During a fall event (falling orientation), a pulling force that is sufficient to overcome in part or in whole the retaining force of the retainer 128 is exerted through the tether 140 and on the speed controller 126. As a result, the speed controller 126 is displaced from the first position to the second position. In the examples shown in FIGS. 3A and 3B, in the second position, the second gear wheel 226*e* engages the speed-control track 130, and the speed of the trolley 120 or 220, to move along the guide rail 110 or 210 is limited to a speed that is no greater than the second speed (second maximum speed). By reducing the speed of the person from the first speed to the second speed during a fall event, the ground-impact speed is reduced, and the speed at which a person descends to the ground is controlled.

When the person has regained composure (e.g. stands back up and proceeds walking again), the downward pulling force against the retainer 128 is alleviated and the retainer 128 displaces the speed controller 126 from the second position to the first position, at which point the person is permitted again to proceed at a walking speed that is no quicker than the first maximum speed. Alternatively, if desired, the person may crawl up or down the stairs, or along a level surface, while still attached to the trolley, and the movement of the trolley would not impede their movement.

When the fall control system 100 is not in use, the trolley 120 or 220 may be secured in place at one end of guide rail 110 or 210 by coupling a contact 150 (e.g. see FIGS. 2A and 3A) to a corresponding component (not shown) located at either end of the guide rail 110 or 210. For example, the trolley 120 or 220, may be secured in place by any suitable device, or coupling contact 150, known in the art, including but not limited to a magnet, a snap clip, a lever, a clasp, a clip, a cord, a hook, and the like.

Referring to FIG. 4, 5A to 5E and 6A, there are provided additional variants of the fall control system 100. The variants described with reference to FIGS. 4, and 5A to 5E each include an eddy-current braking system. The basic components of the fall control system 100 in the examples below are similar to those already described with reference to FIGS. 2A, 2B (use of an eddy-current braking system), and FIGS. 3A, 3B (use of pre-tensioned gear wheels). In these examples the background speed control track and the speed control track are the same.

In the fall control system 100 described below, and with reference to FIGS. 4, 5A to 5E and 6A, the fall control system comprises a guide rail 310 or 210, a trolley 320 or 220 for moving along the guide rail 310 or 210, an adjustable length tether 140 for coupling to a speed-retarding subsystem of a trolley 320 or 210.

Figure 4:
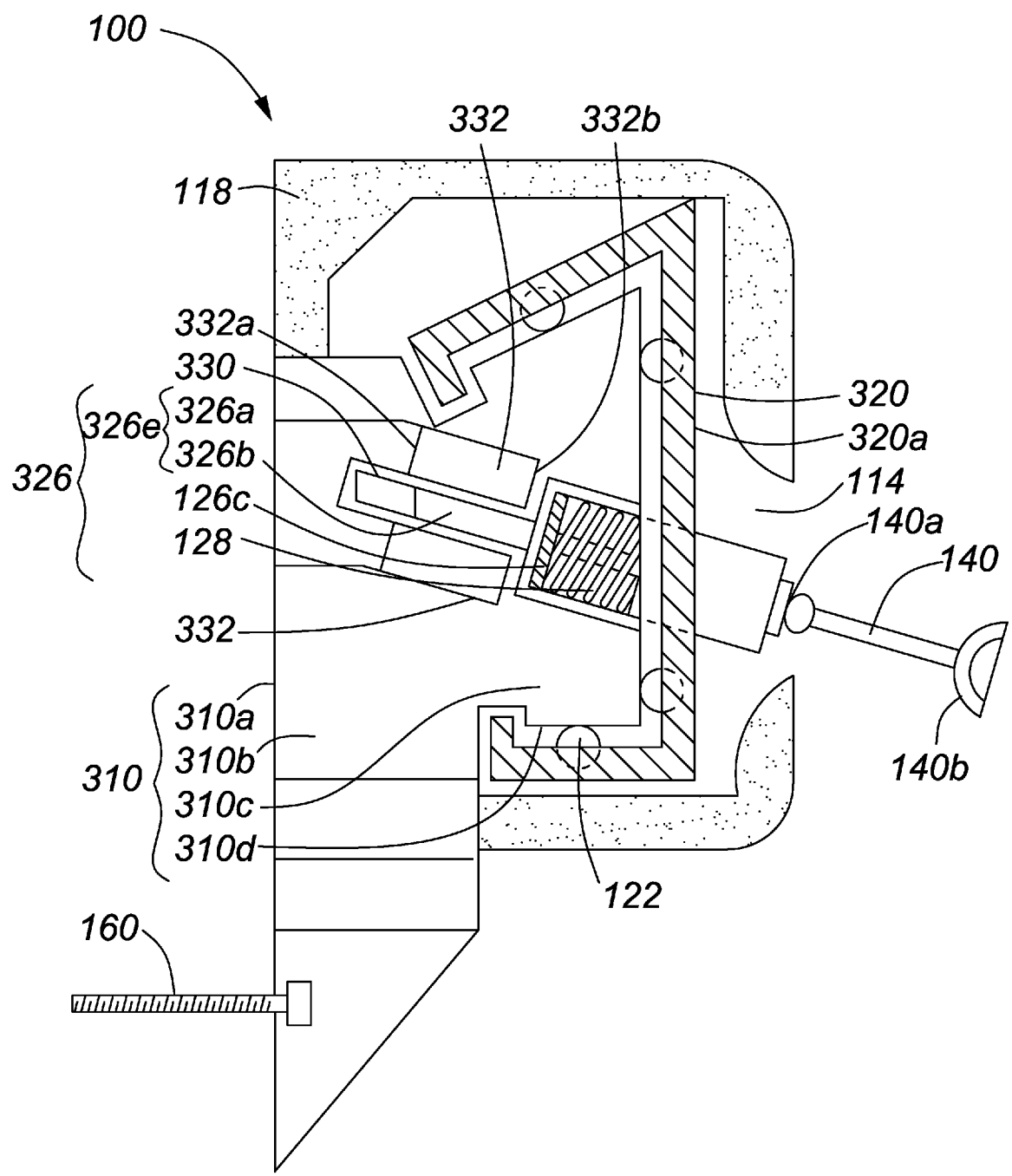
FIG. 4 shows a cross-sectional side view of an example of a fall control system as described herein. In this example, the fall control system comprises an eddy current brake speed control system, the eddy current brake speed control system comprising a conductive element that is displaceable into a magnetized slot within a speed-control track (rail).

With reference to FIG. 4, the guide rail 310 comprises a mounting surface 310a for mounting the guide rail to a surface, an outer surface 310d upon which the trolley 320 moves along, and a speed-control track 330. An outer case, or protective cover 118 may surround the guide rail 310 and trolley 320.

In this example, and with reference to FIG. 4, the speed-control track 330 comprises two magnets 332 with surfaces that define a channel formed within the guide rail 310. The speed control track 330 extends along a length of the guide rail 310. The two magnets 332 are positioned between 332a and 332b, and exert a magnetic field within the speed control track 330. The magnets may be made of any magnetic material, for example a paramagnetic, ferromagnetic material, or a combination thereof, a rare earth magnet, or a neodymium magnet.

Trolley 320 comprises a trolley body 320a, and a speed control system 326 that is coupled to the trolley body 320a and indirectly, to tether 140. Trolley 320 is slides along the outer surface 310d of the guide rail 310 via one or more rolling elements 322 as previously described.

With reference to FIGS. 5A-5E and 6A, the guide rail 210 comprises a mounting surface or base 210a for mounting onto a substrate, a wall, or fixture, an elongate guiding shaft 210c with a circular cross-section, a body portion 210b connecting the base 210a to the elongate guiding shaft 210c, and a speed-control track 430 extending away from a surface of the guide rail 210. The elongate guiding shaft comprises an outer surface 210d on which a trolley 220 moves along. The speed-control track 430 comprises a body 430a, that may be mild to moderately conductive, and a more strongly conductive cap 430b (a conductive cap) that is disposed at an end of the less conductive body 430a (a base conductive element) so that conductive cap 430b extends away from the surface of the guide rail 210.

The guide rail 210 may be made from steel, stainless steel, aluminum, anodized aluminum, or similar material. The outer surface 210d of guide rail 210 may be coated in a ceramic, or other low friction material to facilitate movement of trolley 220 along the guide rail 210. An example, that is not to be considered limiting, of such a rail-trolley arrangement is a linear bearing system using round shaft technology from PBC Linear (Pacific Bearing Company), for example, Simplicity® 60 Plus® Shafting, and accompanying bearing. The bearing component may be modified to include the components of the trolley described herein. The trolley 220 may also move along guide 210c using rolling elements, for example, as shown for example in FIGS. 8A, 9A, 10A, 11A.

The trolley 220 comprises a trolley body 220a and a speed control system 126 that is coupled to the trolley body 220a. An adjustable length tether 140 is attached to support 126c of the speed control system 126. The trolley 220 also comprises a channel (not shown) for receiving the tether 140, and one or more rollers or guides 242 for supporting the tether 140 in the channel within the trolley 220. An inner surface of trolley 220 slides along outer surface 110d of guide rail 110 through a low resistance contact surface, for example, the inner surface of the trolley body 220a may be made from a low resistance material, for example, TEFLON® (polytetrafluoroethylene; PTFE) or other polymer as would be known in the art that permits the trolley 220 to easily slide along guide rail 210.

The trolley 220 may be manufactured of any material suitable in the art, for example, but not limited to, a suitable metal, alloy, resilient polymeric material, epoxy resin, fibreglass cloth-fibreglass resin composition, carbon-fibre-fibreglass resin composition, fibreglass cloth-epoxy resin composition, carbon fibre cloth epoxy resin composition, and manufactured in a manner that can support a weight capacity of a person that may be attached to the trolley 120, for example, a person with a weight of from about 20 (10 kg) to about 400 pounds (185 kg), or any weight therebetween With reference to FIG. 4, the speed control system 326 comprises a speed controller 326e comprising a conductive element 326a (conductive cap) at the tip of the speed controller, that is connected to a support 126c by a non-conductive or mildly conductive element 326b (base conductive element), and a retainer 128 for providing a retaining force that biases the conductive element 326a away from the magnetized second section formed between magnets 332 within the speed control track 330. Non-conductive or mildly conductive element 326b is manufactured of a suitable material known in the art, for example, but not limited to, an austenite-containing composition, a resilient polymeric material, epoxy resin, fibreglass cloth-fibreglass resin composition, carbon-fibre-fibreglass resin composition, fibreglass cloth-epoxy resin composition, carbon fibre cloth epoxy resin composition, and the like. Alternatively, the mildly conductive material may be composed of metal, steel, copper, aluminum, nickel, tungsten, zinc, iron, tin, titanium, stainless steel, nichrome, or an alloy of these metals.

Conductive element 326a (conductive cap) is manufactured of a suitable material known in the art, for example, any conductive material, for example but not limited to, metal, steel, copper, aluminum, nickel, tungsten, zinc, iron, tin, titanium, stainless steel, nichrome, or an alloy of these metals.

Support 126c comprises a body portion and at least a portion of the body of the support 126c is traversable through an opening (not shown) in the trolley body 320a. A first end of support 126c is attached to the non-conductive or mildly conductive element 326b, while the second end of the speed retarding subsystem 326 is attached to a first end of tether 140a by any suitable coupling. The support 126c is preferably manufactured of a non-conductive material known in the art as described above. Support 126c may be hollow and so that the retainer 128 is disposed within support 126c, between the first end, and an inner surface of the trolley body 320a. Alternatively, the support 126c may be hollow or solid, and the retainer 128 is placed outside of the support so that the retainer surrounds at least a portion of the body of the support 126c and is positioned between the first end of the support 126c and the trolley body 320a.

In use, a portion of the speed controller 326 is disposed within the speed control track 330 to provide a first maximum speed (as described above) of the trolley 320 along the guide rail 310. Speed controller 326e is displaceable within the speed-control track 330, from a first position (travelling orientation) to a second position (falling orientation). The first position is shown in FIG. 4. In this example the background speed control system and the speed retarding subsystem share many of the some components.

At the first position, the speed controller 326e is maximally inserted within the speed control track 330, so that the speed controller 326e is fully inserted within the slot of the speed control track 330. At the first position the non-conductive or mildly conductive element 326b (base conductive element) substantially overlaps with the magnetic field created between magnets (surfaces) 332, while the interaction of the more strongly conductive element 326a (conductive cap) with the magnetic field is minimal and functions as a background eddy current brake, but sufficient to establish (or aid in stabilizing) a first maximum speed of the movement of the trolley 320 along guide rail 310. The retainer 128 provides a retaining force against support 126c to bias the speed controller 326e towards the first position. In this configuration the components of the speed control system function as the background speed control system.

At the second position, the speed controller 326e is withdrawn from the slot of the speed control track 330, and the overlap between the speed controller 326e and the magnetic field within the speed control track 330 increases. The more strongly conductive element 326a (conductive cap) is displaced from the first position, and pulled into the magnetic field by an external pulling force on support 126c. The pulling force, for example a fall, compresses the retainer 128 and displaces the conductive element 326a into the region between surfaces 332, within the slot of the speed control track 330. In other words, at the second position, the overlap between the more strongly conductive element 326a (conductive cap) and the magnetic field is greatest and the components function as a speed retarding system. The amount of overlap between the conductive element 326b and the magnetic field at the second position creates an electromagnetic drag force that is greater than that produced at the first position. The created electromagnetic drag force limits the speed at which the trolley 320 may move along the guide rail 310, to one that does not exceed a second maximum speed. In a manner similar to the examples previously described in relations to FIGS. 2A, and 2B, the second maximum speed is less than the first maximum speed.

With reference to FIGS. 5A to 5E and 6A, the speed control system, collectively shown as 126, comprises a speed controller 126e, magnetic arms 126a, 126b, support 126c and retainer 128. The magnetic arms 126a and 126b are connected to magnetic material that is larger in surface area than the arm. There is a space between the magnetic arms 126a and 126b for receiving the speed-control track 430. In these examples the background speed control track and speed control track are the same. Similarly, the background speed control system and the speed retarding subsystem share many of the same components The magnetic material may be made of any magnetic material, for example a paramagnetic, ferromagnetic material, or a combination thereof, a rare earth magnet, or a neodymium magnet. Magnetic arms 126a, 126b of the speed controller 126e interact with the speed-control track 430 to form an eddy-current brake. The speed controller 126e is also attached to a support 126c. Support 126c includes an attachment point for attaching the first end of tether 140a to the speed retarding subsystem 126.

The retainer 128, is located between the support 126c and the trolley body 220a, the retainer 128 is for providing a retaining or biasing force, that biases the speed controller 126e away from the conductive cap 430b (i.e. towards elongate rail 210) of the speed-control track 430. In this configuration the components of the speed control system functions as a background speed control system.

The retainer 128 may comprise, for example but not limited to, a spring, compressible rubber, or other biasing device. The biasing force of the retainer 128 is of sufficient force to counteract any minor pulls or tugs that a person may apply against the support 126c via tether 140 as the trolley 220 moves along the guiderail 210. However, if a force is applied to support 126c that exceeds a threshold force of the retainer, then the retainer 128 is compressed and the support 126c is moved from its biased position (first position; shown in FIGS. 5A to 5E, and 6A), towards a compressed position (second position) that compresses the retainer and moves the magnetic arms 126a and 126b, and the magnetic tips of these arms, to engage an increased surface area of the speed-control track 430 and engage the speed retarding subsystem. The cap (430b; conductive cap) is composed of a more strongly conductive element than 430a (base conductive element). The base conductive element, 430a, has some conductive properties to impede the trolley's speed to approximately 12-14 inches per second, or any amount therebetween, for the average user, or just slightly more, for example, approximately 10-18 inches per second, or any amount therebetween, when the braking mechanism is not fully engaged. Preferably, the retainer 128 has a biasing force of about 20 to about 35 pounds, or any amount therebetween. However, the biasing force of the retainer 128 may be of any suitable magnitude, for example, but not limited to, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50 pounds/inch or nay amount therebetween.

The pair of magnetic arms 126a, 126b are positioned so that they overlap the less conductive body of the speed-control track 430 and function as a background eddy current brake. The range of overlap between the pair of magnetic arms 126a, 126b, and the speed-control track 430 extends from a first, or biased position (background speed control system engaged) through to a second, compressed position (speed retarding subsystem engaged). It is to be understood that the overlap between the magnetic arms 126a and 126b and the speed-control track 430 may be at any position between the first and second positions, and depends upon the force used to compress the retainer 128.

At the first position (biased position), the speed controller 126e is maximally biased away from the more strongly conductive cap 430b (conductive cap) of the speed-control track by the retaining force exerted by the retainer 128 against the support 126c, functioning as a background eddy current brake. At the first position, the pair magnetic arms 126a, 126b of the speed controller 126e and the more strongly conductive cap 430b (conductive cap) of the speed-control track 430 exhibit no, or a minimal overlap, while maximizing the amount of overlap between the magnetic elements and the less conductive body 430a (base conductive element) of the speed-control; track 430. As noted above, in this configuration the components of the speed control system function as a background speed control system.

The amount of overlap between the pair of magnetic arms 126a, 126b and the speed-control track 430 at the first position may be set to create an electromagnetic drag force which limits the movement of the trolley 220 along the guide rail 210 to a first maximum speed. That is, the spatial relationship between the pair of magnetic arms 126a, 126b and the speed-control track 430 creates a corresponding electromagnetic drag force that prevents the trolley 220 from moving more than the first maximum speed of the first speed range, along guide rail 210 (e.g. a maximum walking speed at the upper range of normal). The first maximum speed of the movement of the trolley 220 along guide rail 210 is less that the expected maximum fall velocity of the user in the event of a fall. For example which is not to be considered limiting, the first maximum speed may be from about 12 to about 14 inches/second, or any amount therebetween. However, in other embodiments the first maximum speed of the movement of the trolley 220 along guide rail 210 in a travelling orientation may be adjusted to any desired speed, for example, but not limited to, 5, 6, 7, 8, 9, 10, 11, 12, 13, 14, 15, 16, 17, 18, 19, 20 inches/second, or from 0.5 to 5 km/hr, or any amount therebetween, for example, from about 0.5, 1.0, 1.5, 2.0, 2.5, 3.0, 3.5, 4.0, 4.5, 5.0 km/hr, or any amount therebetween, in order to approximate the range in walking speeds of a person.

The second (compressed or falling orientation) position the speed range of the speed controller 126e is determined by the degree of engagement of the magnetic arms 126a and 126b of the speed controller 126e, the speed-control track 430, thereby engaging the "eddy-current brake". At the fully engaged, second position, the speed controller 126e is pulled along the height (or depth) of the speed-control track 430. In this position, the magnetic field produced from the magnetic tips of the magnetic arms 126a and 126b fully interact with conductive cap 430b of the speed-control track 430. In the second position the retaining force exerted by the retainer 128 against the support 126c, to bias the speed controller 126 towards the first position, is completely overcome. In the engaged or second position, the pair of magnetic tips of the magnetic arms 126a, 126b and the more strongly conductive cap 430b (conductive cap) of the speed-control track 430, overlap. The amount of overlap between the pair of magnetic arms 126a, 126b and the conductive cap 430b at the second position creates an electromagnetic drag force which limits the movement of the trolley 220 along the guide rail 210 to a second maximum speed (e.g. a fall speed). In this configuration the components of the speed control system function as a speed retarding subsystem.

When fully engaged in a falling orientation, the second maximum speed of the trolley 220 as it moves along guide rail 210, is from about 3 to about 6 inches/second, or any amount therebetween. The second maximum speed of the movement of the trolley 220 along guide rail 210 may be adjusted to any desired speed, for example, but not limited to 1, 2, 3, 4, 5, 6, 7, 8, 9, 10 inches/second, or any amount therebetween. The second speed range, is achieved when the eddy-current brake may be partially or fully engaged by a person that trips or loses their footing and falls while walking along a flat or inclined surface, or while ascending or descending stairs. The second speed range thereby helps to control the falling speed of the person. It is to be understood that the second speed range will vary depending upon the degree of engagement between the magnetic tips of magnetic arms 126a and 126b of speed controller 126e and the cap on the speed-control track (430b).

The speed control system 126 does not comprise a brake that brings the trolley 220 to a complete stop during its travels along the guide rail 210. Therefore, the first maximum speed of the trolley 220 is greater than the second maximum speed of the trolley 220, and neither the first maximum speed nor the second maximum speed is zero. In the arrangement of the speed control system 126 described herein, both the first maximum speed and the second maximum speed are greater than zero, and the trolley 220 is never fully arrested, even when the speed controller 126e is displaced fully in the second position.

An adjustable length tether 140 is attached to the end of the support 126c of support 126c, at the first end of the tether 140a. In an example of a use of the fall control system 100, the tether 140 is coupled to a person either directly, or via a harness or a transfer belt (see FIGS. 7A to 7E) at one end, and coupled to the support 126c of the speed controller 326 at another end, 140a. A non-limiting example of a transfer belt is a SafteySure® Transfer Belt" or modified version of such (available from health suppliers, for example, Health-care Solutions, MTS Medical Supply, or SCAN Medical). The transfer belt as shown in FIGS. 7A to 7E, and as previously described, has several unique features that allows attachment to the transfer belt in a 30-45 degree radius on each side of the midline (anterior aspect of belt) to allow the attachment from the elasticized cord to the transfer belt to slide to either side (see FIGS. 7A and 7C), or remain midline relative to the users body. This design of belt permits the user to remove the belt, allowing it to dangle from tether 140 that is attached to the trolley 220. Then if the user decides to travel in the opposite direction, the user can put the transfer belt back on without having to undo tether 140 from the transfer belt.

The tether 140, as previously described, may be an elasticized cord or belt, flexible cord or belt, non-elastic flexible cord or belt (for example made from nylon, a durable material or cable), an elastomeric cord, a bungee-type cord, or a combination thereof, and may be adjustable in length, or of any length, suitable for attachment to the person and the trolley 120 or 220 to permit movement along the guide rail 110. For example, a belt portion of tether 140 may be attached to an elasticized cord or cord portion, band or cable at 140b, and the cord, cord portion, band or cable attached to the user. The tether may also be comprised of a flexible band (for example a cable or nylon band) that is attached to an elasticized cord (for example an elastomeric or bungee-type cord) that then attaches to the transfer belt being worn by the user.

When the user or person is walking, for example using the speed control system 100 show in FIG. 4, the person exerts a pulling force on the speed controller 326, through the tether 140, that is sufficient to move the trolley 320 along the guide rail 310, and the speed controller 326 along the speed control track 330, but insufficient to displace the speed controller 326 from the first position. Due to the minimal overlap between the conductive element 326a the magnetic field between surfaces (magnets) 332, the electromagnetic drag force determines the first maximum speed. A person tethered to the trolley 320 is permitted to walk easily up to the first maximum speed permits. When the person falls, the person exerts a downward pulling force on the speed controller 326, through the tether 140, that is sufficient to overcome the retaining force of the retainer 128, and displaces the speed controller 326 from the first position to the second position. The overlap between the more strongly conductive element 326a (conductive cap) and the magnetic field increases as a result, and increases the magnitude of the electromagnetic drag force created by the speed-retarding subsystem. While the speed controller is in the second position, the trolley 320 is only permitted to move as quickly as the second maximum speed (the speed achieved by the average user when the speed controller is in the second position). The second maximum speed is less than the first maximum speed and both the first maximum speed and the second maximum speed are greater than zero. A similar mechanism of action applies to the speed control systems 100 as shown in FIGS. 5A to 5E and 6A.

When the person has regained composure, the pulling force against the retainer 128 is alleviated, the biasing force of the retainer 128 overcomes the pulling force exerted against the retainer 128, the speed controller 326 is displaced from the second position to the first position, and the person is permitted again to proceed at the first maximum speed.

Figure 5A:
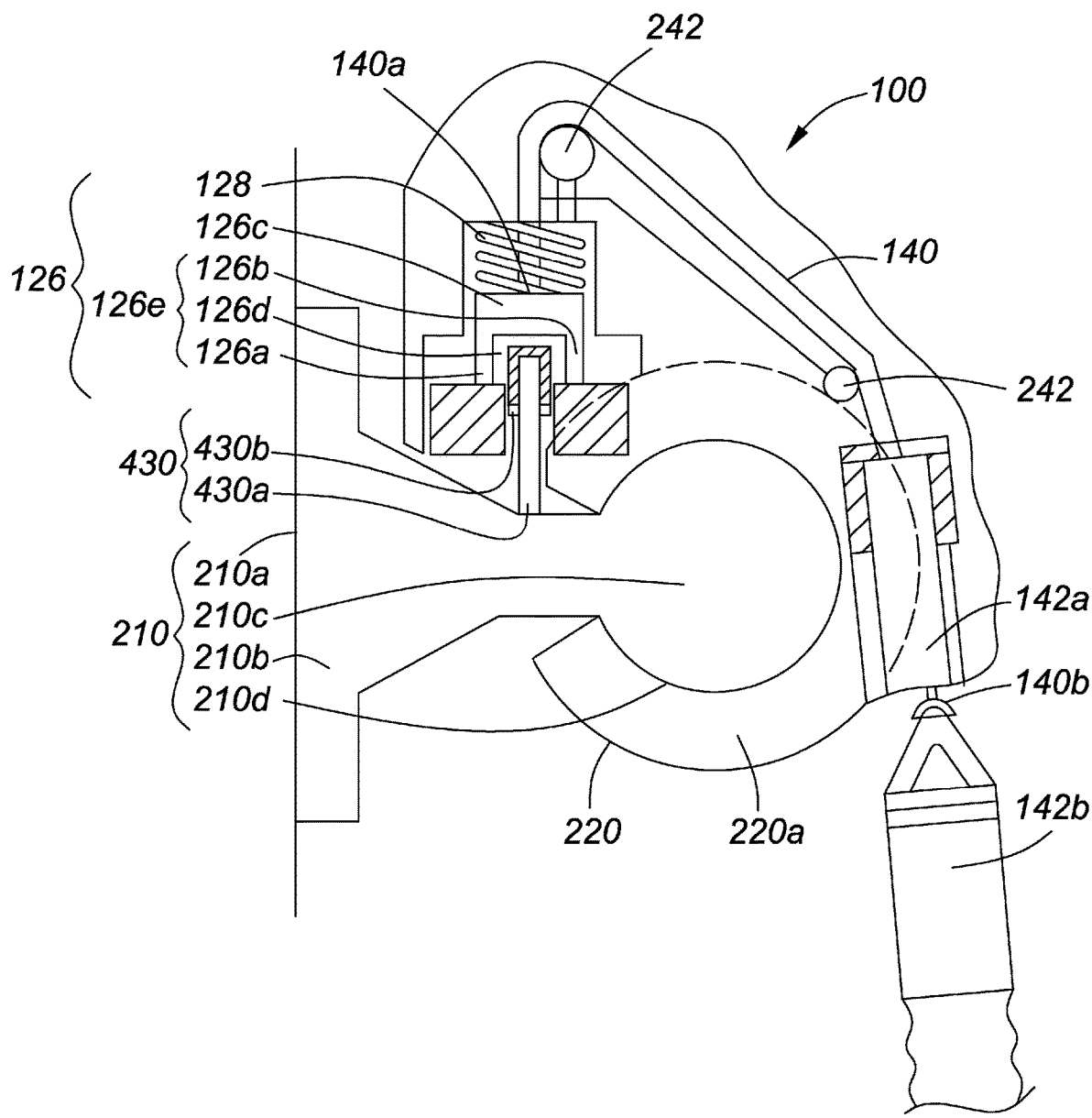
FIG. 5A shows a cross-sectional side view of an example of a fall control system as described herein.
Figure 5B:
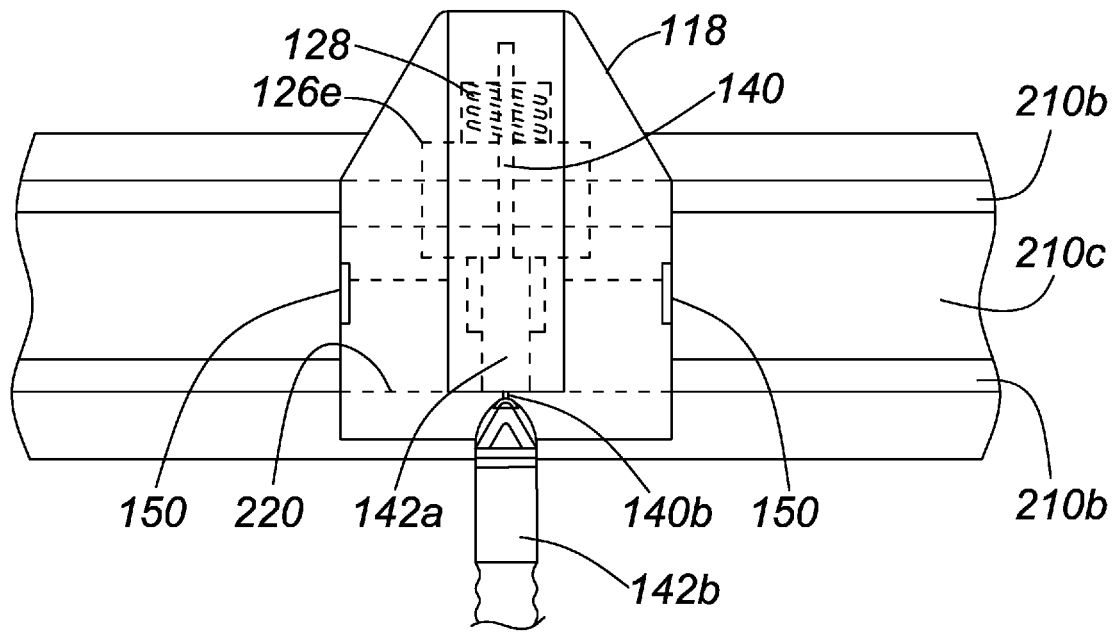
FIG. 5B shows a front view of the fall control system of FIG. 5A.
Figure 5C:
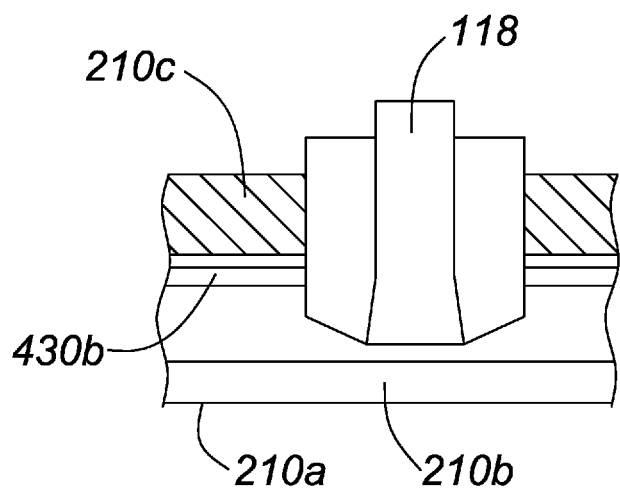
FIG. 5C shows a top view of the fall control system of FIG. 5A. In this example, the fall control system comprises an eddy current brake speed control system, the eddy current brake speed control system comprising a pair of magnets that is displaceable relative to a conductive element running a length of a speed-control track (rail).
Figure 5D:
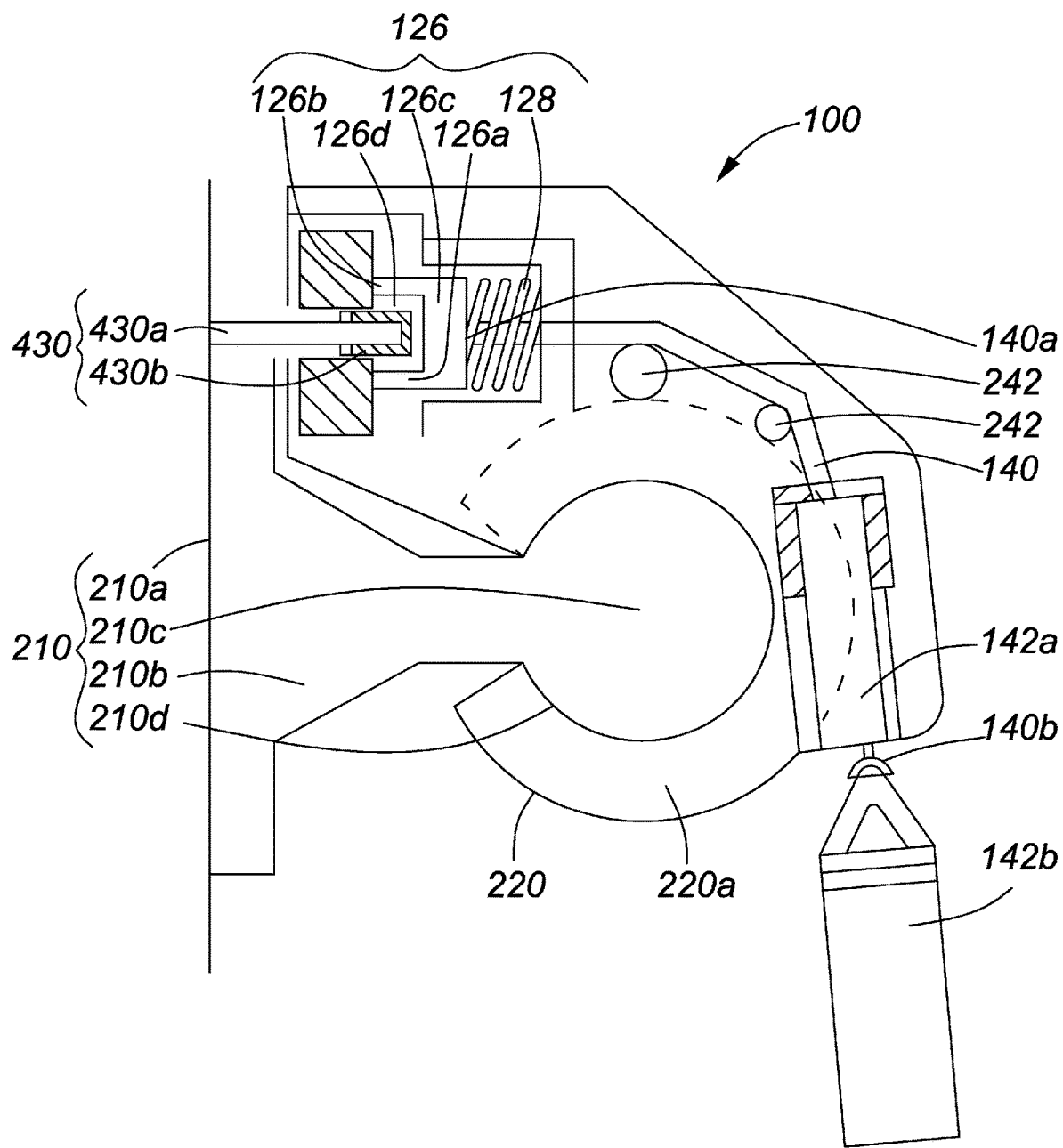
FIG. 5D shows a cross-sectional side view of another variant of the fall control system of FIG. 5A.
Figure 5E:
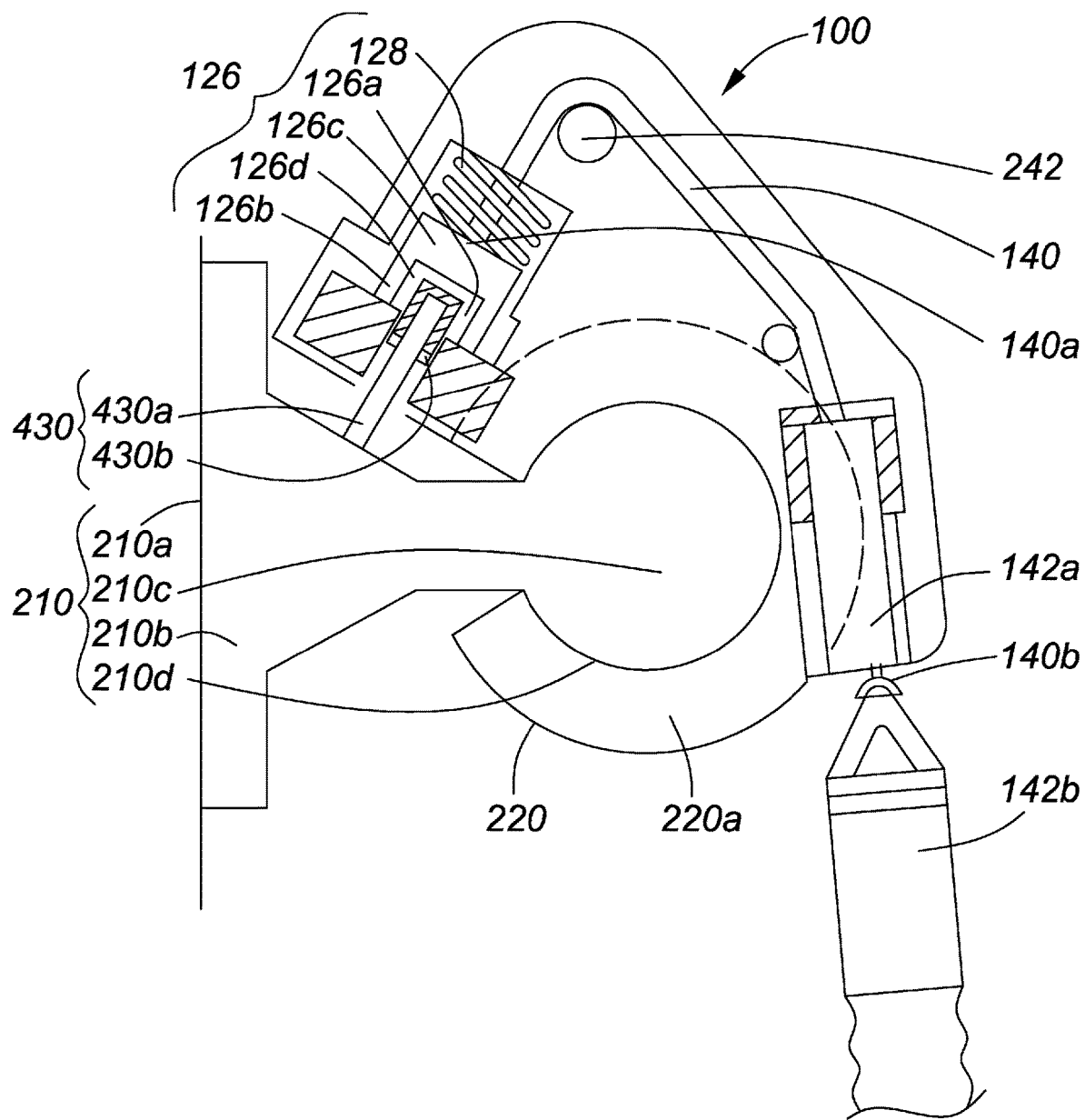
FIG. 5E shows a cross-sectional side view of another variant of the fall control system of FIG. 5A.
Figure 6A:
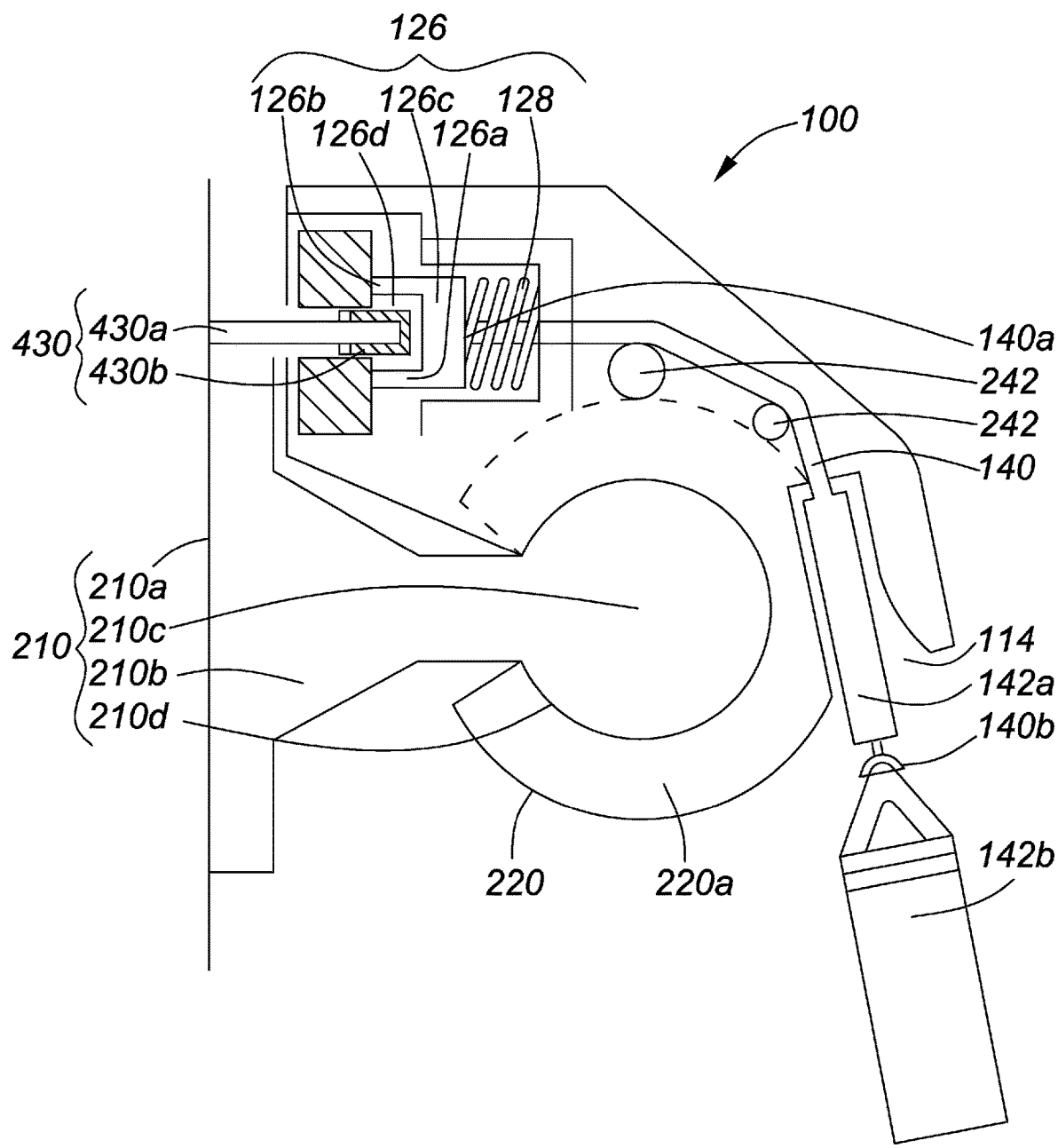
FIG. 6A shows a cross-sectional side view of an example of a fall control system comprising one eddy current brake speed control system.

While the speed controller 126 is depicted in FIG. 5A as oriented parallel to a surface onto which the guide rail 210 is mounted, the orientation of the speed controller relative to the surface onto which the guide rail 210 is mounted may vary as shown for example in FIGS. 5D, 5E and 6A. For example, the speed controller 126 may be oriented perpendicular or obliquely to the surface onto which the guide rail 210 is mounted.

Figure 6B:
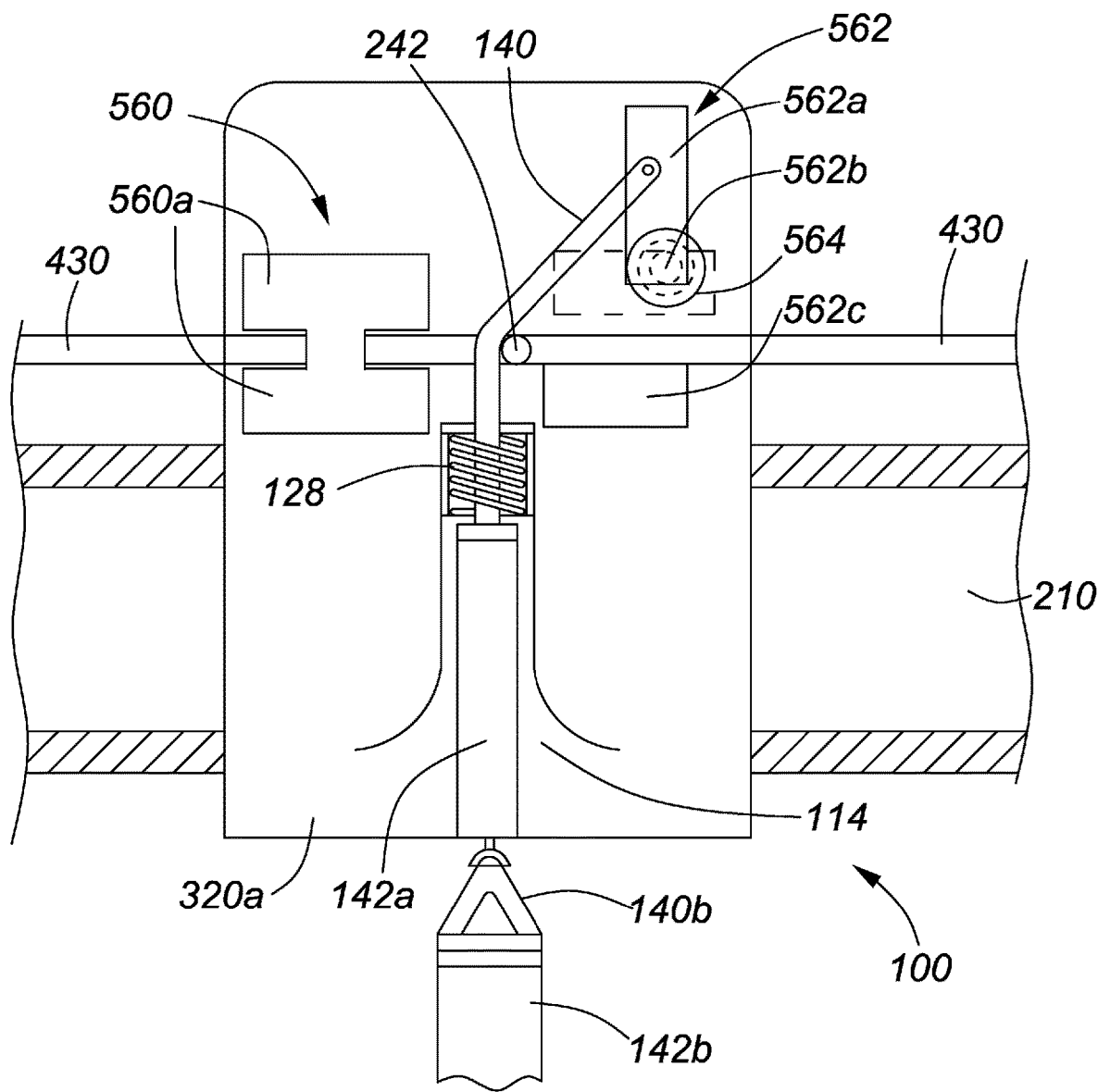
FIG. 6B shows a front view (with protective cover removed) of another variant of a fall control system comprising two eddy current brake speed control system.

FIG. 6B shows another variant of the fall control system 100, wherein the speed control system utilizes multiple eddy-current brakes. In this non-limiting example, two separate eddy-current brakes are shown. One eddy-current brake is always operational and functions as background speed controller 560, that interacts with speed control track 430 and collectively function as a background speed control system (i.e. a background eddy current brake) to limit the maximum walking speed. A second eddy-current brake, speed controller 562, comprises top magnet 562a, bottom magnet 562c and pivot 562c, with the top magnet 562a attached to tether 140. Top magnet 562a that pivots from a disengaged (first) position (shown in FIG. 6B) to an engaged (second) position (top magnet dotted position FIG. 6B) about pivot 562b when the user falls, thereby engaging the speed retarding subsystem as magnet 562a interacts with speed control track 430 thereby increasing the effect of the eddy current brake. One or more than one background speed controller (background eddy current brake) 560 may be used, one or more than one speed controller 562 may be used, or a combination of the background speed controller 560 and speed controller 562 may be used. In this example, the background speed control track and the speed control track are the same component.

As in other designs herein described, a retainer 128 provides a retaining force that biases the speed controller 562 of the speed retarding subsystem towards a first position, the retainer 128 located between the trolley body 220a and the speed controller 562. A plate or similar part (not shown) may be attached perpendicular to the cable 140 above the retainer 128 that limits the excursion of 140 as it is pulled down against the retainer 128. A second retainer 564, for example a spring, attached to the top magnet 562a, about pivot point 562b, of the speed control eddy-current brake 562, may be used to provide additional resistance if needed to return the top magnet 562a to an upright position as shown in FIG. 6B. The positions of the magnets, top magnet 562a and bottom magnet 562c, of the speed control eddy-brake as shown in FIG. 6B can be altered so that one or both magnets 562a and 562b swivel on a horizontal plane, a vertical plane, or a combination of both, to align the poles of the magnets to optimize the electromagnetic drag force relative to the speed control track 430. For example, in the first (disengaged) position, magnet 562a does not interact with the speed control track 430 (and only the background speed control system is active which would also include the magnet 562c acting on the speed control track 430). Swiveling magnet 562a about pivot 562b, brings magnet 562a into alignment with the speed control track 430 resulting in engagement of the speed controller 562 (second position; dotted in FIG. 6B). In a similar manner bottom magnet 562c can be configured to pivot about a pivot point as described for magnet 562a and engage speed control track 430 to collectively function as a speed retarding subsystem. The retaining forces, for example of the second retainer (spring) 564, needed to return magnet 562a (or 562c, or both 562a and 562c) to the resting position may be of any suitable force as required to separate magnet 562a from magnet 562c and the speed control track 430, back to the resting (disengaged) position. For example the force of the second retainer may be from about 5 to 50 pounds of force, or any amount therebetween. When the speed controller 562 is engaged with sped control track 430, the magnet poles of magnets 562a and 562c align optimally to provide the greatest amount of electromagnetic drag force, thereby slowing the trolley's 220 speed to the fall speed. As described in the previous examples, the maximum walking speed is greater than the maximum fall speed, and the maximum walking speed and the maximum fall speed are both greater than zero.

The background speed controller 560 may also be comprised of one or more magnets 560a located within the trolley 320 and they may be positioned on one or both sides of a conductive guide rail 430 upon which the trolley moves. In the example shown in FIG. 6B, one magnet of the background eddy-current brake 560 is positioned within the trolley housing 320a and magnet 560a is located above and below the guide rail 210, and magnet 562c also functions as part of the background speed control system as it positioned to interact with speed control track 430. In an alternative example, the guide rail 210 may be conductive and function as a background speed control track along with the background speed controller 560. If the guide rail 210 functions as a background speed control track, then magnet 560 may comprise one or more than one separate magnets each attached to and positioned within trolley 320 and placed to that they are adjacent to guide rail 210 so as to operate as a background speed control system (functioning as an eddy current brake). Speed controller 562 may be configured to engage speed control track 430 as described above.

Figure 6C:
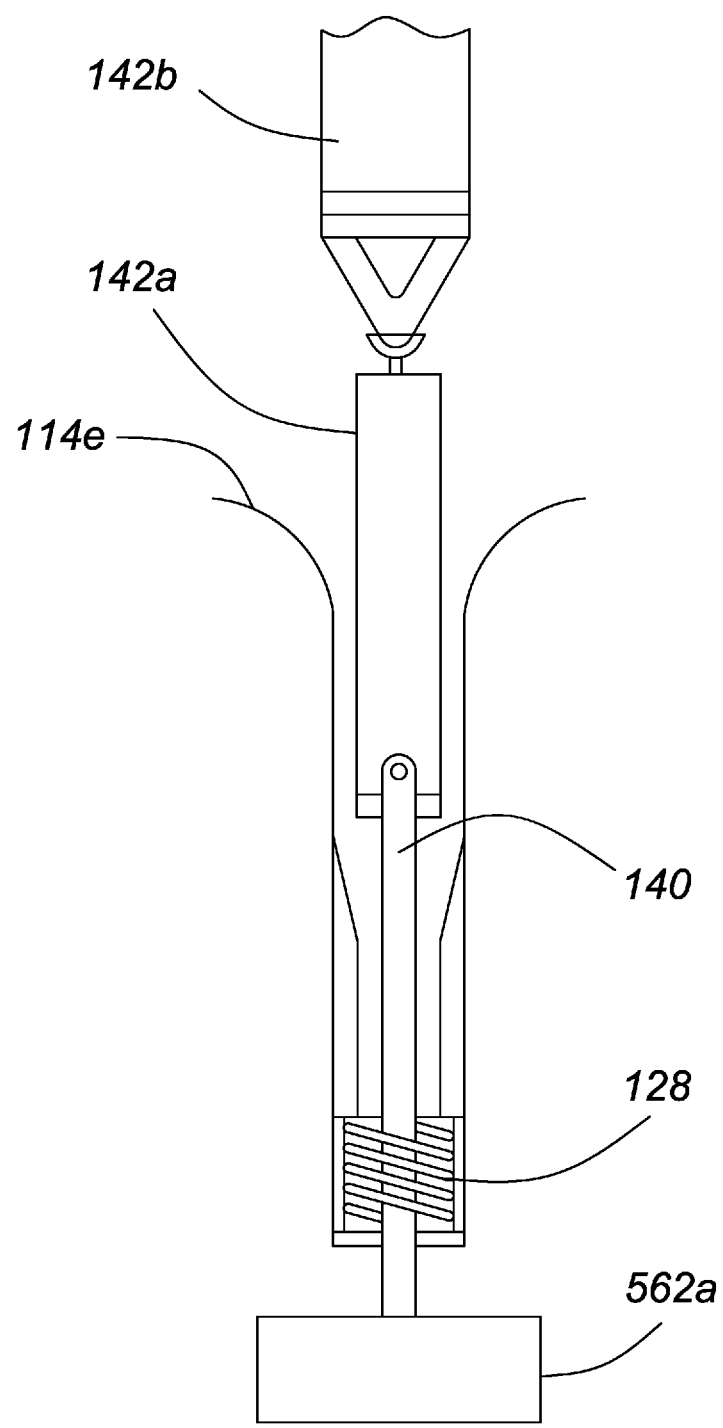
FIG. 6C shows a close-up front view of the fall control system of FIG. 6B.
Figure 7A:
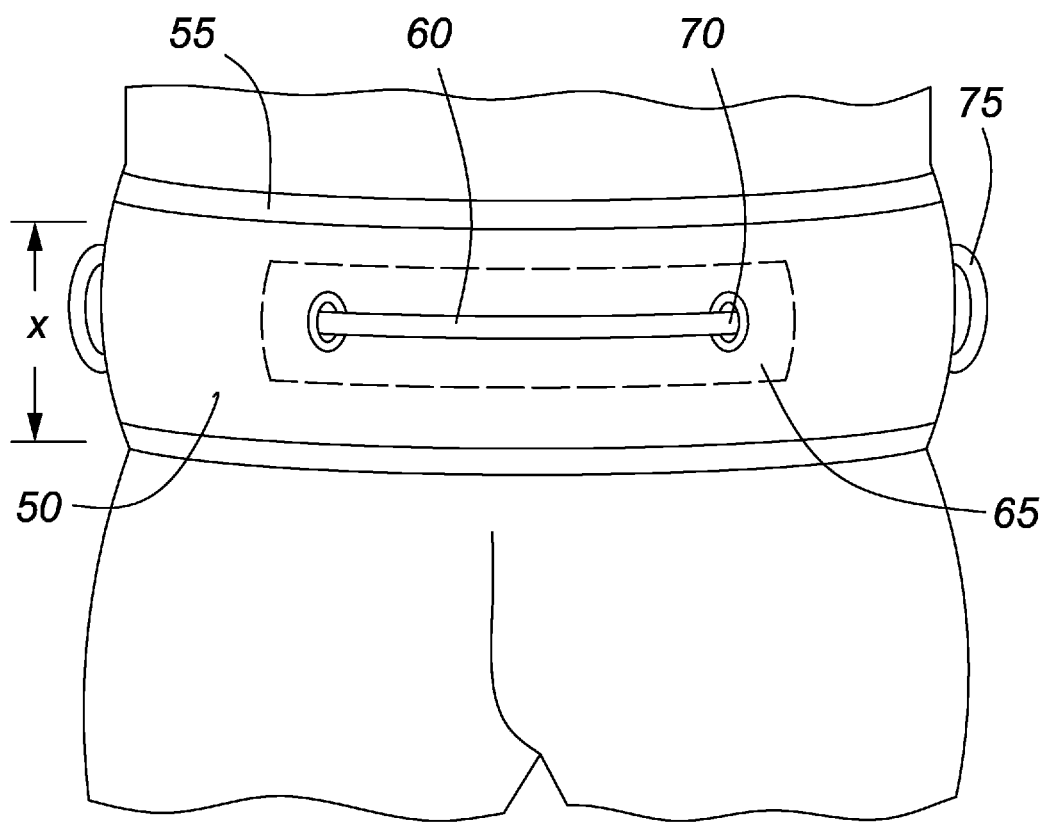
FIG. 7A shows a front view of a transfer belt that may be used in conjunction with the fall control systems as described herein.
Figure 7B:
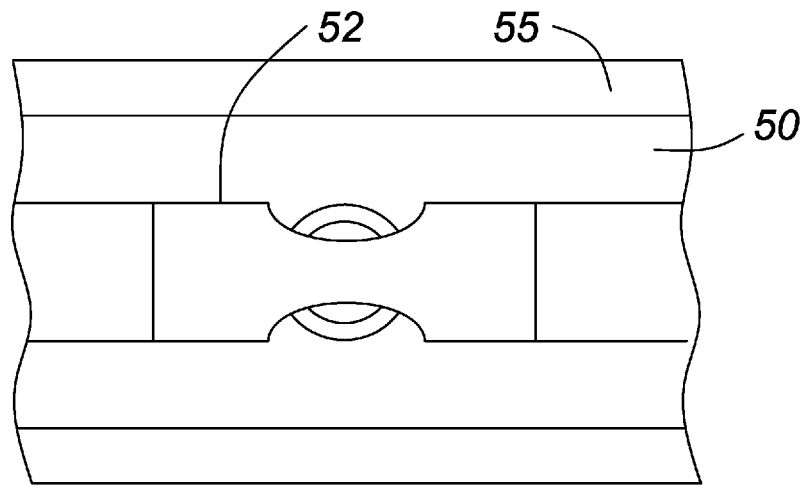
FIG. 7B shows a close-up side view of an example of a fastener of the transfer belt of FIG. 7A.
Figure 7C:
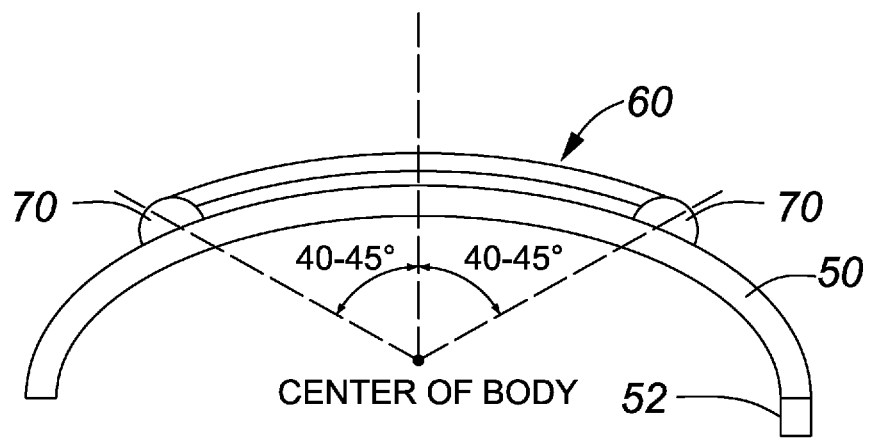
FIG. 7C shows a top view of a portion of the front of the transfer belt of FIG. 7A.
Figure 7D:
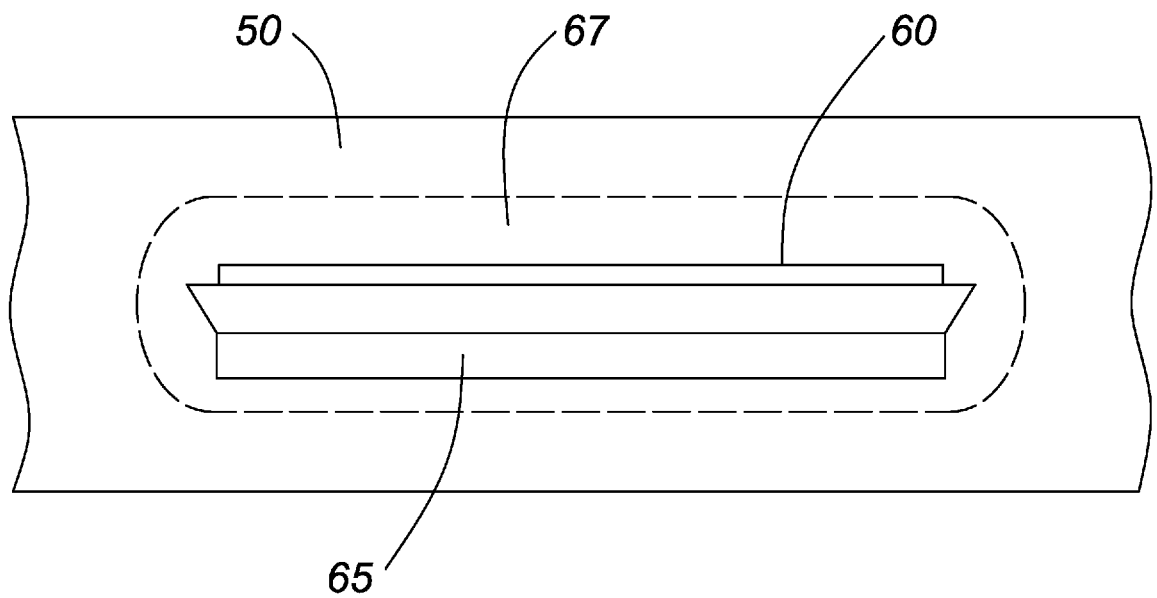
FIG. 7D shows a detail of a front view of the transfer belt of FIG. 7A showing the arrangement of the belt cable and belt cover.
Figure 7E:
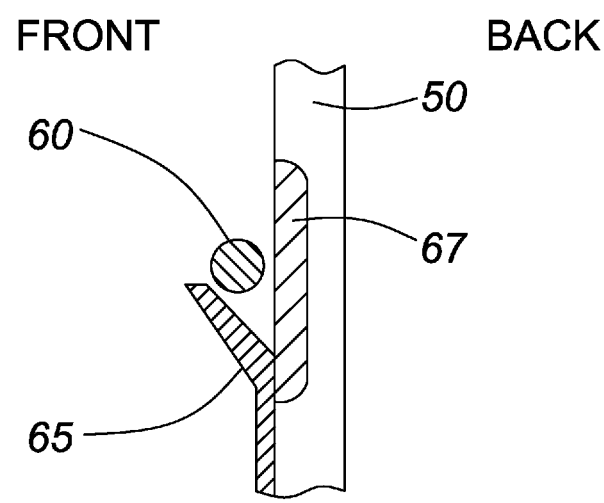
FIG. 7E shows a detail of a cross-sectional side view of the transfer belt of FIG. 7A showing the arrangement of the belt cable and belt cover.

In order to ensure that a smooth force from the tether 140 is applied to the speed control mechanism 526 during a fall, for example if the user does not fall straight down but rather to the side, the trolley may comprise a funnel like, or funnel shaped opening 114 (see FIG. 6B, 6C). The funnel like opening 114 in the trolley housing 320a may be made of a low friction material that would allow a cable, belt, elasticised belt, bungee cord, or cord (as described above) of the tether 140 to slide easily within opening 144, thereby activating the speed control system 526 without snagging or becoming struck within the trolley housing.

With reference to FIGS. 8A to 8D, 9A, 9B, 10A, 10B, 11A and 11B there are provided alternate fall control systems 100 that share a common feature involving the trolley 620 moving in two aspects about guide rail 210. In the first aspect, trolley 620 moves along the length of guide rail 210 in a travelling orientation (in a first direction; indicated by the letter "A"; see FIG. 8A), when in a first position, similar to the previous examples of the fall control systems that have been previously described. When the user is walking along with trolley 620, in a regular manner, up or down stairs or along a flat surface, the trolley 620 is positioned in a travelling orientation about circular guide shaft 210c, and tether 140 may pull and rotate trolley 620 upward, in direction opposite to the arrow "B" 670 (shown in FIGS. 8A, 9A, 10A, and 11A). In the second aspect, when in a second position (a falling orientation) trolley 620 rotates about circular guide shaft 210c in a rotatable direction (a second direction 670, indicated by the letter "B"; see FIG. 8A). For example, trolley 620 rotates (in a direction "B"; 670) about circular guide shaft 210c, of guide rail 210, when tether 140 is pulled in general a falling direction (fall orientation) as indicated by the letter "C" (see FIGS. 9A, 10A, 11A) and activates a speed control system that is described in more detail below. In the second position the minimum speed, when the speed control system (i.e. both the background speed control system and the speed retarding subsystem) is activated is never zero, therefore the person can crawl up or down the stairs, or along a surface, even when the speed controller is fully engaged. This may be important as a disabled individual, that is unable to crawl up or down the stairs (as a result of a fall control system that impeded all movement), could potentially become stuck on stairs or floor for several hours or days until help arrived.

After a fall, when the user is resting on the stairs or level surface, the downward force on tether 140 and trolley 620 is significantly decreased in comparison to the forces imparted on the tether and trolley during a fall. As a result, trolley 620 may rotate back to its initial resting position (travelling orientation), releasing pressure between the areas of friction between the components of the trolley and the guide rail and associated components (as described in more detail below), allowing trolley 620 to move more freely on guide rail 210 so that the user may move or crawl up or down the stairs or level surface. If desired, small weights (not shown) may be placed within trolley 620 to maintain trolley body 620a in the travel orientation, or first position, about cylindrical shaft 210c when trolley is stationary, or moving in the travel orientation along guide rail 210.

In the examples presented in FIGS. 8A to 8D, 9A, 9B, 10A, 10B, 11A and 11B, guide rail 210 comprises a body of the guide rail 210b and a circular shaft 210c with a curved outer surface 210d, a mounting surface (or base) 210a, and an upper guide rail shoulder 210g. The curved outer surface 210d of circular shaft 210c may interface with trolley 620 via rolling elements 122, or the inner surface of the trolley may slide along the outer surface of the guide rail 210d as previously described. Additionally, guide rail shoulders or surfaces 210g, 210h, 210i, 662a, and 695 may interface with trolley 620 via rolling elements (e.g. 122), a roller wheel (e.g. on-set wheel 662b), an off-set wheel (e.g. 675), or a surface of the trolley body (e.g. 662g or 690) when trolley 620 is rotated about circular guide shaft 210c as described below. The use of rolling elements 122 may assist with movement of trolley 620 along a guide rail 210 comprising linear sections as shown in FIG. 1A, or curved sections as shown in FIG. 1B.

Trolley 620 may rotate about the cylindrical guide shaft 210c in a clockwise or counter-clockwise direction, depending on which wall the guide rail 210 is placed. The on-set wheels, 662b, off-set wheels 675, and frictional surfaces 210h (FIGS. 8A, 9A), 210i (FIG. 8A, 11A), 662a (FIG. 9A), 690 and 695 (FIG. 9A) in the resting position may be angled slightly away from a true 90° (perpendicular) position, so that when the trolley is rotated the wheels and/or frictional surfaces contacting the opposing surface are in alignment.

As previously described, the guide rail may be formed as one continuous rail, or by a plurality of guide rail sections (not shown) coupled together and may be linear or curved so that they may be fitted against a bearing surface, for example a wall, a ceiling, support posts, wall studs, rafters or overhead beams, within a stair well, a room, a hall or passageway. The guide rail 210 may be made from steel, stainless steel, aluminum, anodized aluminum, a metal alloy, a polymeric material, or a combination thereof. The outer surface 210d of guide rail 210 may be coated in a ceramic, or other low friction material to facilitate movement of trolley 620 along the guide rail 210. The guide rail 210 is manufactured in a manner that when installed to a weight bearing surface, the guide rail can support a weight capacity of a person that may be attached to the guide rail, for example, a person with a weight of from about 20 pounds (10 kg) to about 400 pounds (185 kg), or any weight therebetween. An example, that is not to be considered limiting, of such a rail-trolley arrangement is a linear bearing system using round shaft technology from PBC Linear (Pacific Bearing Company), for example, Simplicity® 60 Plus® Shafting, and accompanying bearing. However, the components are modified to include the components of the trolley 620 as described herein.

Part of the cylindrical or circular shaft 210c may be at least partially conductive (e.g. ferromagnetic) as it may function as a background speed control track, as part of the linear eddy current brake as descried in more detail below. For example, a portion of the outer surface of the cylindrical shaft 210c, located adjacent (background) magnets 660a, 660b (see FIGS. 8B, 9A, 9B, 10A, 10B, 11A, 11B), may be comprised of a conductive or ferromagnetic material, the inner core of the circular shaft 210c may be a non-conductive or comprised of a weakly conductive or ferromagnetic material, or a combination thereof.

In the travelling orientation there may be a gap between the lower inner surface of trolley 620 and the lower surface (e.g. 662a, FIGS. 9A and 10A; or 210i, FIG. 11A) of guide rail 210. This gap may be filled using a compressible, resilient plug 685 (see FIG. 8A). Plug 685 may be made from a rubber, a foam, a silicone, or other flexile polymeric material provided that plug 685 can compress and rebound back to its original form during use of trolley 620. When trolley 620 is moving along in the travelling orientation, plug 685 is in an uncompressed state. When trolley 620 is pulled in the general direction "C" and rotated about circular guide shaft 120c during a fall (in the fall orientation), then plug 685 will be compressed against the lower surface (e.g. 662a, FIGS. 9A and 10A; or 210i, FIG. 11A) of guide rail 210. Plug 685 helps keep fingers, and other items, out of the space between the trolley and the guide rail.

A bell like device (not shown) may be installed at either end of guide rail 210 so that when trolley 620 reaches either end of guide rail 210, the trolley may strike the bell, or similar device, to produce a sound that alerts the user that they have reached the end of the guide rail and that they may either remove the safety belt 50 from around their waist, or undo a clip connecting them to tether 140. The bell or similar device would be an added safety feature, acting as a reminder, so that the user does not continue walking when the trolley has come to a complete stop at either end of the guiderail, and avoiding the user being jerked backwards, losing balance, and falling.

When the fall control system 100 is not in use, the trolley 620 may be secured in place at one end of guide rail 210 by coupling a contact 150 (FIG. 8B) to a corresponding component (not shown) located at either end of the guide rail 210. For example, the trolley 620 may be secured in place by any suitable device known in the art, including but not limited to a magnet, a snap clip, a lever, a clasp, a clip, a cord, a hook, and the like.

An adjustable length tether 140, may be as previously described, for example an elasticized cord or belt, a flexible cord or belt, a non-elastic flexible cord or belt, a bungee-type cord, or a combination thereof and may be of any length suitable for attachment to the person and the trolley 620 to permit movement along the guide rail 210. The adjustable length tether 140 may comprise belt 142a and elastic cord 142b (FIG. 8C), with the belt 142a attached to trolley body 620a using any suitable connector 144 (FIG. 8C). For example connector 144 may be a swivel connector, a ring connector, a detachable clip, or tether 140, or belt 142a may be integrally formed with, or pass through an opening and become wedged within, trolley body 620a. The region about the attachment point of tether 140 or belt 142a to the trolley body 620a may comprise a funnel-shaped opening 114 and this area may be coated with a low friction material to ensure that tether 140 does not snag on trolley body 620a. For example, the funnel shaped opening 114 may be covered by TEFLON® (polytetrafluoroethylene; PTFE), ceramic or other low friction material.

The funnel shaped opening 114 may comprise an asymmetric profile, with a tighter upper curvature (see for example FIGS. 9A, 10A, 11A), this profile may prevent or limit rotation of trolley 620 about the cylindrical shaft 210c toward the user during normal walking, for example, when going up stairs. Keeping the position of tether 140 lower on trolley 620 may keep the trolley from rotating during use in a travelling orientation, where rotational forces acting on the trolley moving along the cylindrical shaft are at a minimum.

Tether 140 may be a wide, thin band, for example, a nylon band at the location of attachment 144 to trolley 620. In the event of a fall, should the user reach up and grab tether 140 at a point within the firm& shaped opening 114, a wide thin band may cause less injury than a small diameter cord or cable that could result in the fingers or other part of the hand become pinched between the tether 140 and the funnel shaped opening 114. The adjustable length tether 140 (or 142b, FIG. 8C) may be made from a material is strong enough to support a user during a fall event, and that is partially flexible, for example, allowing for expansion of about 2 to about 5 times the length of the tether. For example, bungee jumping cord has a maximum stretch of 600% at break. This would allow a relatively short tether from the use) to the trolley 620, but allow for significant stretch to allow the user to experience a controlled descent upon falling to the floor, stairs, or ground. The length of tether 140 should be customized to the user's size (height and width) and the user's walking style (i.e. walking close to the guide rail, versus farther away). Depending on where the guide rail 210 is installed on the wall, the length of the tether may be between about 12 and about 16 inches in length. With this length, when trolley 620 lags behind the user walking upstairs, or leads the user walking downstairs, the trolley is still close to the user's center of mass. The tether is affixed to a person either directly, or via a harness or a transfer belt (FIGS. 7A to 7E) at a distal second end. A non-limiting example of a suitable transfer belt is a Saftey-Sure® Transfer Belt (available from health suppliers, for example, Healthcare Solutions, MTS Medical Supply, or SCAN Medical). See also the transfer belt optimized for use with this fall control system in FIGS. 7A to 7E (as described herein).

The trolley 620 may be manufactured of any material suitable in the art, for example, but not limited to, a suitable metal, alloy, resilient polymeric material, epoxy resin, fibreglass cloth-fibreglass resin composition, carbon-fibre-fibreglass resin composition, fibreglass cloth-epoxy resin composition, carbon fibre cloth epoxy resin composition, and manufactured in a manner that can support a weight capacity of a person that may be attached to the trolley 620, for example, a person with a weight of from about 20 (10 kg) to about 400 pounds (185 kg), or any weight therebetween.

In the examples presented in FIGS. 8A, 9A, 10A, and 11A, trolley 620 is shown to move along the outer surface 210d guide rail 210 via one or more than one roller bearing 122. However, the inner surface of trolley 220 may also slide along outer surface 210d of guide rail 110, as previously described above (with reference to FIGS. 3B, 5A-5E, and 6A) through a low resistance contact surface, for example, the inner surface of the trolley body 220 may be made from a low resistance material, for example, TEFLON® (polytetrafluoroethylene, PTFE) or other polymer as would be known in the art that permits the trolley 620 to easily slide along guide rail 210. As previously described, trolley 620 may comprise a soft cover 118 (e.g. FIGS. 9A, 10A, 11A) and rounded corners (e.g. FIGS. 9B, 10B, 11B) to protect the user if they encounter trolley 620 during a fall.

The trolley 620 comprises a trolley body 620a, a background speed control system and a speed retarding subsystem, a coupled to the trolley body 620a. The background speed control system is always engaged and controls the speed of trolley 620 while the trolley is moving along guide rail 120, for example in a first position, or in a travelling orientation. For example, with reference to FIGS. 8B, 9A, 10A, and 11A there are shown several types of background speed control systems that comprise a background eddy current brake. In these examples, the guide rail 210, or a portion of the guide rail, for example the upper and lower portions of circular guide shaft 210c, is mildly to moderately conductive and functions as a background speed control track. Trolley 620 may comprise one or more than one background magnet, for example 660a, 660b that engages with the conductive circular guide shaft 210c (background speed control track) to form an eddy current brake in a manner similar to the eddy control brakes previously described, where an electromagnetic drag force is created when the magnetic element glides over the ferromagnetic surface material, and the magnetic element and ferromagnetic surface thereby function to act as a linear eddy current brake.

Figure 8A:
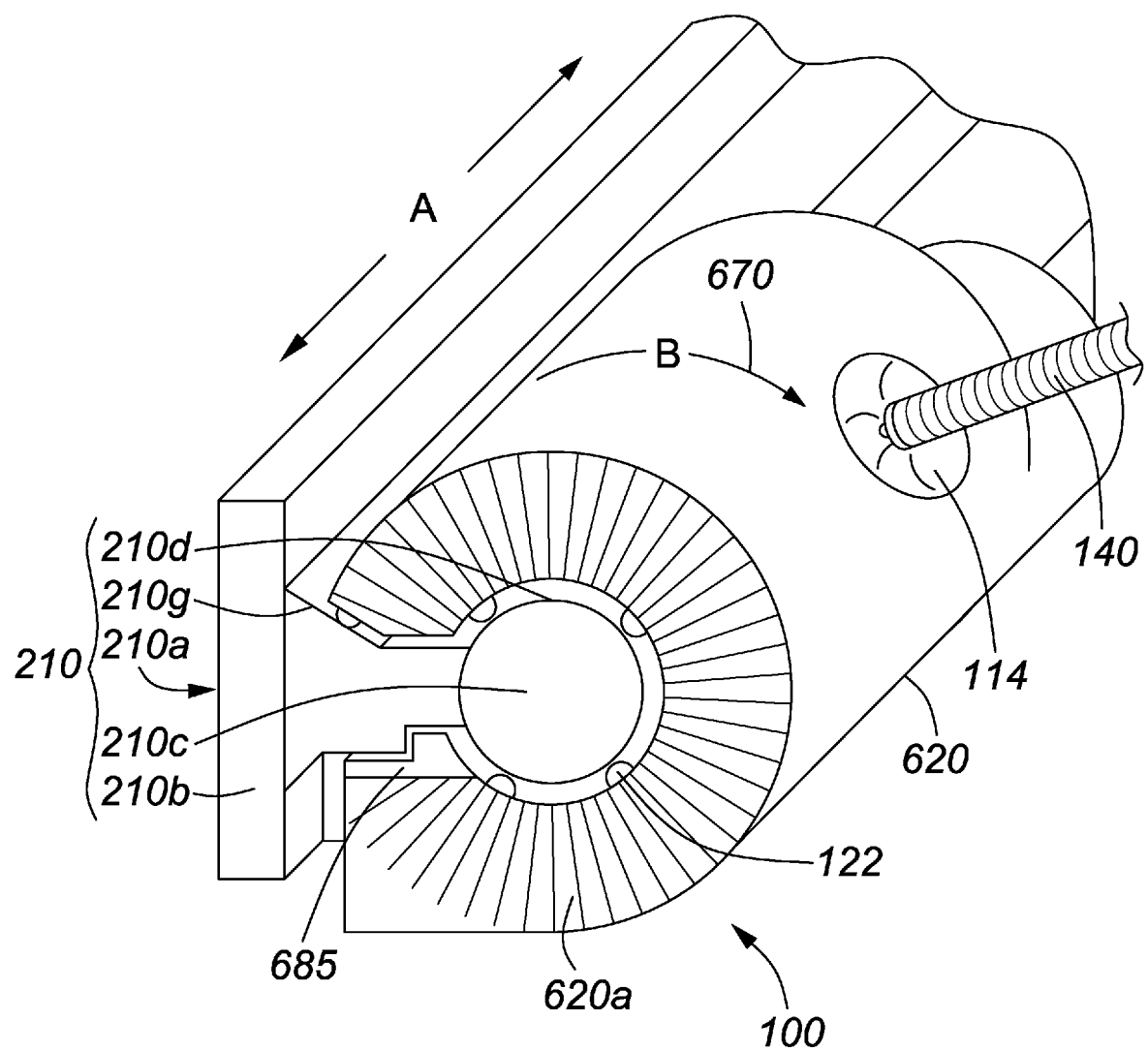
FIG. 8A shows a perspective view of another example of a fall control system as described herein.
Figure 8B:
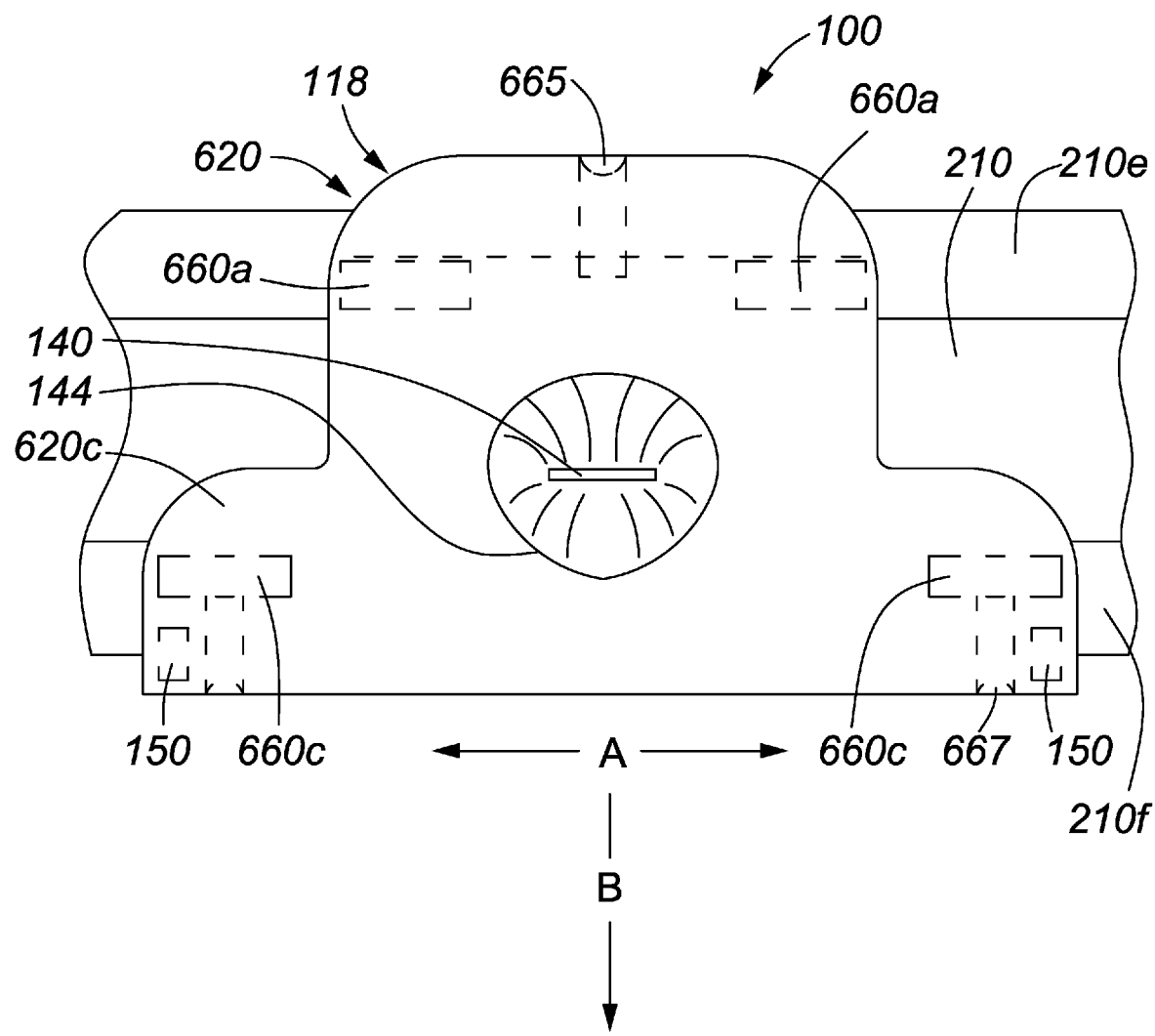
FIG. 8B shows a front view of the fall control system of FIG. 8A.
Figure 8C:
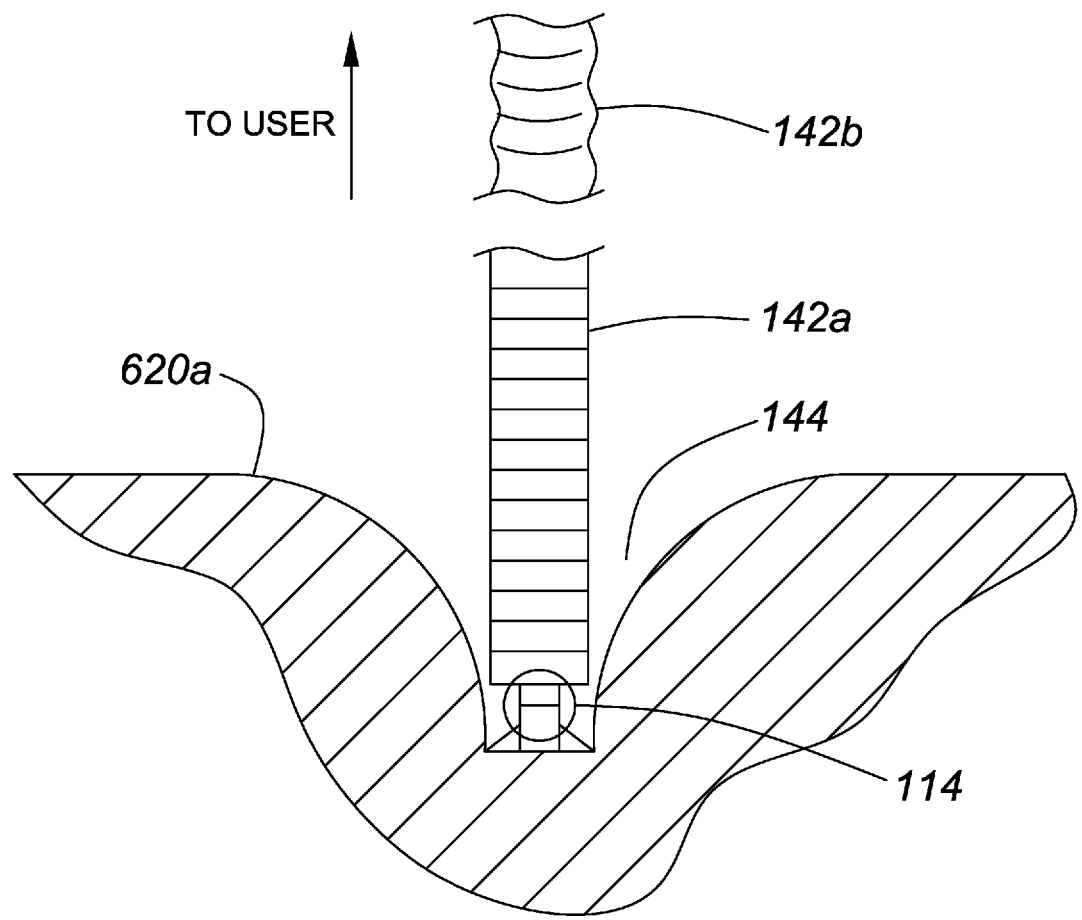
FIG. 8C shows a top view of a detail of the fall control system of FIG. 8B showing an example of tether attachment to the trolley body.
Figure 8D:
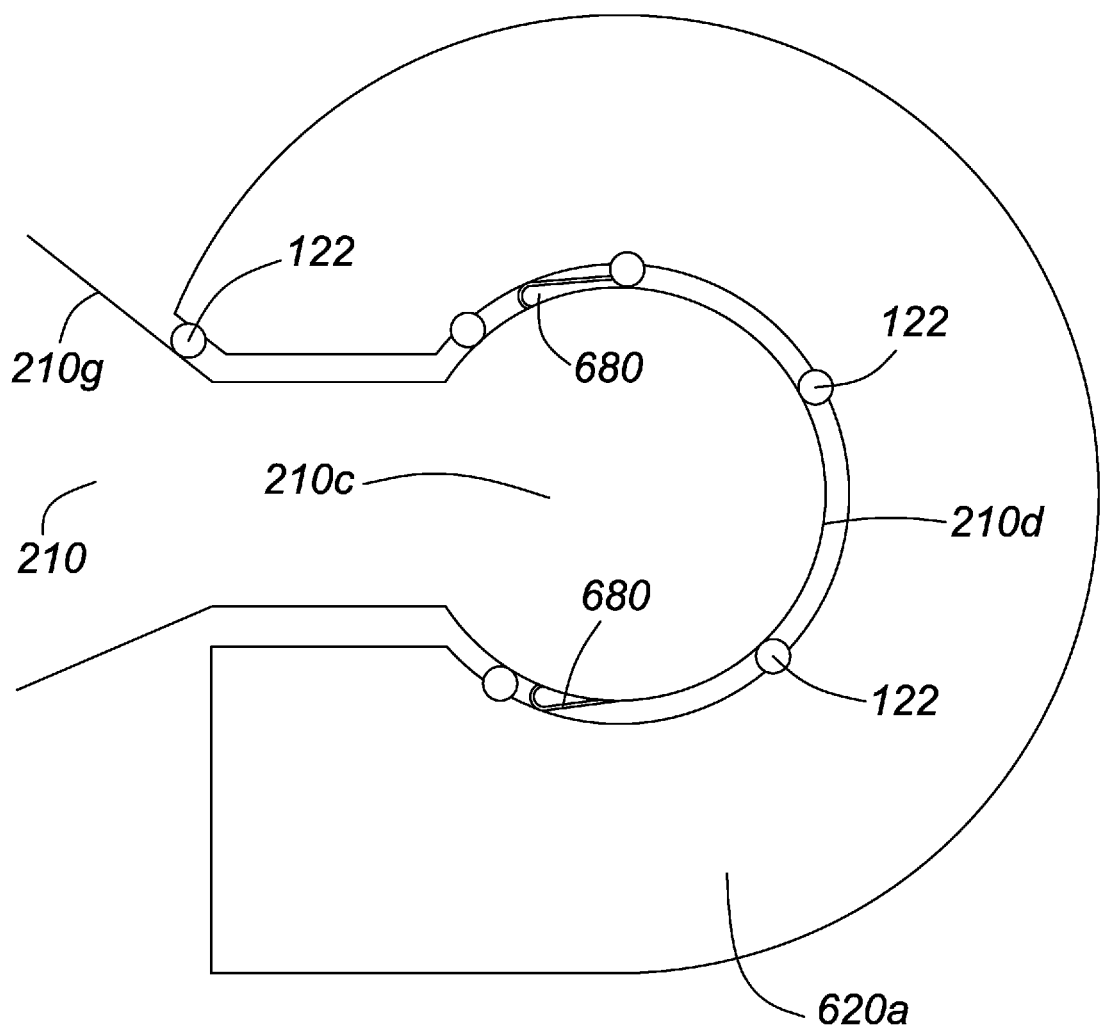
FIG. 8D shows a cross-sectional side view of the trolley and a portion of the guide rail shown in FIG. 8A.

In the example shown in FIG. 8B, trolley 620 comprises a background speed control system comprising one or more than one background magnet 660a positioned above a conductive (e.g. comprising a ferromagnetic surface material) circular guide shaft 210c to act as a background eddy current brake. Similarly, one or more magnets 660b may be positioned below conductive circular guide shaft 210c to act as a background eddy current brake. However, a separate conductive background speed control track, as previously described, may also be used. As previously described, an electromagnetic drag force is created when the magnet glides over the conductive, or ferromagnetic surface material functioning as a linear eddy current brake. The strength of the electromagnetic drag force is determined by the position, strength, shape, poles, and size of the magnet and these properties may readily be determined by one of skill.

Background magnets 660a and 660b may be square, rectangular, curved, arc shaped, or comprise any suitable shape in order to fit within trolley 620 and interact with the background speed control track. For smooth operation, background magnet 660a may be positioned symmetrically about trolley 620. The eddy current brake force retards the trolley's speed along guide rail 210 to a maximum walking speed. The linear eddy current brake, by its mechanism of action, reduces the trolley's top speed and does not stop or lock the trolley along the guide rail.

Figure 9A:
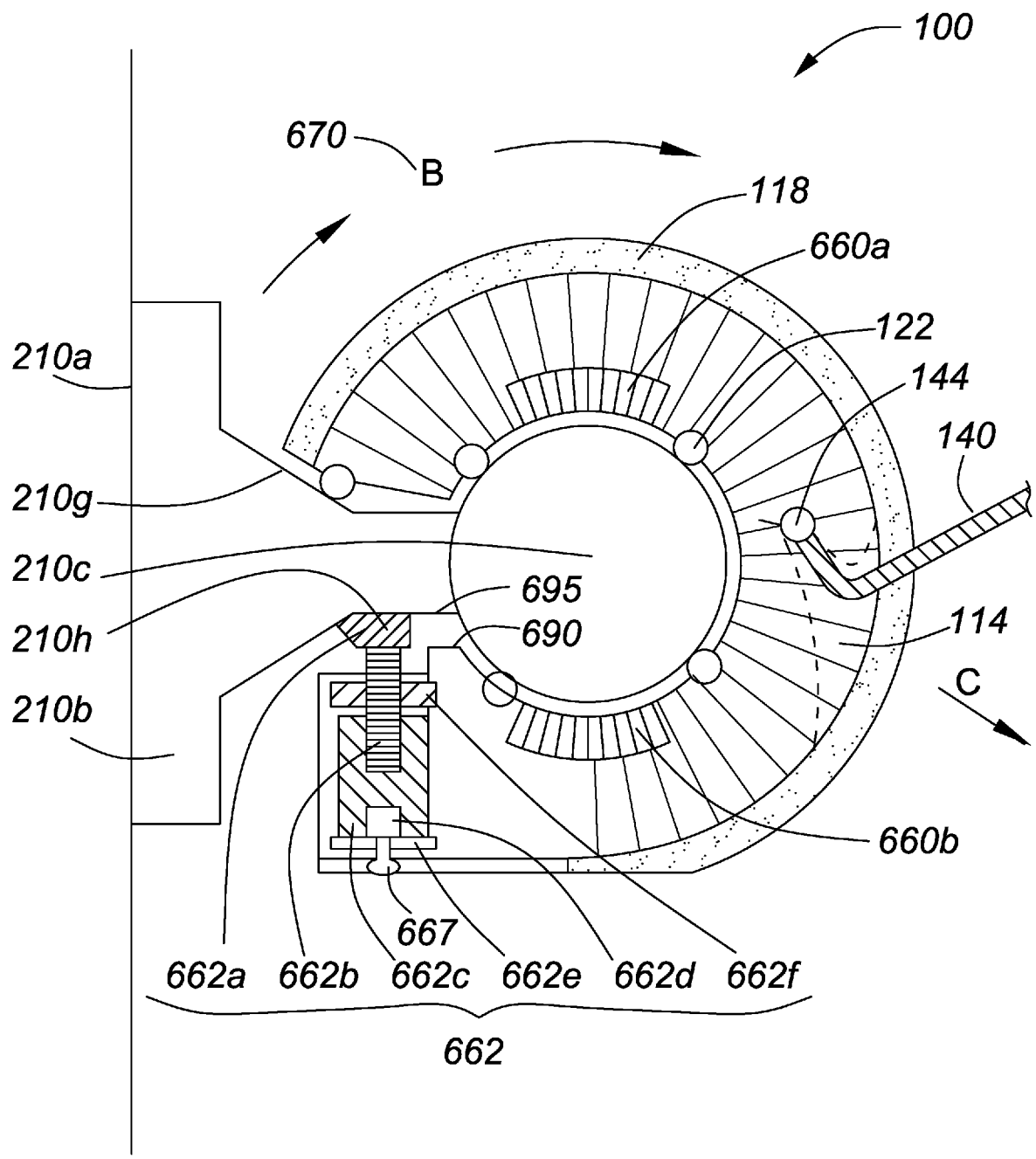
FIG. 9A shows a cross-sectional side view of another example of a fall control system as described herein in the travelling orientation.
Figure 10A:
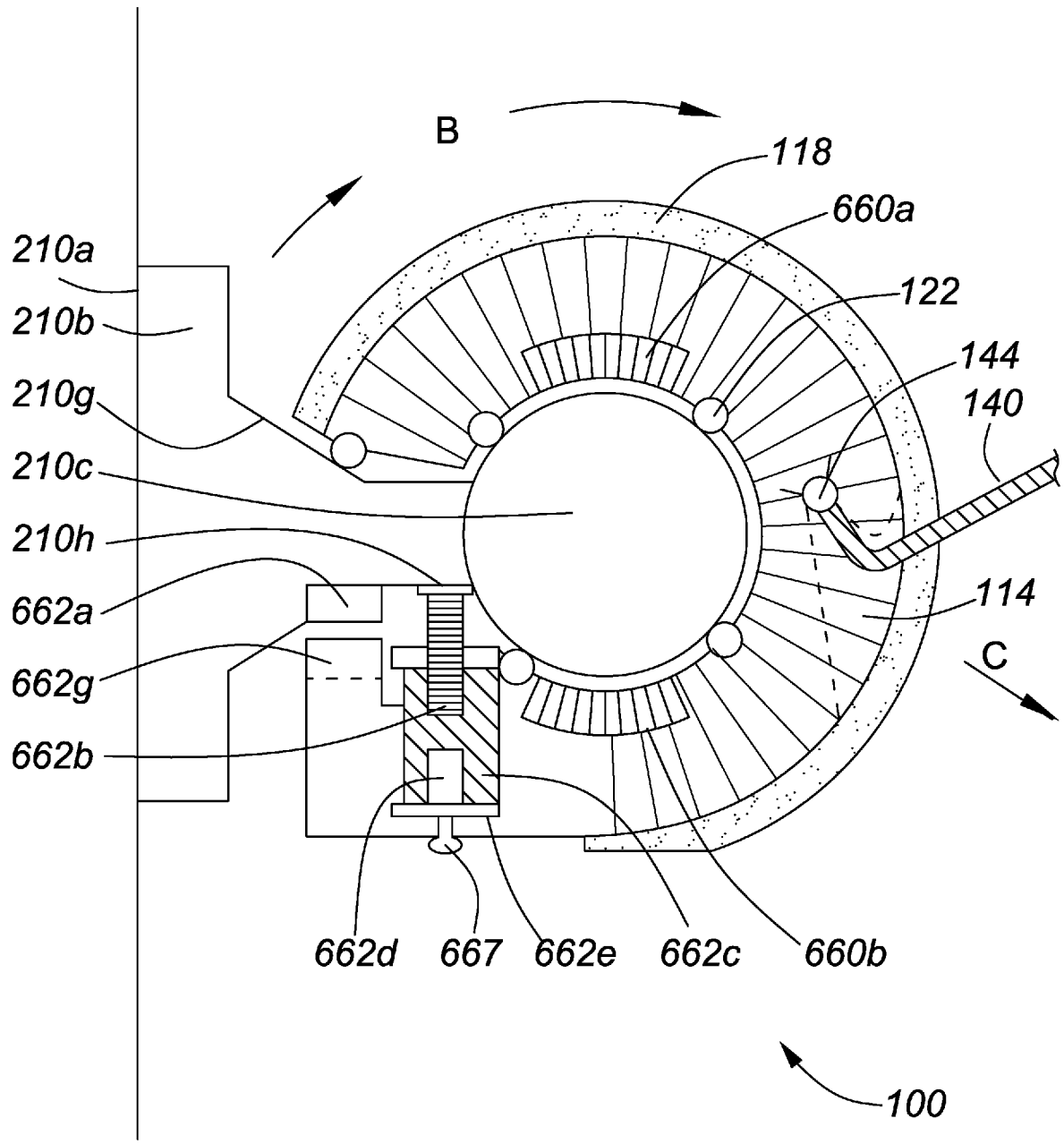
FIG. 10A shows a cross-sectional side view of another example of a fall control system as described herein in the travelling orientation.
Figure 11A:
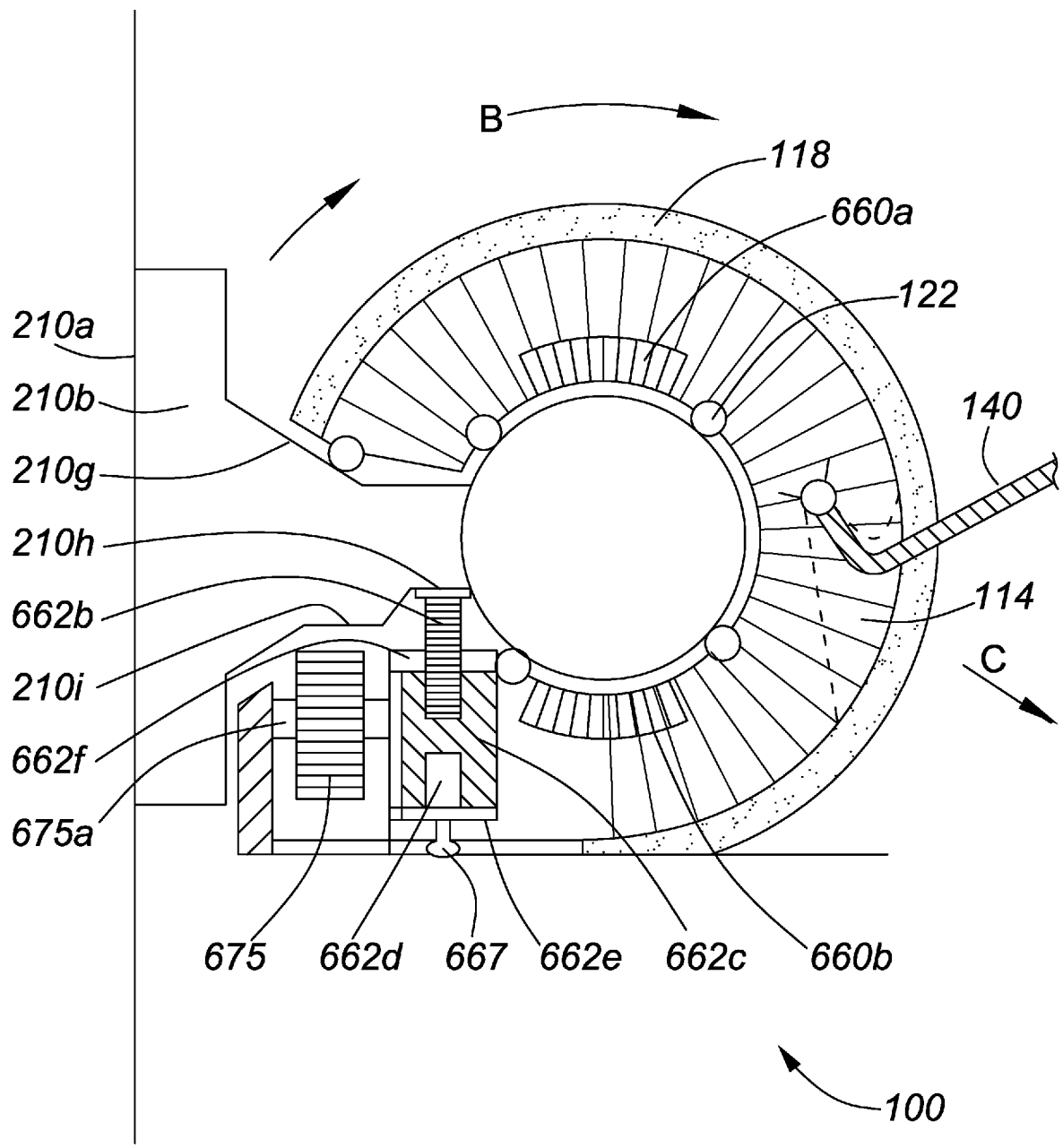
FIG. 11A shows a cross-sectional side view of another example of a fall control system as described herein in the travelling orientation.

The position of background magnet 660a may be adjusted by an adjustment plate and screw 665. Additional magnets for example 660b, may be used and positioned about circular guide shaft 120c as shown in FIGS. 9A, 10A and 11A. A similar adjustment mechanism 667 may be used to adjust position of magnet 660b. The position, or distance, of the one or more than one background magnet 660a (and/or 660b) from the outer curved surface of guide rail 210d, may be adjusted using an adjustment screw 665, or 667, or a similar device, to obtain the desired effect of the eddy current brake in controlling a first maximum speed of the movement of the trolley 620 along guide rail 210 that is less that the expected maximum fall velocity of the user in the event of a fall. For example which is not to be considered limiting, the first maximum speed may be of about 5, 6, 7, 8, 9, 10, 11, 12, 13, 14, 15, 16, 17, 18, 19, 20 inches/second, or from 0.5 to 5 km/hr, or any amount therebetween, for example, from about 0.5, 1.0, 1.5, 2.0, 2.5, 3.0, 3.5, 4.0, 4.5, 5.0 km/hr, or any amount therebetween, in order to approximate the range in walking speeds of a person.

In a falling orientation or second position, trolley 620 rotates about circular guide shaft 210c and activates the speed retarding subsystem in order to slow movement of the trolley along guide rail to a second maximum for example, but not limited to 1, 2, 3, 4, 5, 6, 7, 8, 9, 10 inches/second, or any amount therebetween. In the example of FIG. 8B, as the trolley body rotates into a second position, one or more than one magnet 660c is brought in closer proximity to a conductive portion of guide rail 210 (the speed control track) thereby actuating the eddy current brake in order to slow trolley movement along the guide rail. The conductive portion of guide rail 210 may be located along the circular shaft 210c in a location adjacent magnet 660c when in the trolley 620 is in the second position, the conductive portion (e.g. comprising a ferromagnetic surface material) may be located on the lower guide rail shoulder 210h, 210i, or both 201h and 210i, or as described in earlier examples, a separate conductive speed control track may also be used. The location of magnet 660c in the second position may be adjusted using one or more than one adjustment mechanism 667 for example, a screw or similar device. The adjustment mechanism 667 may be attached to a plate 220b (see for example FIGS. 9A, 10B) so that position of one on-set wheel 662b, or several on-set wheels 662b, may be adjusted. The one or more adjusting mechanism 667 may be used to adjust the functionality of trolley 620 in accordance with the user's weight. For example, for a heavier user, plate 220b could be raised in order to increase the resistance applied by retainer 662c against on-set wheel 662b, while for a lighter user, plate 220b may be lowered to decrease resistance of retainer 662c. For multiple users of the same trolley 620 an average setting may be employed. While the adjustment mechanism 667 is shown located at the base of the trolley body it may be located in any convenient location. The adjustment mechanism 667 may comprise a dial-like device, and in some environments where frequent changes may be required, for example, in a physiotherapy clinic or hospital where patient weights may vary significantly, a larger, more prominent dial may be used.

In order to limit the extent of rotation of the trolley body 620a the outer surface of the guide rail may comprise one or more than one longitudinal ridges, or stops, 680 (FIG. 8D) that butt against roller elements 122 thereby restricting rotation or horizontal displacement of the trolley body. Rotation of the trolley body may also be limited by the trolley body pressing against lower guide rail shoulder 210h, 210i, 662a (FIGS. 9A, 10A, 11A) or a trolley body ridge 690 (surface of the trolley body) may butt against a lower abutment surface of the guide rail 695 (second surface of the speed control track) as shown in FIG. 9A, as described in alternative embodiments below. Ridges 680 may prevent the rolling elements 122, if used, from getting wedged against the cylindrical shaft 210c when the trolley body 620a is forcefully pulled perpendicular to the guide rail (horizontally displaced), or forcefully pulled at an angle close to perpendicular during a fall. Ridges 680 may be smooth, as in some instances the cylindrical shaft 210c of guide rail 210 may be used as a hand rail.

Figure 9B:
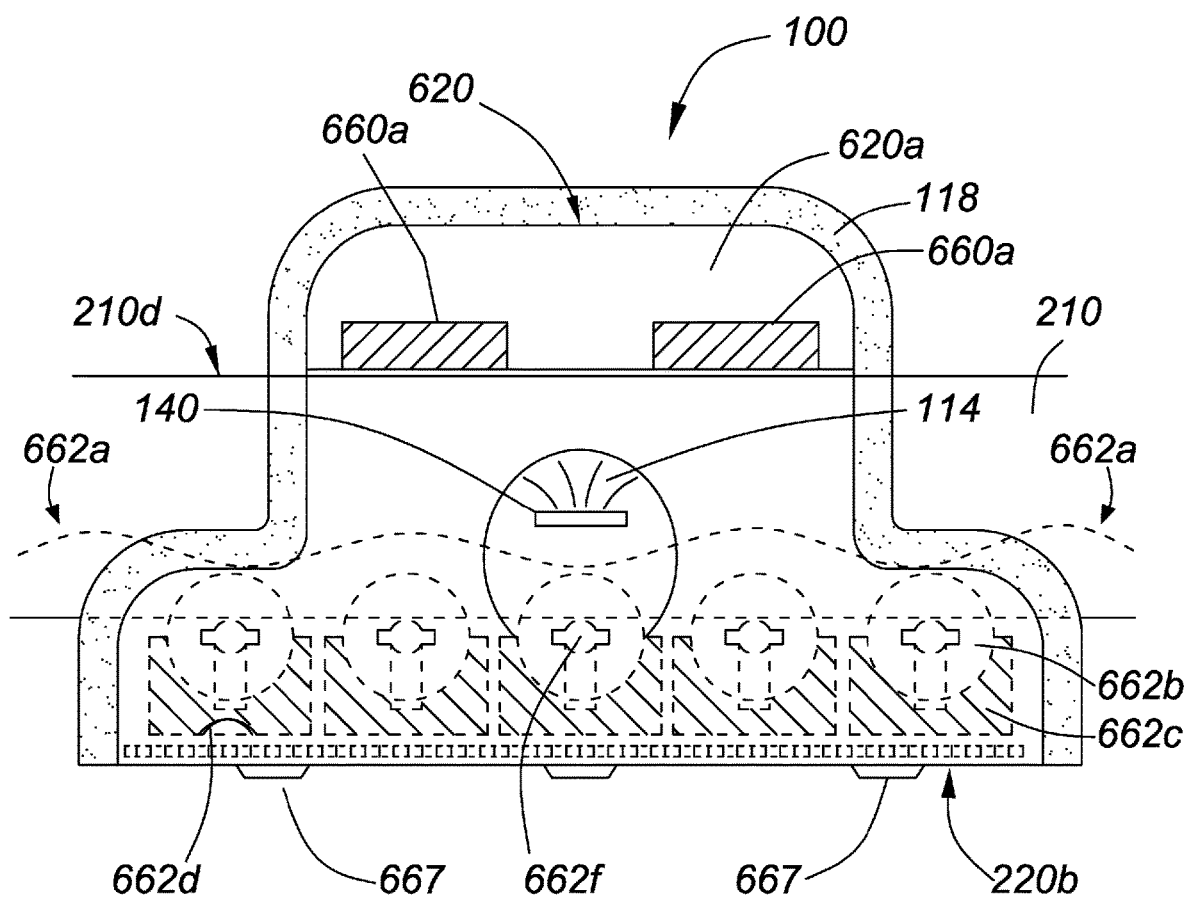
FIG. 9B shows a front view of the fall control system of FIG. 9A in which the speed control track 662a is a sinusoidal wave surface.
Figure 9C:
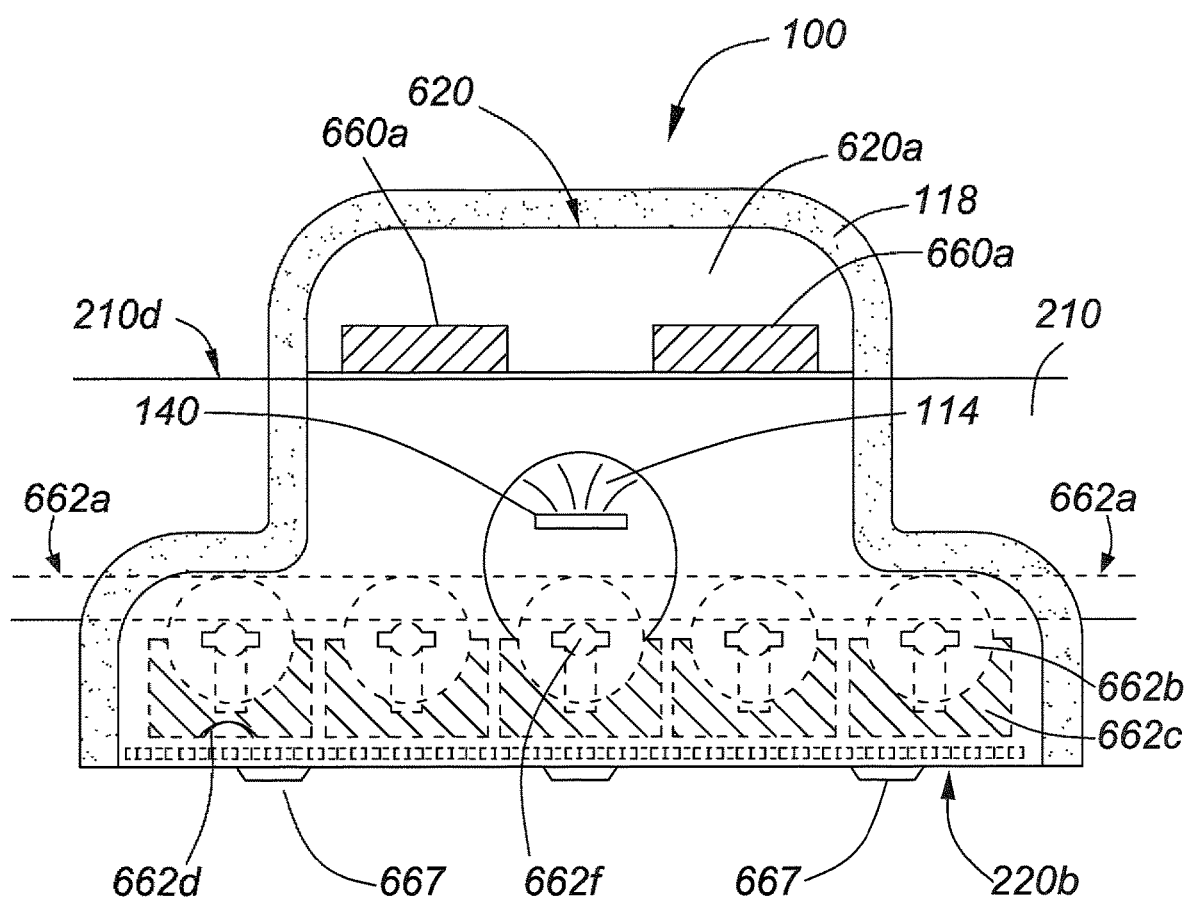
FIG. 9C shows a front view of the fall control system of FIG. 9A in which the speed control track 662a is a flat surface.

With reference to FIGS. 9A and 9B there is shown an alternate fall control system 100 comprising similar elements to those as previously described. The user is attached to trolley 620 via tether 140 at linkage 144. Trolley 620 moves along guide rail 210 in a first direction (travelling orientation) using, for example, one or more than one roller element 122. A background speed control system comprising a background eddy current brake comprising one or more than one background magnet 660a, 660b interacting with a conductive guide rail 210c (background speed control track), controls a first maximum speed of the trolley so that it is less that the expected maximum fall velocity of the user in the event of a fall. For example which is not to be considered limiting, the first maximum speed may be from about 5, 6, 7, 8, 9, 10, 11, 12, 13, 14, 15, 16, 17, 18, 19, 20 inches/second, or from 0.5 to 5 km/hr, or any amount therebetween, for example, from about 0.5, 1.0, 1.5, 2.0, 2.5, 3.0, 3.5, 4.0, 4.5, 5.0 km/hr, or any amount therebetween, in order to approximate the range in walking speeds of a person. The strength of the electromagnetic drag force is determined by the position, strength, shape, poles, and size of the magnet and these properties may readily be determined by one of skill. Background magnet 660a, 660b may be square, rectangular, curved, arc shaped, or comprise any suitable shape in order to fit within trolley 620 and interact with the speed control track. Background magnet 660a, 660b may be positioned symmetrically about trolley 620.

In this example, guide rail 210 is as previously described, comprises a body of the guide rail 210b, a circular shaft 210c with a curved outer surface 210d, mounting surface (or base) 210a, and an upper guide rail shoulder 210g. As shown in FIGS. 9A and 9B, the lower guide rail surface 210h further comprises an elongate undulating wave-like surface 662a (first surface of the speed control track) with the surface of the undulating wave-like form comprises peaks and troughs relative to the lower guide rail surface 210h. The trolley body ridge 690 (surface of the trolley body) may butt against a lower abutment surface of the guide rail 695 (second surface of the speed control track) as shown in FIG. 9A. For example, which is not to be considered limiting, in side view, the undulating surface may describe a sine wave (a curve representing periodic oscillations of constant amplitude) as shown by the dotted line in FIG. 9B. The wave-like speed control track, 662a, may also be termed a sine curve speed control track. However, other wave forms or shapes of surface 662a may also be used provided that the wave-form is a smoothed wave form permitting on-set wheel 662b of the trolley, when engaged with the surface of the speed control track 662a, to move along guide rail 210 so that trolley 620 does not come to an abrupt stop when the trolley is in the second position. The width of the speed control track 662a may approximate the width of on-set wheel 662b as shown in FIG. 9A. Furthermore, the wave like surface 662a of the speed control track, the surface of on-set wheel 662b, or both, may be angled so that when the trolley is rotated into the second position the on-set wheel 662b and speed control track 662a optimally interface.

When trolley 620 is in the first position and moves along guide rail 210 in a travelling orientation, one or more of on-set wheel 662b may touch the "peaks" of the undulating wave-like surface 662a, for example as shown in FIG. 9B. However, in this configuration, on-set wheel 662b does not impart any significant resistance in the travelling orientation and therefore does not participate in slowing movement of the trolley along the guide rail.

If the user falls and pulls the trolley body in the general direction of "C", the trolley body 620a rotates about circular guide shaft 210c in direction "B" into the second position, thereby engaging the speed retarding subsystem 662 (FIG. 9A). The trolley 620 comprises components as previously described for example with reference to FIGS. 8A and 8B however, the second speed control system 662 comprises a speed control track 662a with a wave-like surface that interacts with one or more than one on-set wheel 662b of trolley 620 when the trolley is rotated about circular shaft 210c (in the second position, or a falling orientation). The undulating waves of the speed control track 662a are designed to act as "speed bumps" to retard forward or reverse movement of the one or more than one on-set wheel 662b, thereby retarding movement of the trolley 620 along guide rail 210. In the examples shown in FIGS. 9A, 9B, 10A, 10B, 11A, 11B there may be 1, 2, 3, 4, 5, 6, 7, 8, 9, 10 or more on-set wheels 662b, the number of wheels being selected to ensure effective speed reduction of trolley 620 along guide rail 210 when in the second position (falling orientation).

Figure 11B:
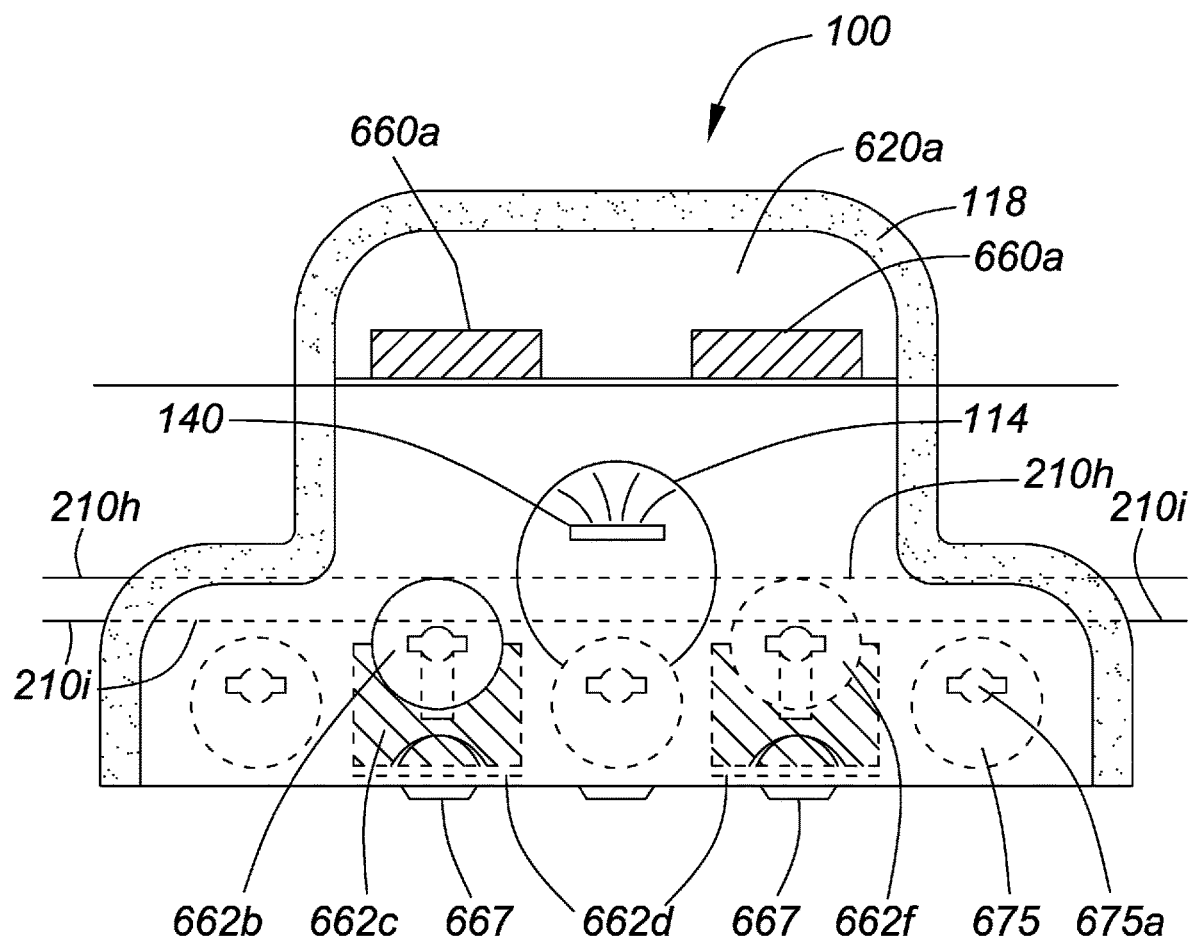
FIG. 11B shows a front view of the fall control system of FIG. 11A.
Figure 12A:
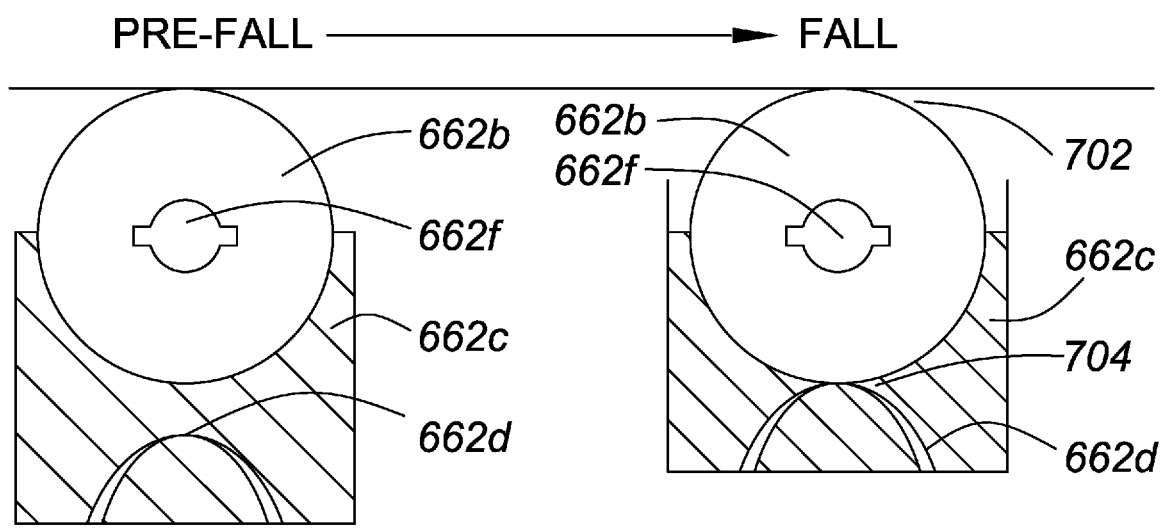
FIG. 12A shows, on the left hand side, a cross sectional front detail view of the wheel assembly of the speed control system as described herein in a pre-fall, or an un-compressed state. In this view retainer 662c is separating the wheel (on-set wheel) 662b from the leaf spring 662d. The wheel assembly of the speed control system during a fall or in a compressed state is shown on the right hand side, with retainer 662c compressed and wheel (on-set wheel) 662b is pressed against an upper contact point 702 of the guide rail and a lower contact point 704 or the leaf spring 662d.
Figure 12B:
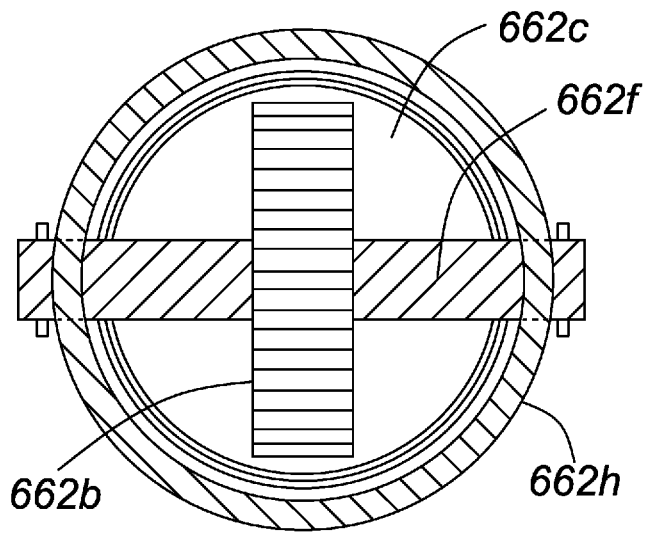
FIG. 12B shows a top view of the wheel assembly of the speed control system FIG. 12A.
Figure 12C:
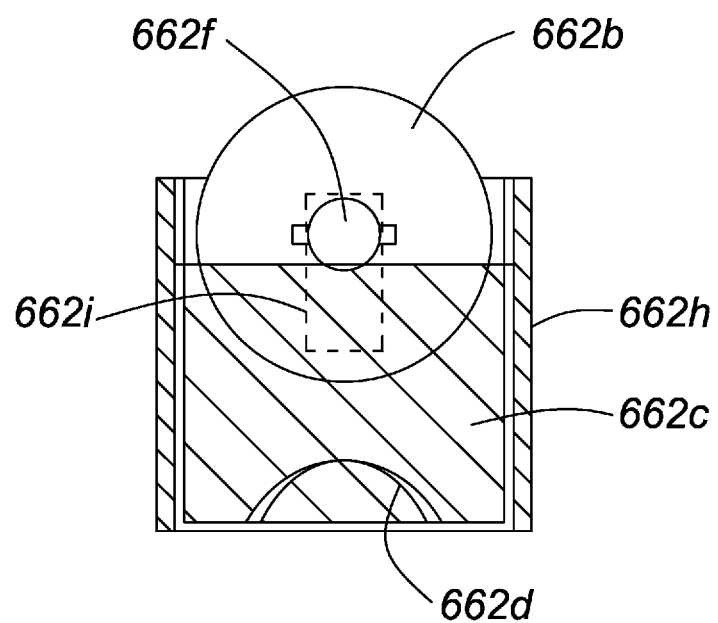
FIG. 12C shows a front detail view of the wheel assembly of the speed control system as described herein in a pre-fall, or an un-compressed state.

On-set wheel 662b and axel 662f sit atop a retainer 662c which biases wheel 662b towards the lower guide rail surface 210h (also see FIG. 12A). On-set wheel 662b and retainer are placed within housing 662h (FIGS. 12B, 12C). Wheel 662b is able to move from the first position (or pre-fall position) as shown in FIG. 12A (left-hand panel) to a second position (compressed or fall position; FIG. 12A, right-hand panel). When on-set wheel 662b moves to the second position, for example, when on-set wheel 662b is pressed against lower guide rail surface 210h, at 702 (of the undulating wave-form surface of the speed control track 662a), retainer 662c is compressed so that axel 662h travels within slot 662i. When one or more than one on-set wheel 662b engages the wave-like surface 662a, they impart a speed control effect to trolley 620 by pressing against the "peaks", the "troughs", or both the "troughs" and "peaks" of the wave-like surface of the speed control track 662a. The wheel should be of sufficient diameter so that when retainer 662c is fully compressed, the housing 662h does not contact the wave-form or level surface. In the second position, with the speed retarding subsystem engaged, trolley 620 may only migrate along guide rail 210 when the compression force of each of retainer 662b is overcome, thereby permitting the associated on-set wheel 662b to move past a trough or peak of the sine curve speed control track 662a. The combined resistance of the background speed control system (background eddy current brake) and all of the retainers 662c housed within trolley 620 when in their most compressed state, and biasing on-set wheel 662b presses against the lower guide rail surface 210h, 210i, the speed control track 662a, or a combination thereof (see FIGS. 9A, 9B, 10A, 10B, 11A, 11B), that is, the force required to compress all retainers 662c so that on-set wheels 662b reach their respective positions on the lower guide rail surface or speed control track when the trolley is in the fall orientation, should be less than the force generated by the user when he or she falls so that the speed controller system may be properly activated. When engaged, the second speed control system slows movement of the trolley along guide rail to a second maximum for example, but not limited to 1, 2, 3, 4, 5, 6, 7, 8, 9, 10 inches/second, or any amount therebetween. In the second position trolley 620 may or may not to come to a full stop. In the event it does come to a full stop, the braking mechanisms described herein should not limit the user (while still attached to the trolley) from crawling up or down the stairs, or across a level surface.

Also within housing 662h is a second retainer 662d that may interact with wheel 662b, at 704, when on-set wheel 662b is in the second position. In this manner, on-set wheel 662b may frictionally engage the second retainer 662d, at point 704, further slowing movement of trolley along the guide rail.

Second retainer 662d may be a flexible leaf spring, a U-shaped part with a radius the same or larger than the radius of on-set wheel 662b, made of a resilient material. As the trolley 620 returns towards its travelling orientation or resting position, the second retainer 662d decompresses and returns to its pre-fall configuration, and on-set wheel 662b is allowed to roll again freely. The amount by which the on-set wheel 662b deforms the second retainer 662d to increase friction without totally locking the wheels can be readily determined. The top surface of the second retainer 662d can be metal, rubber, a sandblasted surface, or some other surface material to increase friction.

The placement of the on-set wheel 662b and housing 662h within trolley 620 and relative to the undulating wave-form surface 662a may be adjusted using adjustment mechanism 667. In order to avoid hitting on-set wheel 662b against surface 662a during a hard fall and potentially damaging the second speed control system, the trolley body 620a may comprise ridge 690 that buts against a lower abutment surface 695 of the guide rail when trolley is rotated in direction "B".

In the example of the fall control system 100 presented in FIGS. 9A, 9B, in the event of a fall, the trolley 620 rotates clockwise or counter-clockwise around the cylindrical shaft 210c and brings into contact one or more than one on-set wheel 662b with the (sine curve) speed control track 662a; or off-set wheel 675 (FIGS. 11A, 11B) with lower guide rail surface 210i and engaging the speed retarding subsystem, the trolley body 620a rotation results in a forceful point of contact between the wheels and the respective guide rail surface which causes significant friction, thereby helping to slow the trolley 620 along guide rail 210. The solid contact of wheel and/or guide rail surfaces coming together assists in keep the forces acting on the wheels constant, irrespective of the users weight. In the pre-fall state, one or more on-set wheels 662b lightly contact or smoothly glide over the outer crests of the speed control track 662a, When the user falls, and the trolley rotates all the wheels make contact with the speed control track 662a. In the event that the user suffers a downward fall towards the stairs or level surface, the trolley body 620a rotates clockwise or counter clockwise on its long axis on the circular guide shaft 210c, pushing the spring loaded on-set wheel(s) 662b further into the speed control track 662a, thereby engaging all the wheel(s) 622b into the speed control track 662a, significantly slowing down, but not completely stopping, the trolley 620. The amplitude of the sine curve (i.e. the height of the crest and troughs of the sine curve/wave) and the optimal frequency of oscillations (distance between troughs or crests) of the speed control track 662a can be determined by experimentation to optimize the functionality of the fall control device 100, so that the trolley is significantly slowed in the event of a fall, but does not become stuck, preventing the user, still attached to the trolley, from crawling up or down the stairs.

Figure 10B:
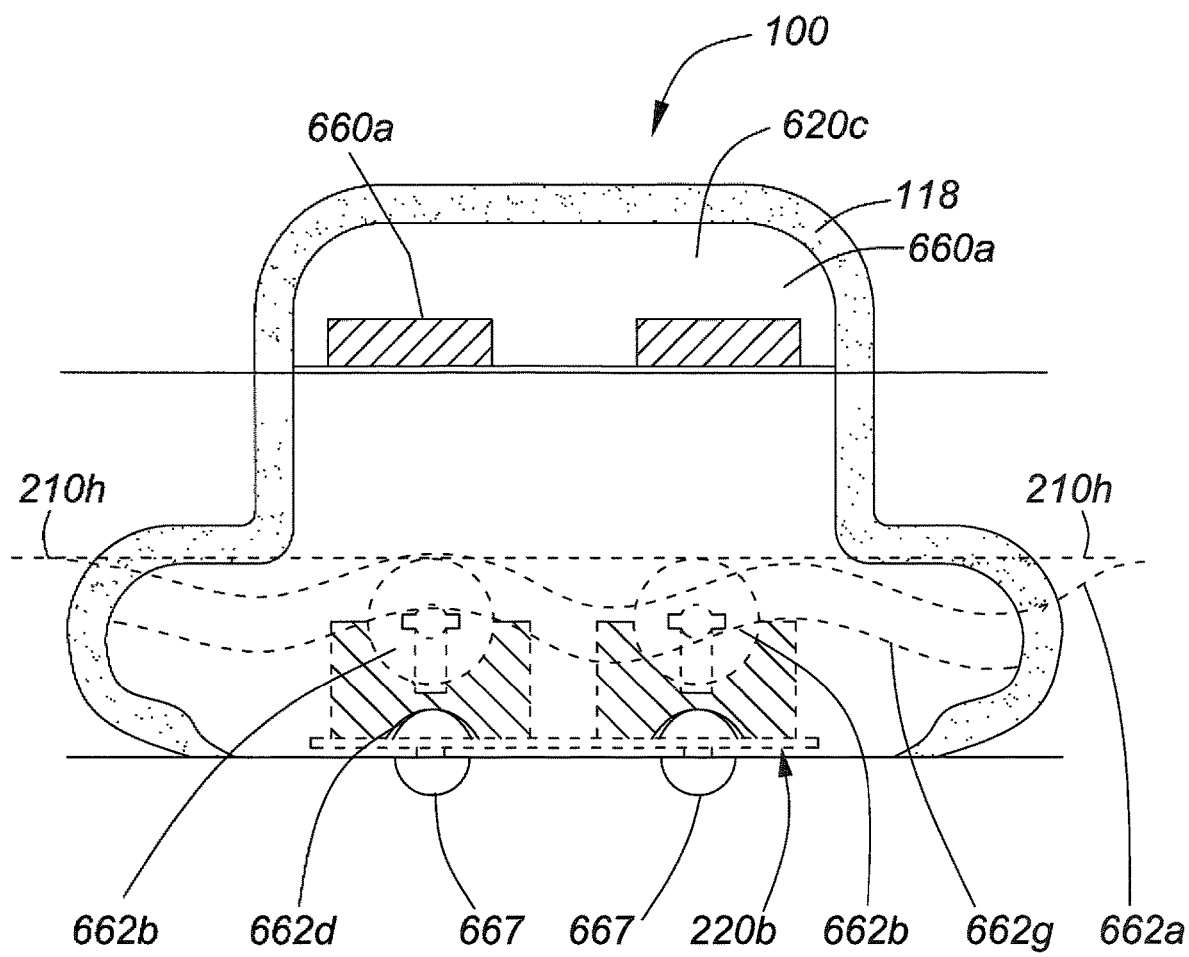
FIG. 10B shows a front view of the fall control system of FIG. 10A.

With reference to FIGS. 10A and 10B there is shown an alternate fall control system 100 comprising similar elements to those as previously described. The user is attached to trolley 620 via tether 140 at linkage 144. Trolley 620 moves along guide rail 210 in a first direction (travelling orientation), for example, using one or more than one roller element 122. A background speed control system comprising a background eddy current brake comprising one or more than one background magnet 660a, 660b interacting with a conductive guide rail (background speed control track, comprising for example a ferromagnetic surface material) 210c, or as described in earlier examples, a separate conductive background speed control track, controls a first maximum speed of the trolley is less that the expected maximum fall velocity of the user in the event of a fall. For example which is not to be considered limiting, the first maximum speed may be from about 5, 6, 7, 8, 9, 10, 11, 12, 13, 14, 15, 16, 17, 18, 19, 20 inches/second, or from 0.5 to 5 km/hr, or any amount therebetween, for example, from about 0.5, 1.0, 1.5, 2.0, 2.5, 3.0, 3.5, 4.0, 4.5, 5.0 km/hr, or any amount therebetween, in order to approximate the range in walking speeds of a person. The strength of the electromagnetic drag force is determined by the position, strength, shape, poles, and size of the magnet and these properties may readily be determined by one of skill. For example, background magnet 660*a*, 660*b* may be square, rectangular, curved, arc shaped, or comprise any suitable shape in order to fit within trolley 620 and interact with the speed control track. Background magnet 660*a*, 660*b* may be positioned symmetrically about trolley 620.

Guide rail 210 is as previously described, comprising body of the guide rail 210*b*, a circular shaft 210*c* with a curved outer surface 210*d*, mounting surface (or base) 210*a*, and an upper guide rail shoulder 210*g*. As shown in FIGS. 10A and 10B, the lower guide rail surface 210*h* comprises two portions, a first portion that comprises a flat surface (first surface of the speed control track) that is in contact with on-set wheel 662*b* when trolley 620 is in the first (travelling orientation) or second (rotated) position, and a second portion comprising an elongate sine curve speed control track 662*a* comprising an undulating wave-like surface, (second surface of the speed control track). The surface of the speed control track comprises peaks and troughs relative to the lower guide rail surface 210*h*. For example, which is not to be considered limiting, in side view, the wave-like surface of the speed control track may describe a sine wave as shown by the dotted line 662*a* in FIG. 10B. However, other wave forms or shapes of the surface of speed control track 662*a* may also be used provided that the wave-form is a smoothed wave form permitting a corresponding trolley wave-like surface 662*g* of trolley 620, when engaged with the speed control track 662*a*, to move along guide rail 210 so that trolley 620 does not come to an abrupt stop when the trolley is in the second position. A flat surface on the body of the trolley may also be used to engage the wave-like surface of the speed control track. Preferably, if a flat surface of the trolley body is used, then the flat surface is of a size that engages and continuously presses against the wave-like surface and does not glide over the peaks of the wave-like surface. The width of the each of the first and second (speed control track 662*a*) portion of the lower guide rail surface 210*h* may approximate the width of on-set wheel 662*b* and the width of trolley wave-like surface 662*g* (as shown in FIG. 10A). Friction is the primary mechanism responsible for slowing the trolley when the trolley wave like surface 662*g* comes in contact with the guide rail 662*a*.

As described with reference to FIGS. 9A and 9B, on-set wheel 662*b* and axel 662*f* sit atop retainer 662*c* which biases on-set wheel 662*b* toward the lower guide rail surface 210*h* as shown in FIGS. 10B and 12A. Wheel 662*b* and retainer are placed within housing 662*h* (FIGS. 12B, 12C). On-set wheel 662*b* is able to move from the first position (or pre-fall position) as shown in FIG. 12A (left-hand panel) to a second position (compressed or fall position; FIG. 12A, right-hand panel), with axel 662*h* traveling within slot 662*i*. Second retainer 662*d* may interact with on-set wheel 662*b*, at 704, when wheel 662*b* is in the second position, so that on-set wheel 662*b* may frictionally engage the second retainer 662*d*, at point 704, further slowing movement of trolley along the guide rail. The placement of the on-set wheel 662*b* and housing 662*h* within trolley 620 and relative to the lower guide rail surface 210*h* may be adjusted using adjustment mechanism 667.

When trolley 620 is in the first position and moves along guide rail 210 in a travelling orientation as shown in FIG. 10B, on-set wheels 662*b* are in contact with lower guide rail surface 210*h*, while the trolley wave-like surface 662*g* does not contact the "peaks" of the undulating wave-like form surface 662*a*. In this configuration, on-set wheel 662*b*, and trolley wave-like surface 662*g* do not impart any significant resistance and they do not participate in slowing movement of the trolley along the guide rail.

If the user falls and pulls the trolley body in the general direction of "C", the trolley body 620*a* rotates about circular guide shaft 210*c* in direction "B" into the second position, and activates the speed retarding subsystem comprising trolley wave-like surface 662*g* that engages the wave-like surface of the speed control track 662*a*. Furthermore, if trolley body 620*a* is fully rotated during a fall, and on-set wheel 662*b* is pressed against lower guide rail surface 210*h* so that retainer 662*c* is fully compressed, on-set wheel 662*b* may engage surface 662*d* at point 704 (see FIG. 12A, right hand side) further slowing the movement of trolley 620 along guide rail 210 and in this configuration, functioning as part of the speed retarding subsystem. The combined resistance of the background speed control system (background eddy current brake) and all of the retainers 662*c* housed within trolley 620 when in their most compressed state and biasing on-set wheel 662*b* against the lower guide rail surface 210*h*, 210*i*, the (sine curve) speed control track 662*a*, or a combination thereof (see FIGS. 9A, 9B, 10A, 10B, 11A, 11B), that is, the force required to compress all retainers 662*c* so that on-set wheels 662*b* reach their respective positions on the lower guide rail surface or speed control track when the trolley is in the fall orientation, should be less than the force generated by the user when he or she falls so that the speed controller system may be properly activated. When engaged, the speed retarding subsystem slows movement of the trolley along guide rail to a second maximum for example, but not limited to 1, 2, 3, 4, 5, 6, 7, 8, 9, 10 inches/second, or any amount therebetween. In the second position trolley 620 may or may not to come to a full stop. In the event trolley 620 does come to a full stop, the speed control system described herein should not limit the user (while still attached to the trolley) from crawling up or down the stairs, or across a level surface.

In the fall control system 100 just described (with reference to FIGS. 10A and 10B), in the event of a fall, the trolley 620 rotates around the circular or cylindrical shaft 210*c* towards the user, bringing into contact the trolley wave-like surface 662*g* on the trolley 662*g* with the corresponding (sine curve) speed control track 662*a* on the guide rail 210. The friction created by the two surfaces rubbing against each other helps to slow down movement of the trolley 620 along guide rail 210. The solid points of contact resulting from the fall orientation of the trolley would keep any frictional forces constant, irrespective of the user's weight. The material of the trolley wave-like surface 662*g* and the (sine curve) speed track 662*a* can be the same material, or different materials. One or both surfaces can be, for example, a smooth metal, or to increase the friction, one or both surfaces can be a hard rubber, a polymeric material, or a material, for example a metal, a rubber, a polymeric material, that is sandblasted to increase friction. Alternatively, a replaceable brake pad (analogous to a car brake pad) can be used on one or both surfaces, with the surfaces being wave-like or flat. This may be advantageous in a commercial setting (i.e. physiotherapy gym) where the speed control system might be activated several times a day, resulting in one or more braking surfaces needing to be replaced.

An alternate fall control system 100 is provided with reference to FIGS. 11A and 11B. This fall control system comprises similar elements to those as previously described, with the user attached to trolley 620 via tether 140 at linkage 144, and trolley 620 moving along guide rail 210 in a first direction (travelling orientation), for example, using one or more than one roller element 122. The fall control system 100 comprises a background speed control system comprising a background eddy current brake comprising one or more than one background magnet 660a, 660b interacting with a conductive portion (e.g. a ferromagnetic surface material) of guide rail 210c (background speed control track), or as described in earlier examples, a separate conductive background speed control track, to control a first maximum speed of the trolley is less that the expected maximum fall velocity of the user in the event of a fall. For example which is not to be considered limiting, the first maximum speed may be of about 5, 6, 7, 8, 9, 10, 11, 12, 13, 14, 15, 16, 17, 18, 19, 20 inches/second, or from 0.5 to 5 km/hr, or any amount therebetween, for example, from about 0.5, 1.0, 1.5, 2.0, 2.5, 3.0, 3.5, 4.0, 4.5, 5.0 km/hr, or any amount therebetween, in order to approximate the range in walking speeds of a person. The strength of the electromagnetic drag force is determined by the position, strength, shape, poles, and size of the magnet and these properties may readily be determined by one of skill. For example, background magnet 660a, 660b may be square, rectangular, curved, arc shaped, or comprise any suitable shape in order to fit within trolley 620 and interact with the speed control track. Background magnet 660a, 660b may be positioned symmetrically about trolley 620.

Guide rail 210 is as previously described, comprising body of the guide rail 210b, a circular shaft 210c with a curved outer surface 210d, mounting surface (or base) 210a, and an upper guide rail shoulder 210g. As shown in FIGS. 11A and 11B, the lower guide rail surface 210h may comprises two surfaces, a first surface 210h that comprises a flat surface that is in contact with on-set wheel 662b when trolley 620 is in the first (travelling orientation), and second (fall orientation; trolley rotated) position, where a second surface comprising a second flat surface 210i, analogous to a speed control track, and engages off-set wheel 675 (see FIG. 11B). Offset wheel 675 is off-set with respect to axel 675a so that when wheel 675 rotates about axel 675a, an outer surface of the wheel circumscribes an eccentric path, and when engaged with the speed control track collectively function as a speed retarding subsystem. When off-set wheel 675 engages with second off-set surface 210i, movement of trolley 620 is reduced since rotation of wheel about axel 675a requires additional effort in order to roll along the speed control track 210i. When off-set wheel 675 is in contact with the speed control track 210i, the trolley 620 does not come to an abrupt stop.

As described with reference to FIGS. 9A, 9B, 10A, and 10B, on-set wheel 662b and axel 662f sit atop retainer 662c which biases wheel 662b toward the lower guide rail surface 210h as shown in FIGS. 11B and 12A. On-set wheel 662b move from the first position (or pre-fall position) as shown in FIG. 12A (left-hand panel) to a second position (compressed or fall position; FIG. 12A, right-hand panel), and in doing so, second retainer 662d may interact with, and frictionally engage, wheel 662b, at 704, further slowing movement of trolley 620 along the guide rail. The placement of the on-set wheel 662b and housing 662h within trolley 620 and relative to the lower guide rail surface 210h may be adjusted using adjustment mechanism 667.

When trolley 620 is in the first position and moves along guide rail 210 in a travelling orientation as shown in FIG. 11B, on-set wheels 662b are in contact with lower guide rail surface 210h, while the off-set wheels 675 do not contact the speed control track 210i. In this configuration, off-set wheel 675, and speed control track 210i, do not participate in slowing movement of the trolley along the guide rail, and retainer 662c acting on on-set wheel 662b helps maintains the trolley in the travelling orientation.

If the user falls and pulls the trolley body in the general direction of "C", the trolley body 620a rotates about circular guide shaft 210c in direction "B" into the second position, and activates the speed retarding subsystem system comprising off-set wheel 675 engaging speed control track 210i. Furthermore, if trolley body 620a is fully rotated during a fall, and on-set wheel 662b is pressed against lower guide rail surfaced 210h so that retainer 662c is fully compressed, on-set wheel 662b may engage surface 662d at point 704 (see FIG. 12A, right hand side) further slowing the movement of trolley 620 along guide rail 210. In this configuration, on-set wheel 662b is functioning as part of the speed retarding subsystem. The combined resistance of the background speed control system (background eddy current brake) and all of the retainers 662c housed within trolley 620 when in their most compressed state and biasing on-set wheel 662b against the lower guide rail surface 210h, speed control track 210i, 662a, or a combination thereof (see FIGS. 9A, 9B, 10A, 10, 11A, 11B), that is, the force required to compress all retainers 662c so that on-set wheels 662b reach their respective positions on the lower guide rail surface or speed control track when the trolley is in the fall orientation, should be less than the force generated by the user when he or she falls so that the speed retarding subsystem may be properly activated. When engaged, the speed retarding system slows movement of the trolley along guide rail to a second maximum for example, but not limited to 1, 2, 3, 4, 5, 6, 7, 8, 9, 10 inches/second, or any amount therebetween. In the second position trolley 620 may or may not to come to a full stop. In the event it does come to a full stop, the speed control system described herein should not limit the user (while still attached to the trolley) from crawling up or down the stairs, or across a level surface.

The off-set wheels (off center of rotation wheels) 675 act in an analogous manner as the "speed bumps" of speed control track 662a, with the friction of the two surfaces (wheel 675 and speed control track 210i), when in contact, slowing down movement of trolley 620 along guide rail 210, without causing the trolley to lock up completely. Also contemplated is the use of off-set wheels 675 comprising a gear (spline) that connect the one or more of the off-set wheels 675 with one or more onset center of rotation (regular) guide wheels that comprise a mating gear/spline (not shown). In this variation, both sets of wheels would rotate in opposite directions, so that when engaged when trolley 620 is in a fall orientation, the off-set wheels 675 would lock with the guide wheels and prevent any significant rotation of any of the wheels until the user stood back up. The user standing back up would relieve pressure from the retainer 662c (compression springs) under each the guide wheels (as described with reference to FIGS. 12A to 12C). Alternatively, a third gear wheel (between the two gear wheels just described) may be added which would result in both the off-set center wheels 675 and the on-center of rotation wheels travelling in the same direction in the event of a fall, but the on center of rotation wheels would be significantly slowed due to the slower speed of the off-set center of rotation wheels, resulting from their off-set center of rotation.

In the fall control systems described above with reference to FIGS. 8A to 8D, 9A, 9B, 10A, 10B, 11A, 11B, and 12A to 12C, the speed retarding subsystem may comprise any combination of on-set wheel(s) 662b, with or without retainers 662c, off-set wheels 675, and speed control tracks 662a and 662g, in order to optimize functionality of the fall control system 100. Furthermore, where the trolley 620 comprises one or more than one on-set wheel 662b that is biased by retainer 662c, the retainer 662c may be a resilient material for example, a resilient rubber material, a polymeric material, a metal spring, a polymeric spring, for example the retainer may be a compression spring that is round, oval, rectangular or other shape. The ends of the springs may have any suitable configuration for example a closed, square, or double closed end. The retainer may also comprise a resilient, compressible, rubber tube that when compressed permits on-set wheel 662b to interface with second retainer 662d.

In the event of a fall, when the person is resting on the stairs or level surface, the downward force on the tether connecting the user to the trolley is significantly decreased in comparison to the forces through the tether during a fall; with less compression of the springs under the wheel(s), the trolley is allowed to rotate back fully or partially to its initial resting position, releasing pressure between the areas of friction between the trolley and external surface (or between the wheel(s) and the external speed control track), allowing the trolley to move more freely on the circular rail, moving with the user as he or she crawls up or down the stairs.

It is contemplated that any part of any aspect or embodiment discussed in this specification can be implemented or combined with any part of any other aspect or embodiment discussed in this specification. While particular embodiments have been described in the foregoing, it is to be understood that other embodiments are possible and are intended to be included herein. It will be clear to any person skilled in the art that modification of and adjustment to the foregoing embodiments, not shown, is possible.

What is claimed is:

1. A fall control system comprising, an elongate guide rail extending along an axis and comprising a conductive circular shaft, a trolley for moving along the conductive circular shaft of the elongate guide rail, a tether attached to the trolley at a first end, a second end of the tether for attaching to a user, and a speed control system for controlling a speed of the trolley along the elongate guide rail, the speed control system comprising:

one or more than one speed control track formed along with or attached to the elongate guide rail, and extending along the axis of the elongate guide rail, the one or more than one speed control track comprising a first surface and a second surface;

a background speed controller coupled to the trolley and engaged with the conductive circular shaft, the background speed controller comprising one or more than one magnet, the background speed controller for controlling the speed of the trolley along the elongate guide rail in a travelling orientation while the user is walking, ascending stairs, or descending stairs;

a speed controller coupled to the trolley, the trolley rotatably displaceable about the circular shaft from a first position when the trolley is in the travelling orientation and the speed controller does not reduce speed, or temporarily stop movement, of the trolley along the elongate guide rail, to a second position when the trolley is in a falling orientation and the speed controller reduces speed, or temporarily stops movement, of the trolley along the elongate guide rail, the speed controller comprising one or more than one wheel assembly comprising: an onset wheel with a first axel on a first center of rotation of the onset wheel and a first retainer for biasing the onset wheel towards the first surface of the one or more than one speed control track, the speed controller further comprising a surface of the trolley for interacting with the second surface of the one or more than one speed control track, or further comprising an offset wheel with a second axel off a second center of rotation of the offset wheel, the offset wheel for interacting with the second surface of the one or more than one speed control track, the speed controller for controlling the speed of the trolley along the elongate guide rail in the falling orientation, and the second surface of the speed control track, the surface of the trolley of the speed controller, or both the second surface of the speed control track and the surface of the trolley of the speed controller, is a material selected from a group consisting of: metal, sandblasted metal, rubber, sandblasted rubber, polymeric material, and sandblasted polymeric material; or, both the second surface of the speed control track and the surface of the trolley of the speed controller comprise a brake pad.

2. The fall control system of claim 1, wherein the conductive circular shaft is made of a material selected from a group consisting of aluminum, anodized aluminum, steel, stainless steel, a metal alloy, a ceramic coated aluminum, a ceramic coated anodized aluminum, a ceramic coated steel, a ceramic coated stainless steel and a ceramic coated metal alloy.

3. The fall control system of claim 1, wherein the conductive circular shaft is made of a ferromagnetic material.

4. The fall control system of claim 1, wherein the conductive circular shaft is made of aluminum.

5. The fall control system of claim 1, wherein:
   the first surface of the speed control track is a sinusoidal wave surface,
   the speed controller comprises the surface of the trolley, and
   the second surface of the speed control track and the surface of the trolley of the speed controller are both flat surfaces.

6. The fall control system of claim 5 wherein the wheel assembly of the speed controller further comprises a second retainer for frictionally engaging the onset wheel when the trolley is in the falling orientation.

7. The fall control system of claim 1, wherein:
   the first surface of the speed control track is a flat surface,
   the speed controller comprises the surface of the trolley, and
   the second surface of the speed control track and the surface of the trolley of the speed controller are both flat surfaces.

8. The fall control system of claim 7 wherein the wheel assembly of the speed controller further comprises a second retainer for frictionally engaging the onset wheel when the trolley is in the falling orientation.

9. The fall control system of claim 1, wherein:
   the first surface of the speed control track is a flat surface,
   the speed controller comprises the surface of the trolley, and the second surface of the speed control track and the surface of the trolley of the speed controller are both sinusoidal wave surfaces.

10. The fall control system of claim 1, wherein:
the first and second surfaces of the speed control track are flat surfaces, and
the speed controller comprises the offset wheel.

11. A fall control trolley for moving along an elongate guide rail, the elongate guide rail comprising a conductive circular shaft and one or more than one speed control track, the speed control track comprising first and second surfaces,
the fall control trolley comprising a body, a background speed controller coupled to the body, and a speed controller coupled to the body,
the background speed controller for engaging with the conductive circular shaft of the elongate guide rail when the trolley is mounted on the elongate guide rail and in a travelling orientation, the background speed controller comprising one or more than one background magnet, the background speed controller for controlling the speed of the trolley along the elongate guide rail in the travelling orientation while the user is walking, ascending stairs or descending stairs;
the speed controller coupled to the trolley, the trolley rotatably displaceable from a first position, when the trolley is in the travelling orientation and the speed controller does not reduce speed, or temporarily stop movement, of the trolley along the elongate guide rail, to a second position when the trolley is in a falling orientation and the speed controller reduces speed, or temporarily stops movement, of the trolley along the elongate guide rail,
the speed controller comprising one or more than one wheel assembly comprising: an onset wheel with a first axel on a first center of rotation of the onset wheel and a first retainer for biasing the onset wheel towards the first surface of the one or more than one speed control track of the elongate guide rail,
the speed controller further comprising a surface of the trolley for interacting with the second surface of the one or more than one speed control track, or further comprising an offset wheel with a second axel off a second center of rotation of the offset wheel, the offset wheel for interacting with the second surface of one or more than one speed control track;
the speed controller for controlling the speed of the trolley along the elongate guide rail in the falling orientation;
wherein the background speed controller and the speed controller are not the same,
wherein the surface of the trolley of the speed controller is a material selected from a group consisting of: metal, sandblasted metal, rubber, sandblasted rubber, polymeric material, and sandblasted polymeric material; or, the surface of the trolley of the speed controller comprise a brake pad.

12. The fall control trolley of claim 11, wherein the trolley moves from the travelling orientation to the falling orientation by rotating about an axis of the conductive circular shaft.

13. The fall control trolley of claim 11, wherein:
the speed controller comprises the surface of the trolley, and
the surface of the trolley of the speed controller is a flat surface.

14. The fall control trolley of claim 11, wherein:
the wheel assembly of the speed controller further comprises a second retainer for frictionally engaging the onset wheel when the trolley is in the falling orientation.

15. The fall control trolley of claim 11, wherein:
the speed controller comprises the surface of the trolley, and
the surface of the trolley of the speed controller is a sinusoidal wave surface.

16. The fall control trolley of claim 11, wherein:
the speed controller comprises the offset wheel.

17. A method for controlling a movement of a movable object during a fall event using the fall control system of claim 1, the method comprising:
(a) coupling the first end of the tether to the trolley of the fall control system, the trolley being moveable along the elongate guide rail extending along the axis of the elongate guide rail, the trolley comprising the background speed controller and the speed controller, the background speed controller active while the trolley is in the first position, in the travelling orientation, and the speed controller active when the trolley is in the second position, in the falling orientation;
(b) coupling the second end of the tether to the movable object;
(c) exerting a pulling force, through the tether, on the trolley that is sufficient to move the trolley along the elongate guide rail while in the travelling orientation, the background speed controller controlling the speed of the trolley along the elongate guide rail to not exceed a maximum walking speed;
(d) during the fall event, exerting a falling force, through the tether, on the trolley that is sufficient to displace the trolley from the first position to the second position, the speed controller for controlling the speed of the trolley along the guide rail in the falling orientation to not exceed a maximum fall speed; and
(e) allowing the moveable object to descend to a ground at a controlled speed,
wherein the maximum walking speed is greater than the maximum fall speed, and the maximum walking speed and the maximum fall speed are greater than zero.

* * * * *